United States Patent
Santamarina et al.

(10) Patent No.: US 8,662,801 B2
(45) Date of Patent: Mar. 4, 2014

(54) DEPTH GAUGE FOR DRILL BIT

(75) Inventors: Aland Santamarina, Columbia, MD (US); Joseph Kelleher, Bowie, MD (US); Scott Muhlbaier, Baltimore, MD (US); Darren B. Moss, York, PA (US); Mark E. Brunson, Bel Air, MD (US); David B. Lee, Baltimore, MD (US); Michael Peters, Lutherville, MD (US); Rickey J. Thomas, Lineboro, MD (US); Craig A. Schell, Street, MD (US); Robert S. Gehret, Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 796 days.

(21) Appl. No.: 12/776,653

(22) Filed: May 10, 2010

(65) Prior Publication Data
US 2010/0260565 A1 Oct. 14, 2010

Related U.S. Application Data

(63) Continuation-in-part of application No. 12/708,085, filed on Feb. 18, 2010.

(60) Provisional application No. 61/154,957, filed on Feb. 24, 2009.

(51) Int. Cl.
*B23B 51/00* (2006.01)
*B23B 49/00* (2006.01)

(52) U.S. Cl.
USPC .......................................... 408/202; 408/110

(58) Field of Classification Search
USPC ........ 81/451; 279/23.1, 29, 143, 906; 408/67, 408/110, 113, 202, 229, 239 A, 240, 241 S, 408/203, 192, 231
See application file for complete search history.

(56) References Cited

U.S. PATENT DOCUMENTS

| 569,896 A | 10/1896 | Van Cauwenberg |
| 1,058,149 A * | 4/1913 | Campbell ................... 408/112 |

(Continued)

FOREIGN PATENT DOCUMENTS

| DE | 1893039 | 5/1964 |
| DE | 1898860 | 8/1964 |

(Continued)

OTHER PUBLICATIONS

Lorence, Xavier—Extended European Search Report—Aug. 30, 2013—14 pages—The Hague.

(Continued)

*Primary Examiner* — Alexander P Taousakis
(74) *Attorney, Agent, or Firm* — Scott B. Markow

(57) ABSTRACT

A drill bit has a shank portion having a plurality of SDS-type slots, a cutting portion comprising at least one cutting flute, and an intermediate portion connecting the shank to the cutting portion, the intermediate portion including at least one additional slot. A depth gauge includes a body configured to receive the drill bit, a retention mechanism coupled to the body and having an inward projection to removably couple the body to the at least one additional slot in the drill bit, and a cap coupled to the body such that the cap contacts a workpiece surface to prevent the drill bit from entering the workpiece more than a predetermined depth, wherein the cap is movable relative to the body among a plurality of positions, wherein each of the plurality of positions corresponds to a different predetermined drilling depth.

20 Claims, 67 Drawing Sheets

(56) References Cited

U.S. PATENT DOCUMENTS

| | | | |
|---|---|---|---|
| 2,439,008 A | | 4/1948 | Kellem |
| 2,477,891 A | * | 8/1949 | O'Neill ............... 408/113 |
| 2,794,353 A | * | 6/1957 | Bashlow et al. ......... 408/113 |
| 2,823,563 A | * | 2/1958 | Nipken ............... 408/110 |
| 2,967,441 A | | 12/1959 | Miles |
| 3,339,435 A | | 9/1967 | Heitz |
| 3,454,059 A | * | 7/1969 | Sindelar ............... 81/429 |
| 3,460,408 A | * | 8/1969 | Raymond ............. 408/112 |
| 3,583,821 A | * | 6/1971 | Shaub et al. ........... 408/72 R |
| 3,620,637 A | | 11/1971 | Brown |
| 3,682,177 A | | 8/1972 | Ames et al. |
| 3,776,647 A | | 12/1973 | Hart |
| 4,019,827 A | | 4/1977 | Christianson et al. |
| 4,123,193 A | | 10/1978 | Hill |
| 4,168,177 A | | 9/1979 | Indelicato et al. |
| 4,710,075 A | | 12/1987 | Davison |
| 4,946,179 A | * | 8/1990 | De Bastiani et al. ....... 279/46.7 |
| 5,034,041 A | | 7/1991 | Austin |
| 5,078,552 A | | 1/1992 | Albel |
| 5,351,587 A | * | 10/1994 | Griffin ............... 82/113 |
| 5,601,387 A | * | 2/1997 | Sanford et al. ........... 408/113 |
| 5,765,654 A | | 6/1998 | Burger |
| 5,882,151 A | | 3/1999 | Wirth, Jr. et al. |
| 5,904,453 A | | 5/1999 | Gavia |
| 5,961,257 A | | 10/1999 | Bettini et al. |
| 5,989,257 A | | 11/1999 | Tidwell et al. |
| 6,079,078 A | | 6/2000 | Byington |
| 6,162,226 A | | 12/2000 | DeCarlo, Jr. et al. |
| 6,511,268 B1 | | 1/2003 | Vasudeva et al. |
| 6,514,258 B1 | | 2/2003 | Brown et al. |
| 6,739,872 B1 | | 5/2004 | Turri |
| 6,851,898 B2 | | 2/2005 | Ege et al. |
| 6,854,937 B1 | | 2/2005 | Weiss |
| 7,086,813 B1 | * | 8/2006 | Boyle et al. ............ 408/239 R |
| 7,210,881 B2 | | 5/2007 | Greenberg |
| 7,258,513 B2 | | 8/2007 | Gertner |
| 7,322,429 B2 | | 1/2008 | Kim |
| 7,337,697 B2 | * | 3/2008 | Bader et al. .............. 81/54 |
| D588,893 S | | 3/2009 | Radich |
| 7,513,722 B2 | | 4/2009 | Greenberg et al. |
| 7,607,871 B1 | * | 10/2009 | Nelson ............... 408/113 |
| 7,726,664 B2 | * | 6/2010 | Peters ............... 279/143 |
| 2002/0127070 A1 | * | 9/2002 | Mawhinney ........... 408/139 |
| 2005/0147478 A1 | | 7/2005 | Greenberg |
| 2006/0134957 A1 | | 6/2006 | Cornwell |
| 2006/0188840 A1 | | 8/2006 | Verban, Jr. |
| 2007/0206996 A1 | | 9/2007 | Bharadwaj et al. |
| 2009/0148248 A1 | | 6/2009 | Nishikawa et al. |

FOREIGN PATENT DOCUMENTS

| | | |
|---|---|---|
| DE | 1985830 | 5/1968 |
| DE | 1659490 | 12/1969 |
| DE | 6942542 | 6/1970 |
| DE | 2002320 | 7/1971 |
| DE | 2031357 | 12/1971 |
| DE | 2160831 | 6/1973 |
| DE | 2240346 | 2/1974 |
| DE | 2317779 | 10/1974 |
| DE | 2322743 | 11/1974 |
| DE | 2333662.1 | 1/1975 |
| DE | 2356565 | 5/1975 |
| DE | 2404504 | 8/1975 |
| DE | 2434641 | 1/1976 |
| DE | 2606122 | 8/1977 |
| DE | 2621386.5 | 9/1977 |
| DE | 2912396 | 10/1980 |
| DE | 3110458 | 10/1982 |
| DE | 3126511 | 3/1983 |
| DE | 3140776 | 4/1983 |
| DE | 222222 | 5/1985 |
| DE | 3800482.8 | 7/1989 |
| DE | 8810373.0 | 8/1989 |
| DE | 278079 | 4/1990 |
| DE | 9006555 | 8/1990 |
| DE | 9205794 | 6/1992 |
| DE | 9106606.9 | 9/1992 |
| DE | 4225844 A1 | 3/1993 |
| DE | 9306373 | 6/1993 |
| DE | 4327870 | 3/1994 |
| DE | 4342484 | 4/1995 |
| DE | 29601678 | 4/1996 |
| DE | 19725401 | 2/1999 |
| DE | 19753574 | 7/1999 |
| DE | 20003290 | 8/2000 |
| DE | 102007019704 | 11/2008 |
| EP | 0295225 | 12/1988 |
| EP | 1714735 | 10/2006 |
| EP | 1759654 | 3/2007 |
| EP | 1854583 | 11/2007 |
| EP | 1857221 | 11/2007 |
| EP | 2221133 A2 | 8/2010 |
| WO | WO94/09934 | 5/1994 |
| WO | WO2005/025792 | 3/2005 |

OTHER PUBLICATIONS

Lorence, Xavier—European Search Report (EP 10 15 4435)—Apr. 5, 2013—The Hague.

Gates, Eric Andrew—Office Action re corresponding U.S. Appl. No. 12/708,085—Aug. 21, 2013—13 pages—U.S.A.

* cited by examiner

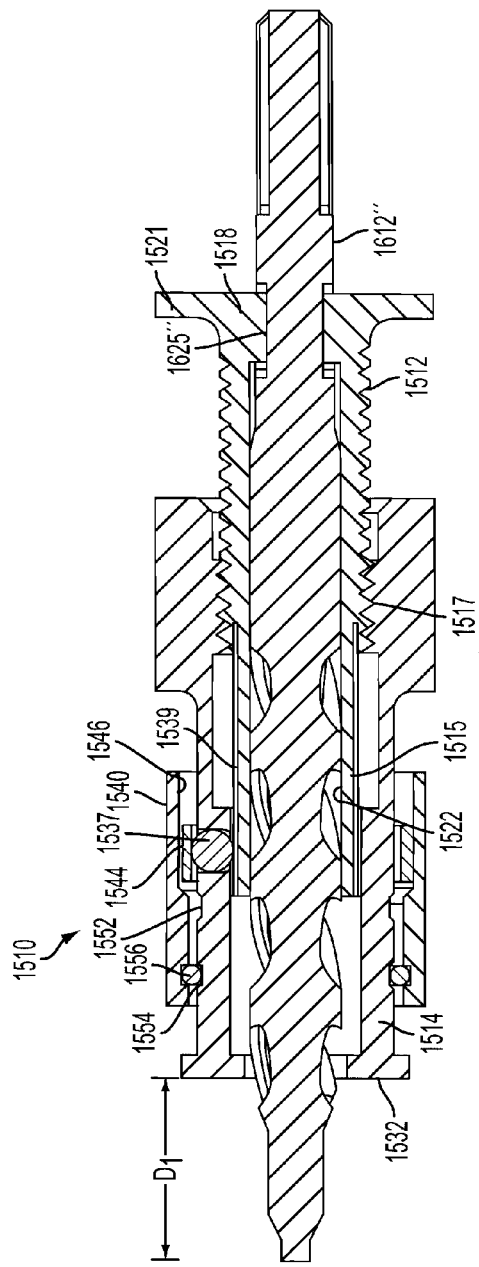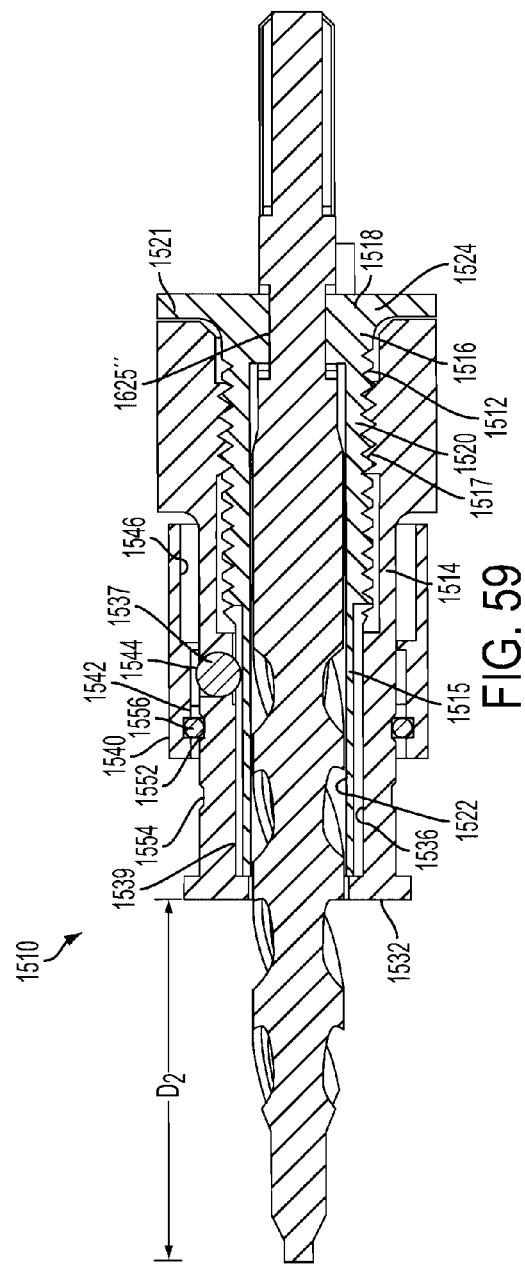

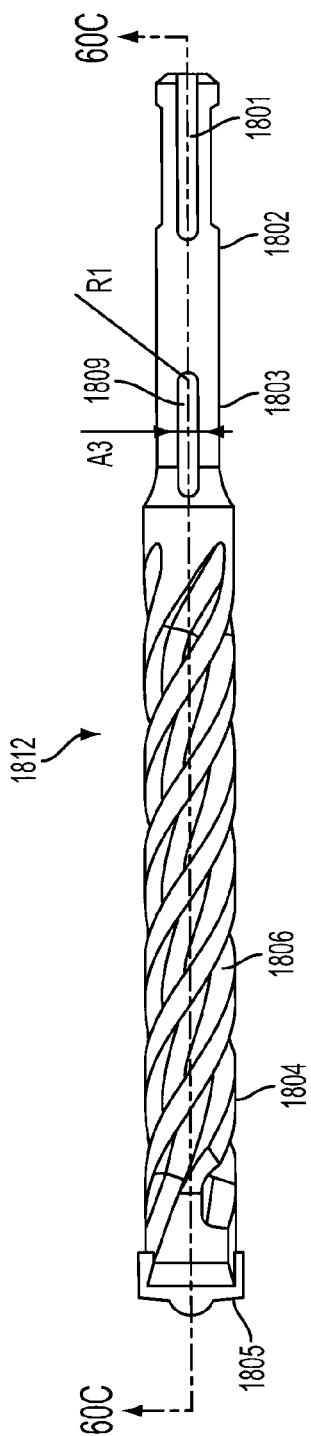
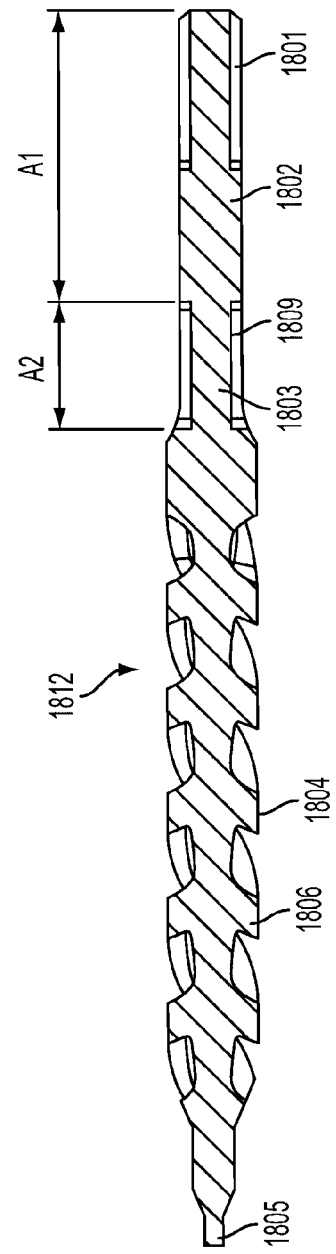
FIG. 60B
FIG. 60C

DEPTH GAUGE FOR DRILL BIT

CROSS REFERENCE TO RELATED APPLICATIONS

This application is a continuation-in-part application of U.S. patent application Ser. No. 12/708,085, filed Feb. 18, 2010, titled "Depth Gauge for Drill Bit," which claims priority, under 35 U.S.C. §119(e), to U.S. Provisional Application No. 61/154,957, filed Feb. 24, 2009, titled "Depth Gauge for Hammer Drill Bit." Each of the foregoing designs is incorporated herein by reference.

TECHNICAL FIELD

This application relates to a depth gauge for a drill bit, and more particularly, to a depth gauge positioned on a hammer drill bit to control the entrance depth of the drill bit into a workpiece.

BACKGROUND

When setting a fastener, such as an anchor, into a workpiece, such as a concrete workpiece (e.g., a ceiling or wall), it is desirable to create a bore having a depth that matches the depth needed to set the anchor. If the bore is too deep, the anchor will be inserted into the bore past a position where the end of the anchor is flush with the workpiece, which may require manipulation of the anchor to draw it flush with the workpiece. If an additional structure is mounted onto the anchor, a screw may be required to be inserted into the anchor to pull the anchor flush with the ceiling. If the bore is too shallow, the anchor is not flush with the ceiling. Thus, the anchor must be removed and the drill bit reinserted to deepen the bore. In addition, there are multiple sizes of drill bits and anchors that are used for anchoring in workpieces. Accordingly, it is desirable to provide a device that enables a drill bit to bore a hole into a workpiece, ceiling, or the like with a proper depth of the bore to receive the anchor, and that works with multiple sizes of drill bits and anchors.

SUMMARY

In an aspect, a depth gauge for use with a drill bit, includes a body configured to receive a drill bit; a retention mechanism coupled to the body and configured to removably couple the body to the drill bit; and a cap configured to be removably coupled to the body. The cap can be coupled to the body in one of a first position relative to the body where the cap contacts a workpiece surface to prevent the drill bit from entering the workpiece more than a first depth, and a second position relative to the body where the cap contacts the workpiece surface to prevent the drill bit from entering the workpiece more than a second depth that is different from the first depth. In an implementation, this can be done in combination with a drill bit that has only a single groove for receiving the retention mechanism.

Implementations of this aspect may include one or more of the following features. The retention mechanism may include a retention element that is moveable between a locked position in which the retention element engages a recess defined in the drill bit and an unlocked position in which the retention element is allowed to disengage from the recess and an actuation member that is selectively moveable to enable the movement of the retention member between the locked position and the unlocked position. The retention member may include a ball that can move radially inwardly to engage the recess in the drill bit in the locked position, and the actuation member comprises a sleeve that moves axially to enable the ball to move radially outwardly from the recess in the unlocked position. The sleeve may include an internal ramped surface that abuts against the ball and enables the ball to move between the locked position and the unlocked position upon axial movement of the sleeve.

The retention element may include a plurality of jaws such that movement of the actuation member causes the jaws to move between the locked position in which the jaw engages the recess in the drill bit and the unlocked position in which the jaws can moves radially outwardly from the recess in the drill bit. The jaws may each have a tapered outer surface, the body includes a tapered inner surface that abuts the tapered outer surface, and the actuation member enables axial movement of the body relative to the jaws to enable radial movement of the jaws between the locked position and the unlocked position.

The actuation member may include a supplemental locking mechanism that inhibits movement of the jaws between the locked position and the unlocked position. The supplemental locking mechanism may include a locking step formed in an outer surface of the body, an inner sleeve that substantially surrounds the jaws and the body, the inner sleeve having a pocket that receives a ball and a flat, and an outer sleeve that substantially surrounds the inner sleeve, the outer sleeve having a pocket. The outer sleeve and inner sleeve may be rotatable relative to the body among (1) a first position in which the inner sleeve abuts the locking step to prevent movement of the jaws relative to the body and the ball is clamped between the inner sleeve and the outer sleeve to inhibit relative movement of the inner sleeve and the outer sleeve, (2) a second position in which the ball falls into the pocket of the outer sleeve to enable movement of the outer sleeve relative to the inner sleeve, and (3) a third position in which the inner sleeve is rotated such that the locking step is aligned with the flat to enable axial movement of the body relative to the jaws to enable movement of the jaws to the unlocked position.

The supplemental locking mechanism alternatively may include a locking step and a flat formed on an outer surface of the body, and a sleeve that substantially surrounds the jaws and the body, the sleeve having a radial bore that receives a ball. The sleeve may be rotatable relative to the body between (1) a first position in which the sleeve abuts the locking step to prevent movement of the jaws relative to the body and the ball engages the flat to inhibit relative movement between the sleeve and the body, and (2) a second position in which the ball is disengaged from the flat and the sleeve is rotated so that the locking step is aligned with the flat to enable axial movement of the body relative to the jaws to enable movement of the jaws to the unlocked position.

The body may be split into at least two pieces. The retention element may include an inward projection on at least one of the pieces, and the retention mechanism may enable the pieces to move toward the drill bit in the locked position and away from the drill bit in the unlocked position. The retention mechanism may also include a set screw extending between the pieces. Alternatively, the body may have external threads and the retention mechanism may include a sleeve with internal threads that are threaded to the external threads such that the sleeve can move axially to enable movement of the pieces between the locked position and the unlocked position. The sleeve can be the cap, such that when the cap is removed from the body, the pieces can move between the locked position and the unlocked position.

The body may include an external shoulder, and the cap may include a first internal shoulder that engages the external shoulder when the sleeve is in the first orientation, and a second internal shoulder that engages the external shoulder when the sleeve is in the second orientation. The cap may further include an attachment element that is moveable between a first position in which removal of the cap from the body is inhibited and a second position in which removal of the cap from the body is enabled. The attachment element may include a ball or pin that is biased toward the first position and that can be manually moved by the user to the second position. The attachment element may include internal threads that are threaded to external threads on the body.

A dust shield may receive and be removably coupled to at least one of the body, the retention mechanism, and the sleeve. The dust shield may substantially cover a front end of the drill bit and be configured to collect dust generated by penetration of the drill bit into the workpiece.

The cap may have a first contacting surface at one end thereof and a second contacting surface at an opposite end thereof, such that when the cap is in the first position, the first contacting surface contacts the workpiece and when the cap is in the second position, the second contacting surface contacts the workpiece. Alternatively, the cap may have a single contacting surface at one end and cap may be moveably positionable relative to the body such that in the first position the contacting surface is a first distance from the workpiece and in the second position the contacting surface is a second, different distance from the workpiece.

The cap may be threaded to the body such that the cap is movable axially relative to the body between the first position and the second position. The cap may be positioned at one of a plurality of discrete positions between the first position and the second position. A locking mechanism may lock the cap at one of the plurality of discrete positions. Alternatively, the body includes a projection that can be interchangeably received at a first recess in the body to achieve the first position and at a second recess in the body to achieve the second position.

The retention mechanism may include an inward projection that engages a groove in the drill bit, wherein the inward projection has an axial length that is less than the axial length of the groove in the drill bit, inhibiting loads from being transferred from the drill bit to the depth gauge.

In another aspect, a kit includes a depth gauge and a dust shield for use with a drill bit. The depth gauge is configured to receive a drill bit. The depth gauge is removably attachable to the drill bit and has a front end portion with a contacting surface that contacts a workpiece surface to prevent the drill bit from entering the workpiece more than a predetermined depth. The dust shield is attachable to the depth gauge to substantially cover a front end portion of the drill bit to collect dust generated by penetration of the drill bit into the workpiece. The dust shield has a flexible wall configured to at least partially collapse as the drill bit is inserted into the workpiece until the contacting surface contacts the workpiece. In an implementation, the dust shield further includes a non-collapsible interior cavity configured to collect dust.

In another aspect a kit includes a drill bit and a depth gauge. The drill bit has a coupling portion configured to couple the drill bit to a drill, an intermediate portion defining only a single groove, and a cutting portion having at least one cutting flute. The depth gauge has a body configured to receive the drill bit, a retention mechanism coupled to the body and configured to removably couple the body to the groove in the drill bit, and a cap having a first contacting end and a second contacting end, the cap configured to be removably coupled to the body in one of a first orientation where the first contacting surface contacts a workpiece surface to prevent the drill bit from entering the workpiece more than a first depth, and a second orientation where the second contacting surface contacts the workpiece surface to prevent the drill bit from entering the workpiece more than a second depth that is different from the first depth.

In another aspect, a drill bit for use with a depth gauge includes a shank portion, a cutting portion, and an intermediate portion. The shank portion has an SDS-type connection for coupling the shank to an SDS-type tool holder of a hammer drill. The cutting portion includes a plurality of cutting flutes and a carbide-tipped head. The intermediate portion connects the shank portion and the cutting portion. The intermediate portion has an annular groove for receiving a connecting mechanism of a depth gauge the annular groove positioned approximately the minimum allowable distance from the SDS-type connection. A single annular groove has a length of approximately 6 mm, a diameter of approximately 9.8 mm, and a pair of radiused edges each having a radius of approximately 1.5 mm. The drill bit has one of: (a) a ½ inch diameter with a rear edge of the annular groove being positioned approximately 95 mm from the carbide tipped head; and (b) a ⅜ inch diameter with a rear edge of the annular groove positioned approximately 102 mm from the carbide-tipped head.

In another aspect, a drill bit for use with a depth gauge includes a shank portion having a plurality of SDS-type slots to create an SDS-type connection for coupling the shank to an SDS-type tool holder of a hammer drill, a cutting portion comprising a plurality of cutting flutes, and a carbide-tipped head. There is also one of (i) an oblong slot disposed on the shank between the SDS-type slots and the cutting portion; and (ii) an extension extending from one of the SDS-type slots further forward into the shank than the other SDS-type slots and terminating before the cutting portion.

In another aspect, a depth gauge for use with a drill bit includes a body configured to receive a drill bit, a retention mechanism coupled to the body and configured to removably couple the body to the drill bit, and a cap coupled to the body such that the cap contacts a workpiece surface to prevent the drill bit from entering the workpiece more than a predetermined depth. The cap is movable relative to the body among a plurality of positions, wherein each of the plurality of positions corresponds to a different predetermined drilling depth.

Implementations of this aspect may include one or more of the following features. The retention mechanism may include a retention element that is moveable between a locked position in which the retention element engages a recess defined in the drill bit and an unlocked position in which the retention element is allowed to disengage from the recess. The retention element may be biased radially inwardly to engage the recess in the drill bit in the locked position. The retention element may have a curved or ramped surface to enable radial outward movement to the unlocked position of the retention element when the drill bit is being removed from the depth gauge. The retention element may include a projection that has an axial length less than an axial length of the recess in the drill but to enable axial play between the depth gauge and the drill bit.

The retention mechanism may be disposed on a base having an inner sleeve, the body may include an outer sleeve, and the cap may include an intermediate sleeve, where the inner sleeve is received at least partially in the intermediate sleeve and at least partially in the outer sleeve, and the intermediate sleeve is received at least partially in the outer sleeve. The intermediate sleeve may be threadably connected to the outer sleeve such that rotation of one of the cap and the body causes the cap to telescope relative to the body among the plurality of positions. The intermediate sleeve may include a key that is received in a longitudinal recess of the inner sleeve to prevent relative rotation between the cap and the base. A detent mechanism may be provided on the base and the outer sleeve to enable a positive lock at a predetermined number of the plurality of positions of the body relative to the cap. The detent mechanism comprises a spring biased protrusion on the base and a corresponding recess on an internal wall of the body. A dust shield may receive and be removably coupled to at least one of the body and the cap, the dust shield substantially covering a front end of the drill bit and configured to collect dust generated by penetration of the drill bit into the workpiece.

In another aspect, a drill bit for use with a depth gauge, having at least one inwardly directed projection for attaching the depth gauge to the drill bit, includes a shank portion having a plurality of SDS-type slots to create an SDS-type connection for coupling the shank to an SDS-type tool holder of a hammer drill. A cutting portion includes at least one cutting flute. An intermediate portion connects the shank to the cutting portion, the intermediate portion including at least one longitudinal slot for receiving the at least one inwardly directed projection for attaching the depth gauge to the drill bit. The longitudinal slot has an axial length greater than an axial length of the projection to enable axial play between the drill bit and the depth gauge.

Implementations of this aspect may include one or more of the following features. The longitudinal slot may have a length of approximately 20 mm, a width of approximately 3.3 mm, and a curved end portion having a radius of approximately 1.5 mm. The longitudinal slot is positioned approximately 47 mm from a rear end of the shank.

In another aspect, a kit includes a drill bit and a depth gauge. The drill bit has a shank portion having a plurality of SDS-type slots, a cutting portion comprising at least one cutting flute, and an intermediate portion connecting the shank to the cutting portion, the intermediate portion including at least one additional slot. The depth gauge has a body configured to receive the drill bit, a retention mechanism coupled to the body and having an inward projection to removably couple the body to the at least one additional slot in the drill bit, and a cap coupled to the body such that the cap contacts a workpiece surface to prevent the drill bit from entering the workpiece more than a predetermined depth, where the cap is movable relative to the body among a plurality of positions, and where each of the plurality of positions corresponds to a different predetermined drilling depth.

Implementations of this aspect may include one or more of the following features. The longitudinal slot may have an axial length greater than an axial length of the projection to enable axial play between the drill bit and the depth gauge. The projection may be moveable between a locked position in which the projection engages the additional slot in the drill bit and an unlocked position in which the projection is allowed to disengage from the additional slot, the projection being biased toward the locked position. The retention mechanism may be disposed on a base having an inner sleeve, the body may include an outer sleeve, and the cap may include an intermediate sleeve. The inner sleeve may be received at least partially in the intermediate sleeve and at least partially in the outer sleeve, and the intermediate sleeve may be received at least partially in the outer sleeve. The intermediate sleeve may be threadably connected to the outer sleeve such that rotation of one of the cap and the body causes the cap to telescope relative to the body among the plurality of positions. A dust shield can be removably coupled to at least one of the body and the cap, the dust shield substantially covering a front end of the drill bit and configured to collect dust generated by penetration of the drill bit into the workpiece.

Advantages may include one or more of the following. The depth gauge can be used with multiple sizes of drill bits to create holes for multiple sizes of anchors. The depth gauge and drill bit so that the depth gauge can be attached and removed from the drill bit without the use of additional tools. The depth gauge may include a dust shield that enables dust generated by the drill bit to be collected. These and other advantages and features will be apparent from the description, the drawings, and the claims.

BRIEF DESCRIPTION OF THE DRAWINGS

FIG. 58 is a cross-sectional view of the fifteenth embodiment of the depth gauge at the first depth in an unlocked position.

FIG. 59 is a cross-sectional view of the fifteenth embodiment of the depth gauge at a second depth in a locked position.

FIG. 60B is a side view of the drill bit of FIG. 60A.

FIG. 60C is a cross-sectional view of the drill bit of FIG. 60A.

DETAILED DESCRIPTION

Figure 1:
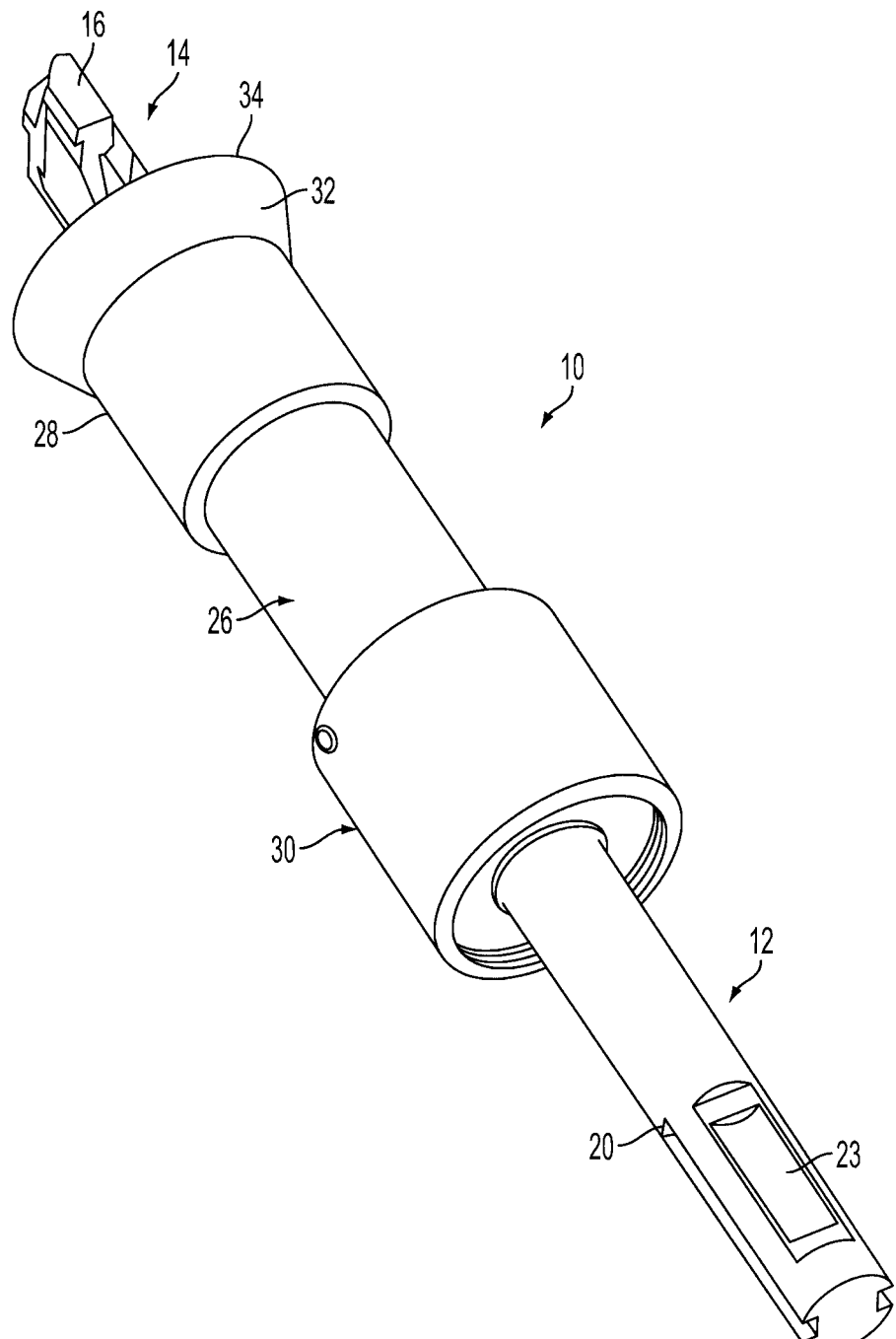
FIG. 1 is a perspective view of a first embodiment of a depth gauge with a drill bit.
Figure 2:
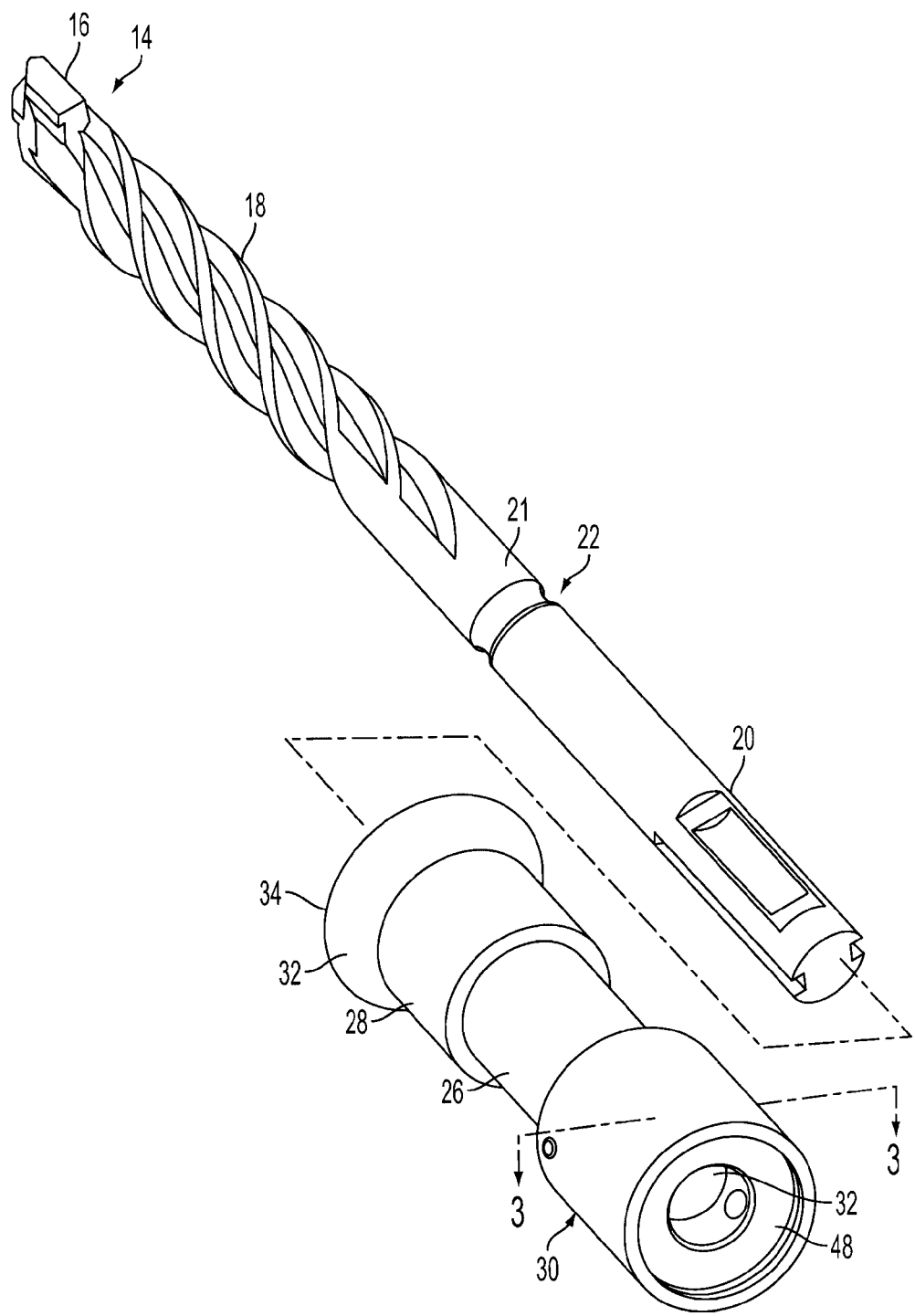
FIG. 2 is a perspective view of the drill bit and the depth gauge of FIG. 1 with the drill bit removed from the depth gauge.

FIGS. 1-11 illustrate three embodiments of a depth gauge 10, 110, and 310 that can be coupled to a drill bit 12. The drill bit 12 has a shank portion 20, an intermediate portion 21 with an annular groove 22, and a cutting portion 14 having a cutting head 16 and a plurality of cutting flutes 18. An example of such a drill bit is described in greater detail below with respect to FIG. 33.

Referring to FIGS. 1-5, the first embodiment of the depth gauge 10 includes an elongated body 26 having two ends. One end is connected to a cap 28 and the other end includes a contour to receive a retention mechanism 30. The elongated body 26 has a cylindrical configuration with an axially extending bore 32 that extends through the elongated body 26. The bore 32 has a diameter sized to receive the diameter of the drill bit 12.

Cap 28 is sized to fit over the exterior surface of the elongated body 26. The cap 28 has a large conical end portion 34 with a flat surface 36 perpendicular to the axis of the elongated body 26. The flat surface 36 enables the depth gauge 10 to contact the work surface or ceiling after the drill bit has formed a proper depth bore to prevent the drill bit 12 from further entering the bore. Thus, the cap 28 acts as a depth stop for the drill bit 12 and is sized and positioned on the drill bit 12 so that a hole created by the drill bit 12 will correspond to an anchor to be inserted into the hole.

Figure 3:
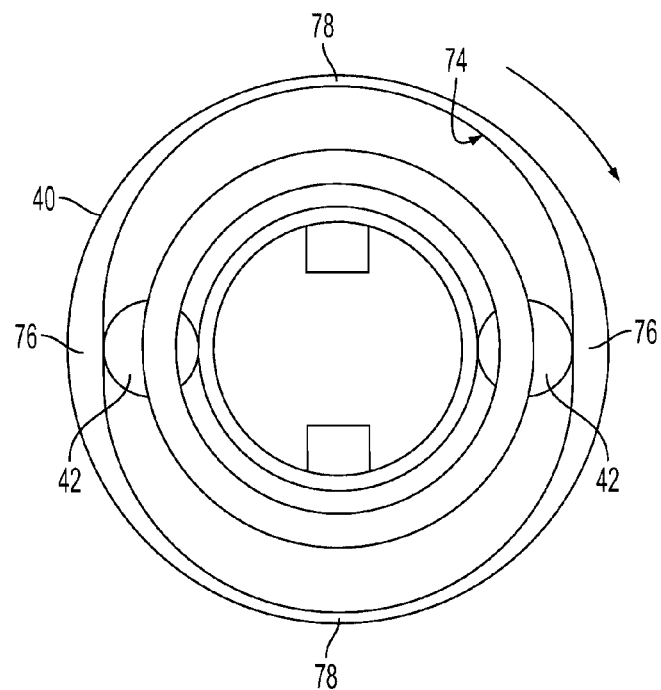
FIG. 3 is a bottom plan view of the depth gauge of FIG. 1 with the washer removed and the detents in an engaged position.
Figure 4:
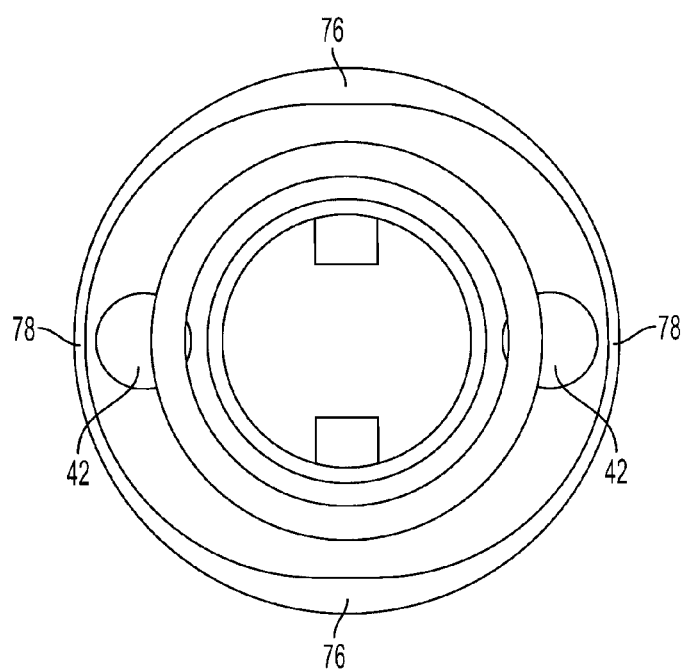
FIG. 4 is a view like FIG. 3 with the detents in a disengaged position.
Figure 5:
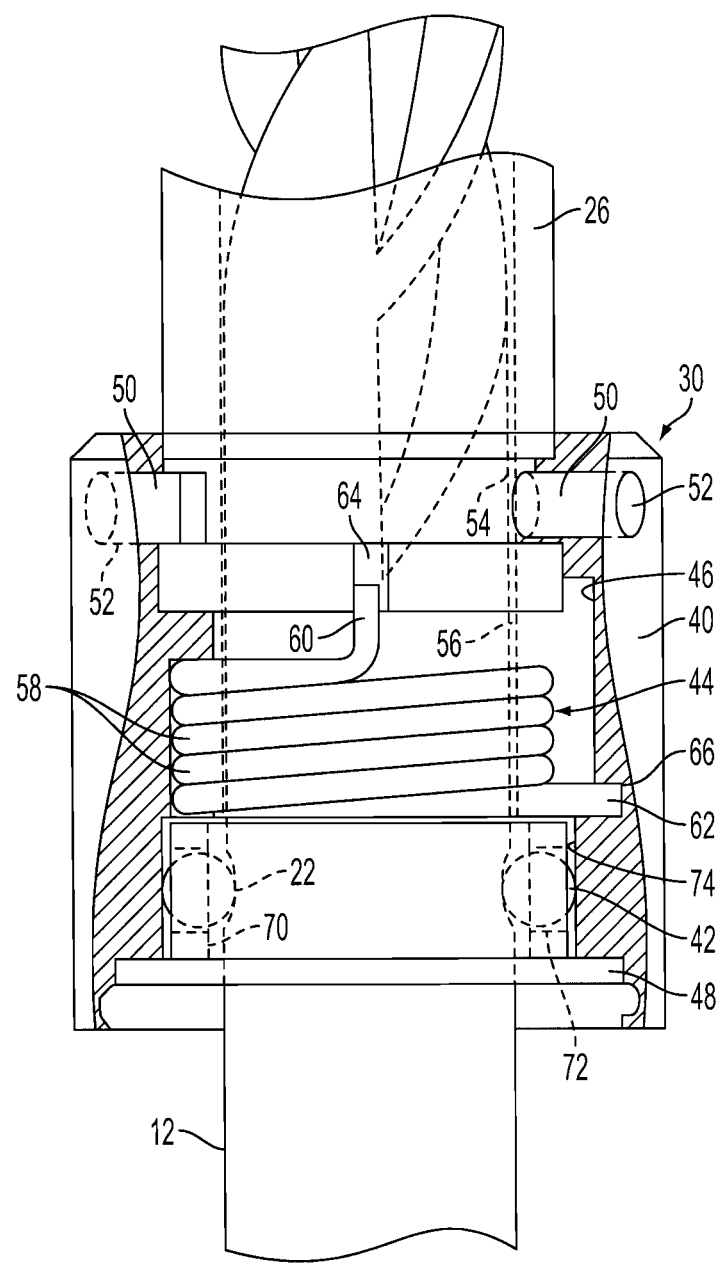
FIG. 5 is an elevation view partially in section of the depth gauge of FIG. 1.

Referring to FIGS. 3-5, the retention mechanism 30 includes an outer sleeve 40, at least one detent 42 and a biasing mechanism 44. The outer sleeve 40 includes an axial bore 46 that enables the sleeve to be positioned over the elongated body 26. An annular plate 48 is positioned at one end of the outer sleeve 40 to provide a base for the retention member 30. Fins 50 are positioned into apertures 52 in the outer sleeve 40. The pins 50 engage a groove 54 in the elongated body 26 to retain the outer sleeve 40 on the elongated body 28. Additionally, the elongated body includes a second groove 56 to receive the biasing spring 44. The biasing spring 44 is a torsional spring having a plurality of helixes 58 with a first end 60 and a second end 62. The first end 60 is received in a notch 64 in the elongated body 26. The second end 62 is received in a notch 66 in the interior surface of the outer sleeve 40. Thus, the spring 44, after rotation, to the disengaged position, rotates the outer sleeve 40 back to its original engaged position. The elongated body 26 includes an end portion 70 after the second groove 56. The end portion 70 has a diameter approximately equal to the outer diameter of the elongated body 26. A pair of apertures 72 is formed in the end portion 70. The apertures 72 receive the detents 42 as illustrated in FIG. 5.

Turning to FIGS. 3 and 4, the outer sleeve 40 includes contoured interior surface 74. The surface 74 has an overall elliptical configuration on the interior of the outer sleeve 40. The wall defining the surface 74 has two different thicknesses positioned 180° with respect to one another. Accordingly, thick surface portions 76 and thin surface portions 78 are formed in the surface 74. The thick surface portions 76 contact the detents 42 when the detents are in an engaged position in the groove 22 of the drill bit 12. This is the locked position that the spring 44 maintains the retention mechanism 30 as its original position.

Turning to FIG. 4, once the outer sleeve 40 is rotated 90°, the thin portions 78 of the outer sleeve 40 contact the detents 42 enabling the detents 42 to be removed from the apertures 72 in the elongated body 26. Thus, this enables the depth gauge 10 to be removed from the drill bit 12. After the rotational force of the user is removed, the outer sleeve 40, via spring 44, rotates back into its original position as illustrated in FIG. 3. Additionally, the outer sleeve 40 must be rotated, as illustrated in FIG. 4, in order for the depth gauge 10 to be positioned into the groove 22 of the drill bit 12.

Figure 6:
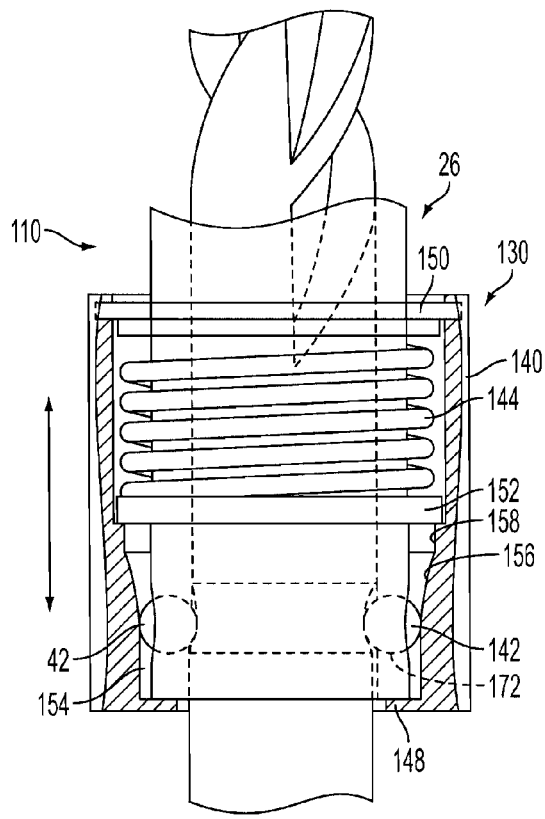
FIG. 6 is an elevation view partially in section of a second embodiment of a depth gauge for a drill bit.
Figure 7:
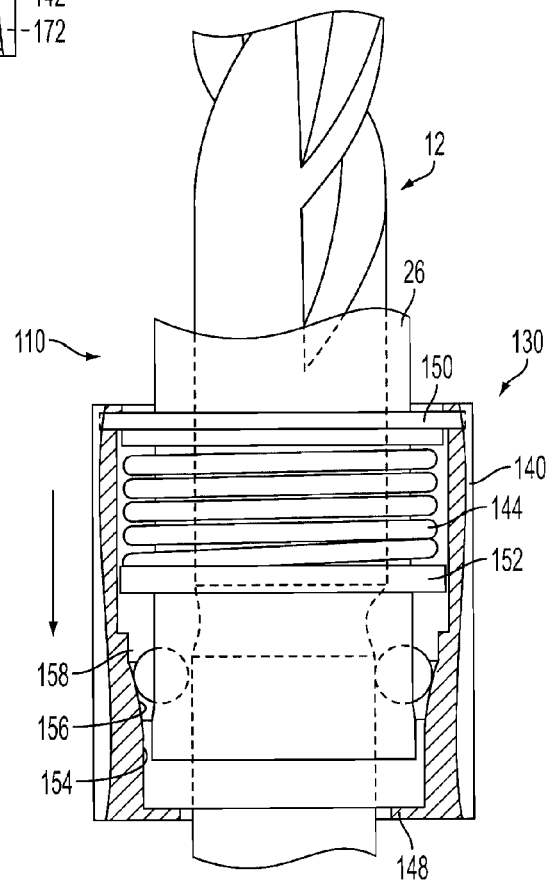
FIG. 7 is a view like FIG. 6 with the detents in a disengaged position.
Figure 8:
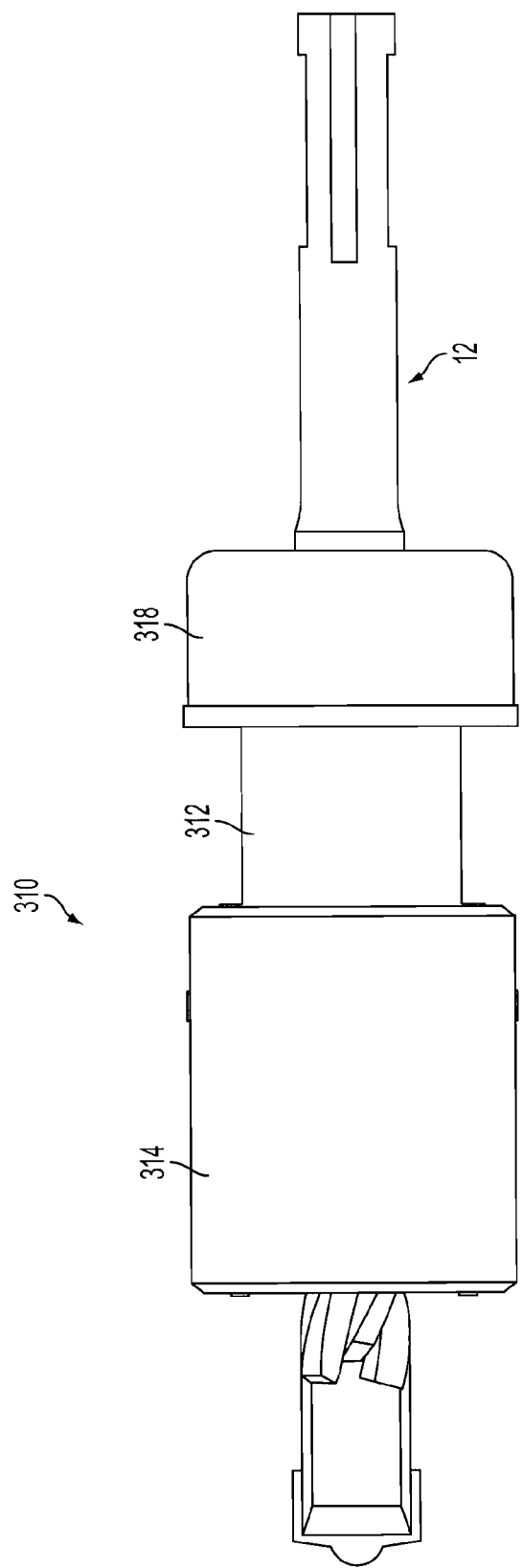
FIG. 8 is a side view of a third embodiment of a depth gauge with a drill bit.

Referring to FIGS. 6 and 7, a second embodiment of a depth gauge 110 is illustrated. The depth gauge 110 has an elongated body 126 and a cap (not shown) that are substantially the same as the elongated body 26 and cap 28, respectively, of the first embodiment of the depth gauge. The predominant difference between the first embodiment and the second embodiment is in the retention mechanism.

The retention mechanism 130 includes a sleeve 140, detent balls 142 and a biasing member 144. The sleeve 140 includes an axial bore 146 that extends through the sleeve 140. The sleeve 140 includes a flange 148, at one end, that forms the base of the sleeve 140. An annular plate 150 is maintained in the other end of the sleeve 140 providing a surface for spring 144 and closing off the sleeve 140. The elongated body 126 includes an enlarged diameter annular portion 152. The biasing member 144 is retained between the enlarged annular portion 152 and the plate 150. Thus, the sleeve 140 moves axially along the elongated body from an engaged to an disengaged position. The spring 144 holds the sleeve 140 in a normally engaged position as illustrated in FIG. 6.

The sleeve 140 is moved axially downward compressing the biasing spring 144. This enables the detent balls 142 to fall out of apertures 172 in the elongated body 126. To accomplish this, the axial bore 146 has a first diameter surface 154 with a diameter that presses the surface 154 against the balls 142 to secure them within the groove 22 of the drill bit 12. A transition surface 156, conical in shape, is outwardly tapered from the cylindrical surface 154 towards a second large cylindrical surface 158. Thus, as the sleeve 140 is moved axially downward, as illustrated in FIGS. 6 and 7, the detent balls 142 are enabled to ride along the transition surface 156 until they are positioned at the second enlarged cylindrical surface 158. At this time, the detent balls 142 are out of the apertures 172 in the elongated body 126 enabling the depth gauge 10 to be removed from the drill bit 12. After the axial force is removed, the biasing spring 144 returns the sleeve 140 to its original engaged position. Thus, the sleeve 140 must be moved axially downward to enable the depth gauge to be replaced onto the drill bit.

Referring to FIGS. 8-12, a third embodiment of a depth gauge 310 is configured to be removably attached to the drill bit 12. The depth gauge 310 has an elongated body 312, a cap 314 reversibly coupled to a front portion 315 of the body 312 (as described below), and a retention mechanism 318 coupled to a rear portion 316 of the body 312. The body 312 also has an intermediate portion 320 disposed between the front portion 315 and the rear portion 316, and defines a first throughbore 322 that receives the drill bit 12 therethrough.

The cap 314 has a first contacting end 332 and a second contacting end 334 and a second throughbore 336 configured to receive the drill bit therethrough. The inner wall of the second throughbore 336 has a projection 338. Disposed within the projection 338 is a pair of balls 344 and a pair of springs 346 that bias the balls 344 radially inwardly to engage with the front portion 315 of the body 312, to enhance the connection between the body 312 and the caps 314. The projection 338 also defines a second shoulder 340 and a third shoulder 342 in the second throughbore 336.

Figure 9:
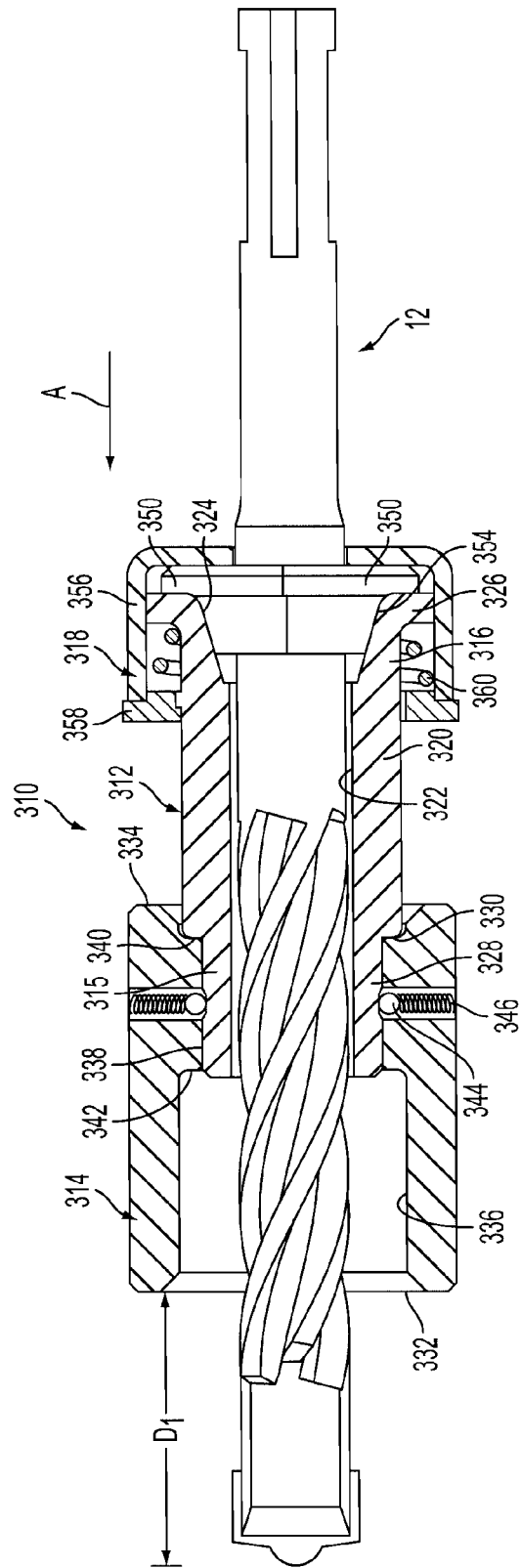
FIG. 9 is a cross-sectional view of the depth gauge of FIG. 8 with the front cap in a first orientation.
Figure 10:
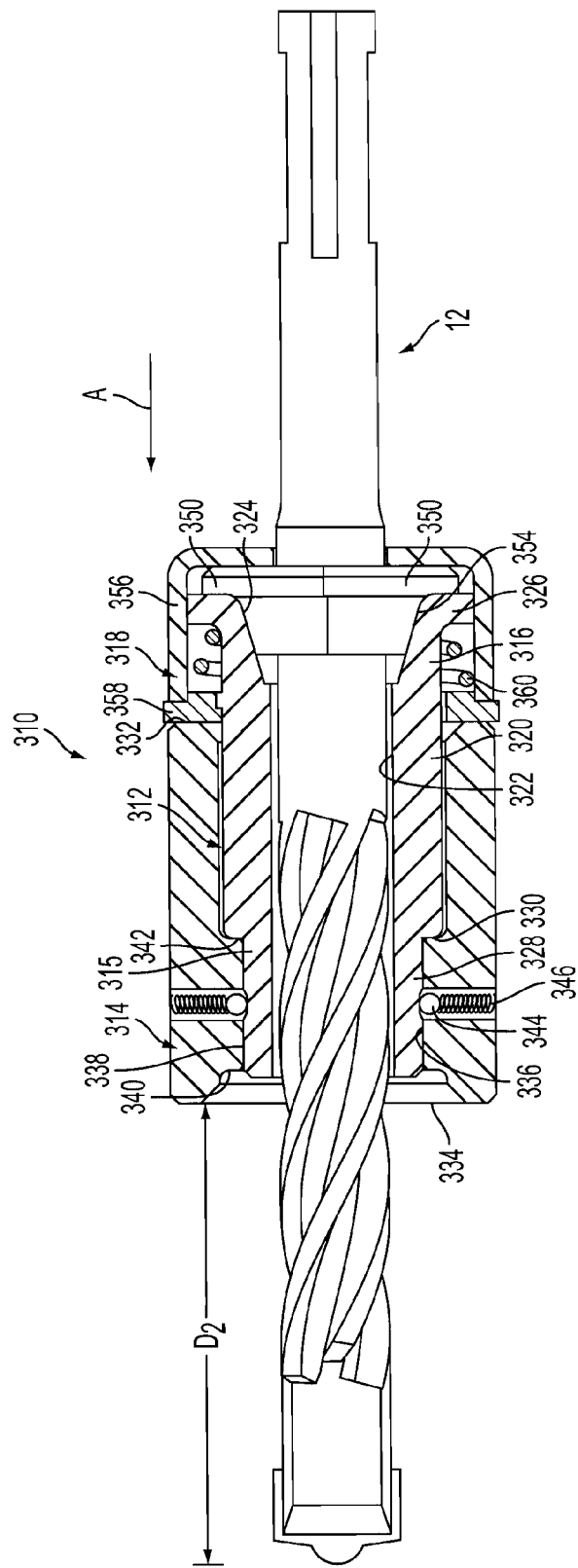
FIG. 10, is a cross-sectional view of the depth gauge of FIG. 8 with the front cap in a second, reversed orientation.

Referring to FIGS. 9 and 10, the cap 314 is reversibly attachable to the body 312 so that two different drilling depths can be achieved. When the cap 314 is in a first orientation, as shown in FIG. 9, the second shoulder 340 of the cap 314 abuts against the first shoulder 330 of the body 312 and the first contacting end 332 will abut against the workpiece to limit the amount of penetration of the drill bit 12 into the workpiece to a first depth D1. When the cap 314 is in a second orientation, as shown in FIG. 10, the third shoulder 342 of the cap 314 abuts against the first shoulder 330 of the body 312 and the second contacting end 334 will abut against the workpiece to limit the amount of penetration of the drill bit 12 into the workpiece to a second, larger depth D2. Therefore, the depth gauge 310 can be used with anchors having two different lengths.

Figure 11:
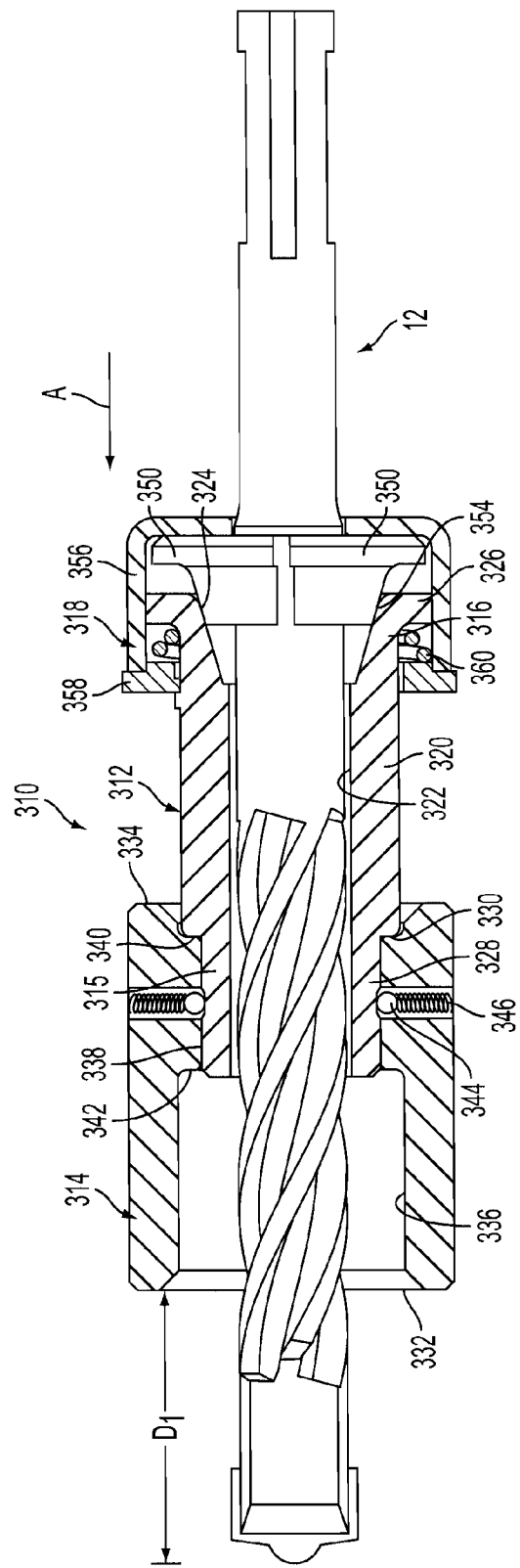
FIG. 11 is a cross-sectional view of the third embodiment of the depth gauge with the actuator activated to remove the drill bit from the depth gauge.

Referring to FIGS. 9 and 11, the retention mechanism 318 is coupled to the rear portion 316 of the body to removably couple the body 312 to the annular recess 22 in the drill bit. The first throughbore 322 includes a first ramped surface 324 in the rear portion 316 of the body 312 that flares radially outwardly. An annular flange 326 extends radially outwardly from the rear portion 316 of the body 312. The front portion 315 of the body 312 has an outer wall 328 defining a first shoulder 330 disposed at the juncture between the front portion 315 and the intermediate portion 312. The retention mechanism 318 includes a set of jaws 350 (e.g., three jaws), each having a flat inner surface 352 that engages the annular recess 22, and an outer surface or ramp 354 with an incline that matches the incline in the ramped surface 324 of the body 312. The ramp 354 slides against the ramped surface 324 such that axial movement of the jaws 350 causes the jaws to move radially outwardly. An actuation member in the form of a sleeve 356 surrounds the jaws 350 and the rear portion 316 of the body 312 and is slidable axially relative to the body 312. The sleeve 356 is coupled to the rear portion 316 of the body 312 by an annular clip 358. A spring 360 is disposed between the clip 358 and the flange 326 of the body 312.

As shown in FIG. 9, in the locked position, the spring 360 biases the sleeve 356 axially forward in the direction of arrow A. This in turn forces the jaws 350 radially inwardly to engage the annular groove 22 in the drill bit 12, thus locking the drill bit 12 to the depth gauge 310. As shown in FIG. 11, to remove the drill bit 12 from the depth gauge 310 in an unlocked position, the actuation member 356 is pulled rearward in a direction opposite to arrow A. This causes the jaws 350 to move radially outwardly from the annular groove 22 in the drill bit 12, thus enabling the drill bit 12 to be removed from the depth gauge 310. Thus, the depth gauge 310, like depth gauges 10 and 110 described above, enable tool-free removal from the drill bit 12.

Referring to FIGS. 12-20C, a fourth embodiment of a depth gauge 410 is configured to be removably attached to the drill bit 12. The depth gauge 410 has an elongated body 412, a cap 414 reversibly coupled to a front portion 415 of the body 412 (as described below), and a retention mechanism 418 coupled to a rear portion 416 of the body 412 to removably attach the body 412 to the drill bit 12 (as described below). The body 412 also has an intermediate portion 420 disposed between the front portion 415 and the rear portion 416, and defines a first throughbore 422 that receives the drill bit 12 therethrough, such that the drill bit is permitted to rotate relative to the body 412.

Referring to FIGS. 12-15, the cap 414 is reversibly attachable to the body 412 so that two different drilling depths can be achieved. The front portion 415 of the body 412 has an outer wall 428 defining a first shoulder 430. The cap 414 has a first contacting end 432 and a second contacting end 434 and a second throughbore 436 configured to receive the drill bit 12 therethrough. The inner wall of the second throughbore 436 defines a second shoulder 440 and a third shoulder 442 in the second throughbore 436.

Figure 12:
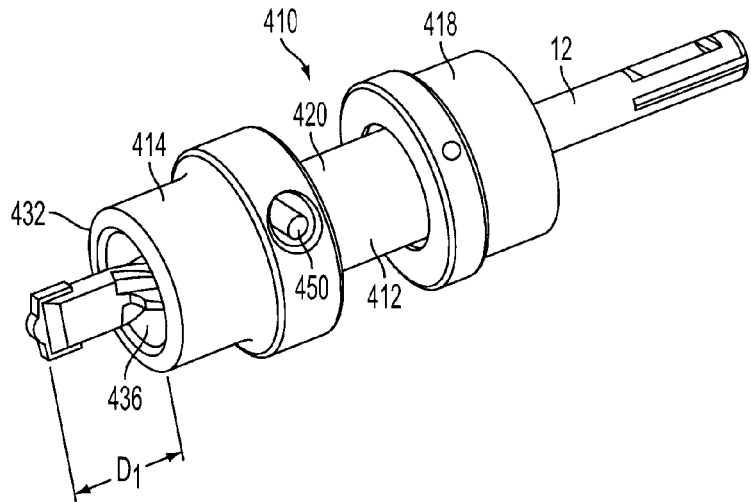
FIG. 12 is a perspective view of a fourth embodiment of a depth gauge with a drill bit, showing the front cap in a first orientation.
Figure 13:
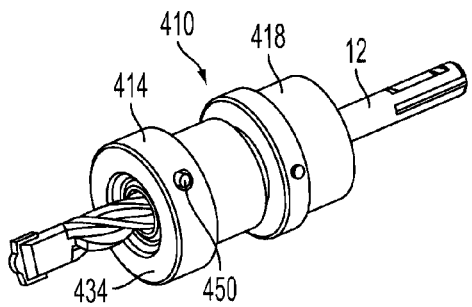
FIG. 13 is a perspective view of the fourth embodiment of the depth gauge with the front cap in a second orientation.
Figure 14:
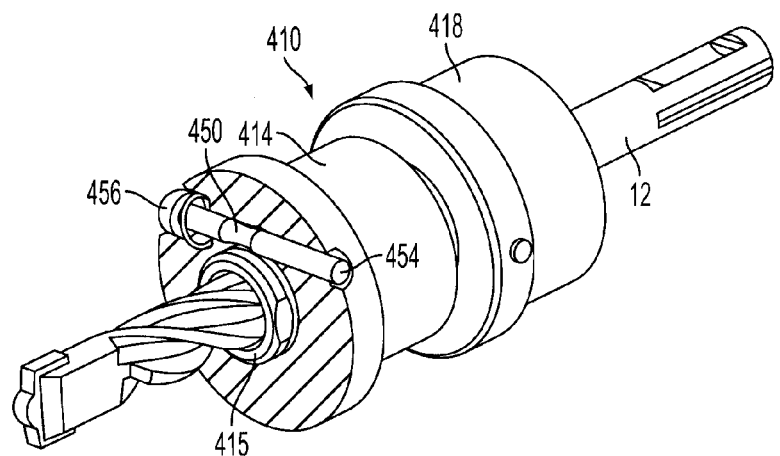
FIG. 14 is a perspective view, partially in cross-section, of the fourth embodiment of the depth gauge.
Figure 15:
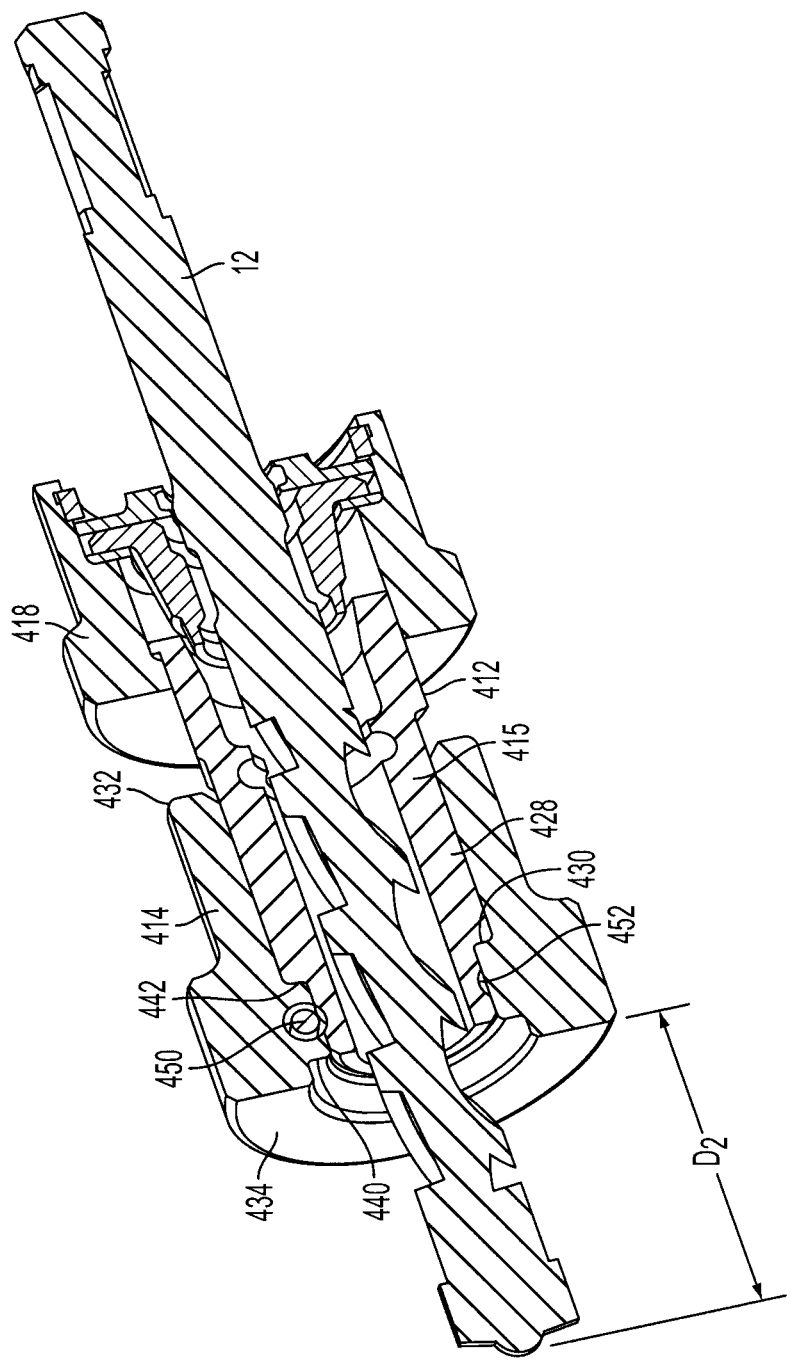
Figure 16:
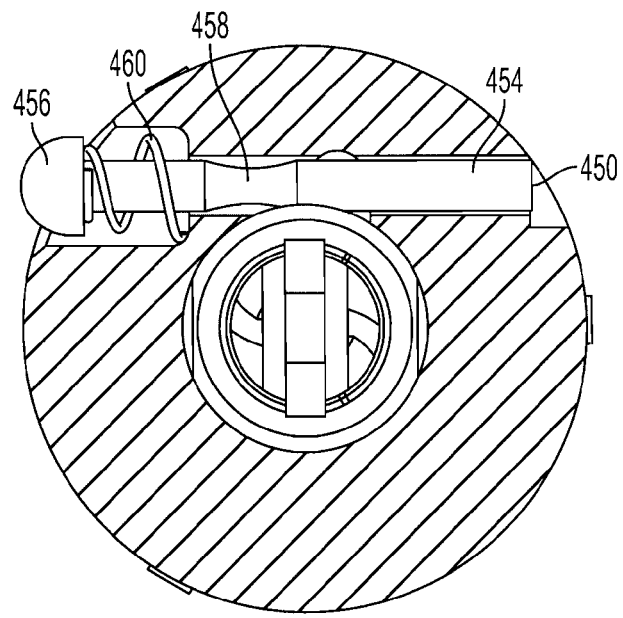
FIG. 16 is a cross-sectional view of the front cap of the fourth embodiment of the depth gauge in the locked position.

When the cap 414 is in a first orientation, as shown in FIG. 12, the second shoulder 440 of the cap 414 abuts against the first shoulder 430 of the body 412 and the first contacting end 432 will abut against the workpiece to limit the amount of penetration of the drill bit 12 into the workpiece to a first depth D1. When the cap 414 is in a second orientation, as shown in FIGS. 13 and 15, the third shoulder 442 of the cap 414 abuts against the first shoulder 430 of the body 412 and the second contacting end 434 will abut against the workpiece to limit the amount of penetration of the drill bit 12 into the workpiece to a second, larger depth D2. Therefore, the depth gauge 410 can be used with anchors having two different lengths.

Figure 17:
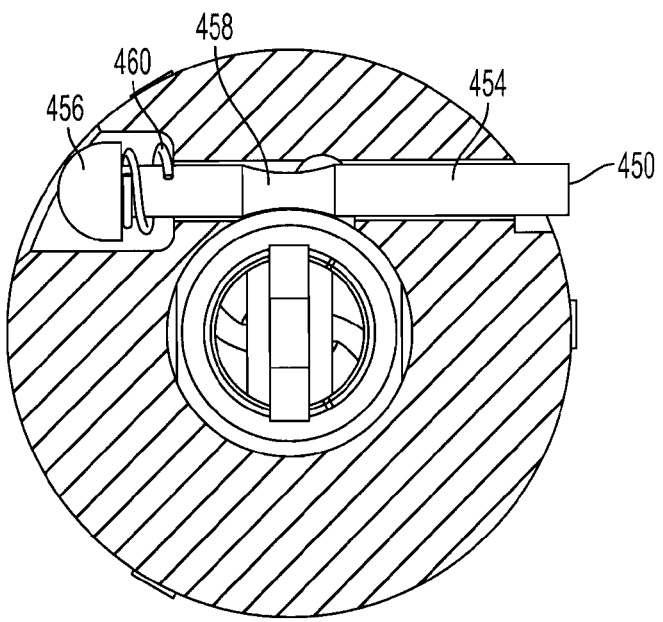
FIG. 17 is a cross-sectional view of the front cap of the fourth embodiment of the depth gauge in the unlocked position.

Referring to FIGS. 14-17, the cap 414 can be reversibly locked to the body 412 in either orientation by a locking pin 450 disposed in the cap 414 transverse to the axis of the drill bit 12. The pin 450 has a shaft 454, a head 456 coupled to the shaft 454, and a first annular groove 458 defined in a portion of the shaft 454. The pin is biased by a small compression spring 460 toward the locked position shown in FIG. 16. The body 412 includes a second annular groove 452 that receives the shaft 454 of the pin 450 when the pin 450 is in the locked position to inhibit removal of the cap 414 from the body 412. When the pin 450 is depressed against the force of the spring 460 to the unlocked position, as shown in FIG. 17, the first annular groove 458 of the pin becomes aligned with the outer surface of the body 412 such that the shaft 454 to provide clearance between the shaft 454 of the pin 450 and the body 412, enabling the cap 414 to be removed from the body 414. Because the pin 450 is located on the cap 414 midway between the second shoulder 440 and third shoulder 442, the pin 450 can lock the cap 414 to the body 412 in either orientation of the cap 414 relative to the body 412.

Figure 18A:
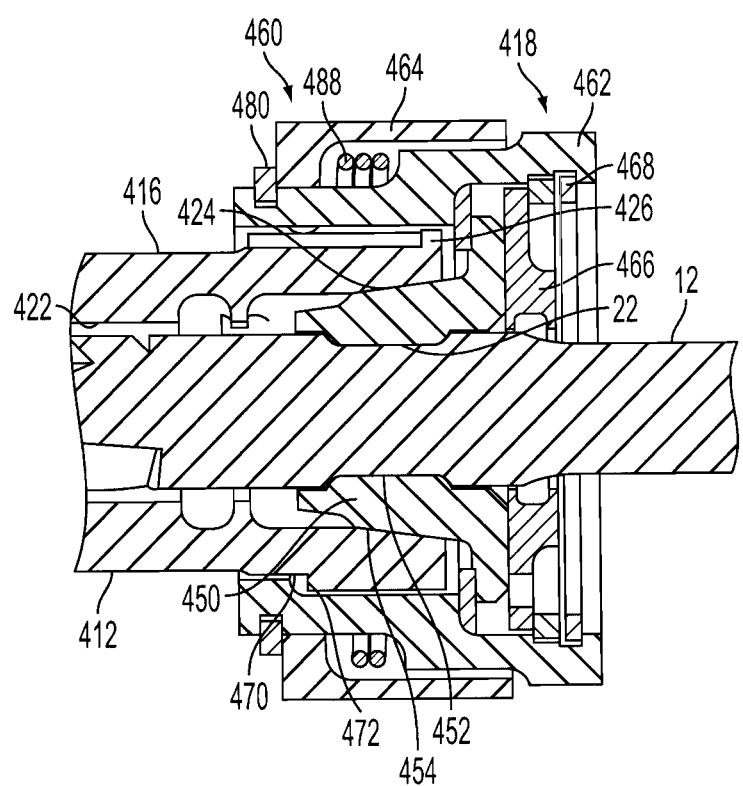
FIGS. 18A-18C are axial cross-section, radial cross-section, and perspective views of the retention mechanism of the fourth embodiment of the depth gauge in a locked position.

Referring to FIGS. 18A-21C, the retention mechanism 418 is coupled to the rear portion 416 of the body 412 to removably couple the body 412 to the annular recess 22 in the drill bit 12. The first throughbore 422 includes a first ramped surface 424 in the rear portion 416 of the body 412 that flares radially outwardly. An annular flange 426 extends radially outwardly from the rear portion 416 of the body 412. The retention mechanism 418 includes a set of jaws 450 (e.g., three jaws), each having a flat inner surface 452 that engages the annular recess 22, and an outer surface or ramp 454 with an incline that matches the incline in the ramped surface 424 of the body 412. The ramp 454 slides against the ramped surface 424 such that axial movement of the jaws 450 causes the jaws to move radially outwardly from a locked position as shown in FIG. 18A and an unlocked position as shown in FIG. 21A. The body also defines a plurality of flats 413 (as shown in FIG. 18B), the function of which will be apparent from the description below.

Surrounding the jaws 450 is an actuation member 460 having a supplemental locking mechanism as described below. The actuation member 460 has an inner sleeve 462 and an outer sleeve 464. The inner sleeve 462 is axially coupled to the body 412 at the rear end of the inner sleeve 462 by a washer 466 and a circ clip 468 and at the front end of inner sleeve 462 by a shoulder 470 that abuts against a locking step 472 defined in the outer surface of the body 412. The inner sleeve 462 also includes a pocket 474 that receives a ball 476. Projecting radially outwardly from the inner sleeve 462 is a radial pin 478.

The outer sleeve 464 generally surrounds the inner sleeve 462 and is axially coupled thereto by a circ clip 480. An inner wall 482 of the outer sleeve 462 includes a pocket 484 that is configured to receive the ball 476 when the actuation member 460 is being unlocked, and includes a recess 486 that receives the radial pin 478 to limit rotational travel of the outer sleeve 464 relative to the inner sleeve 462. The outer sleeve 464 is also coupled to the inner sleeve 462 by a torsion spring 488 that biases the outer sleeve 464 and inner sleeve 462 toward the locked position.

Figure 18B:
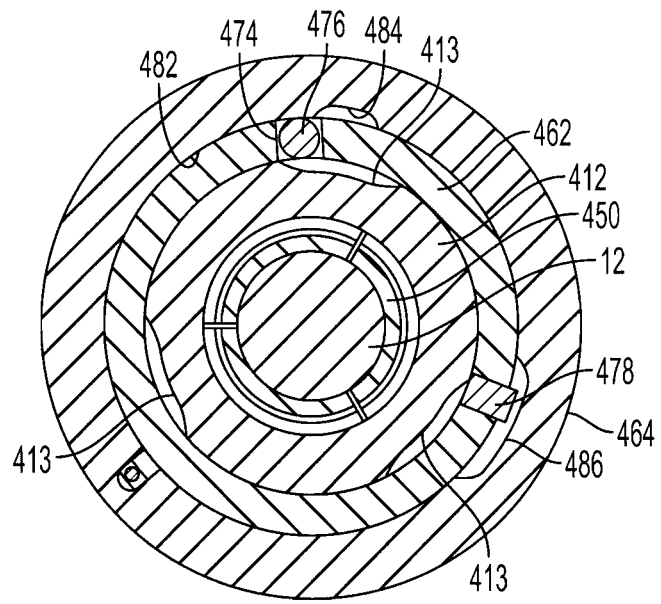
Figure 18C:
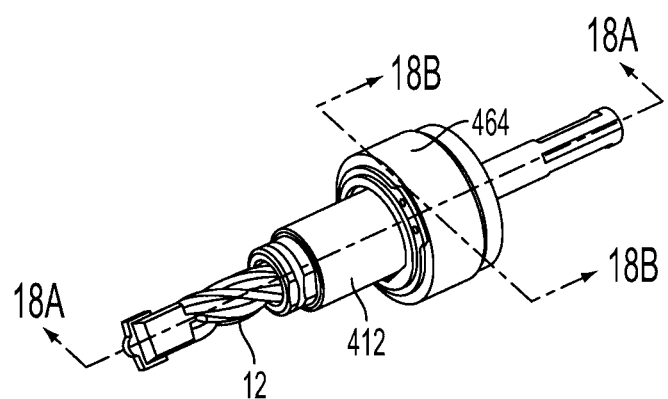
Figure 19A:
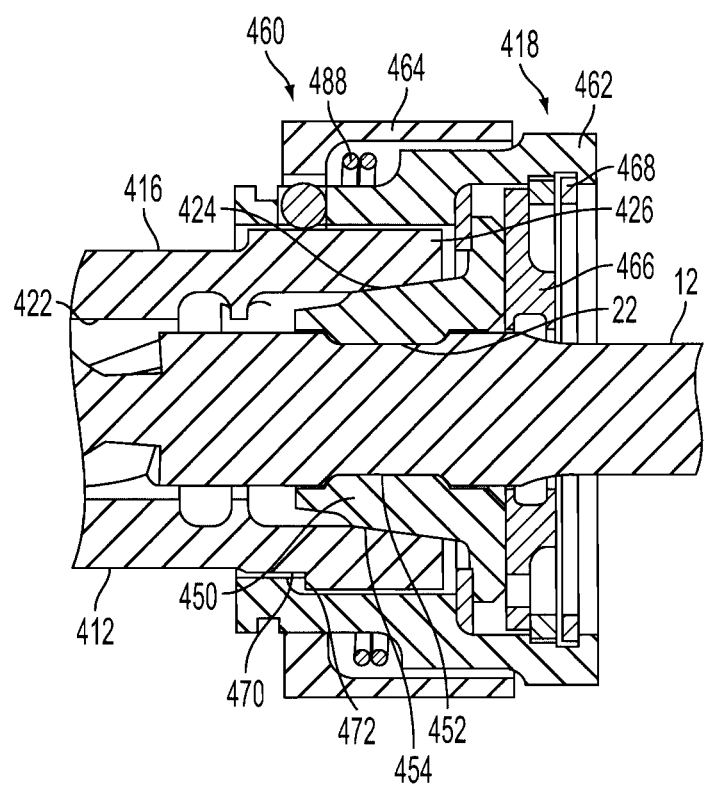
FIGS. 19A-19C are axial cross-section, radial cross-section, and perspective views of the retention mechanism of the fourth embodiment of the depth gauge in a partially unlocked position.
Figure 19B:
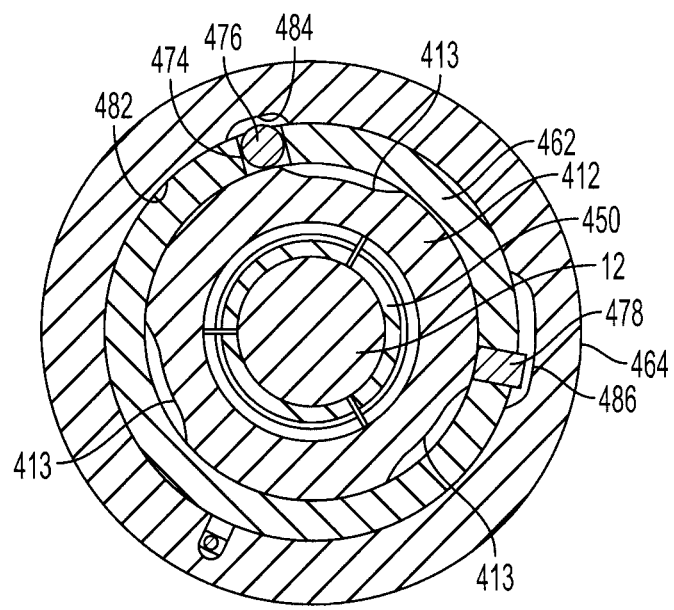
Figure 19C:
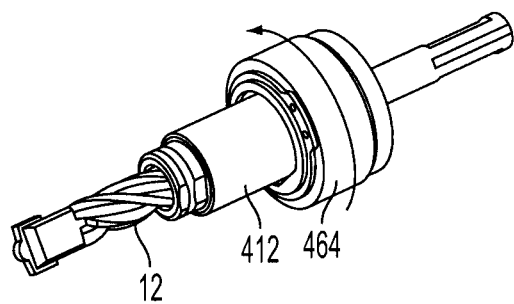
Figure 20A:
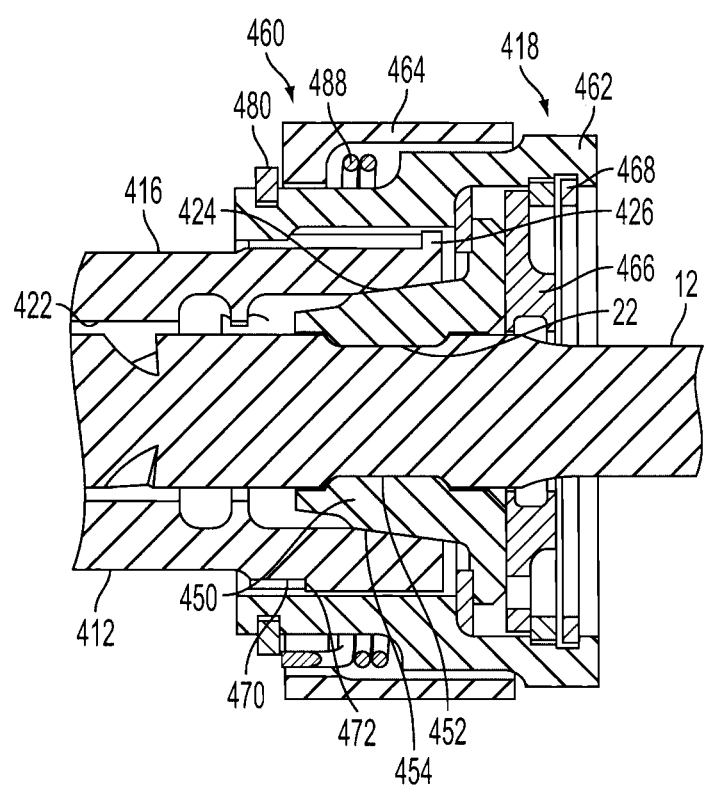
FIGS. 20A-20C are axial cross-section, radial cross-section, and perspective views of the retention mechanism of the fourth embodiment of the depth gauge in a fully unlocked position.
Figure 20B:
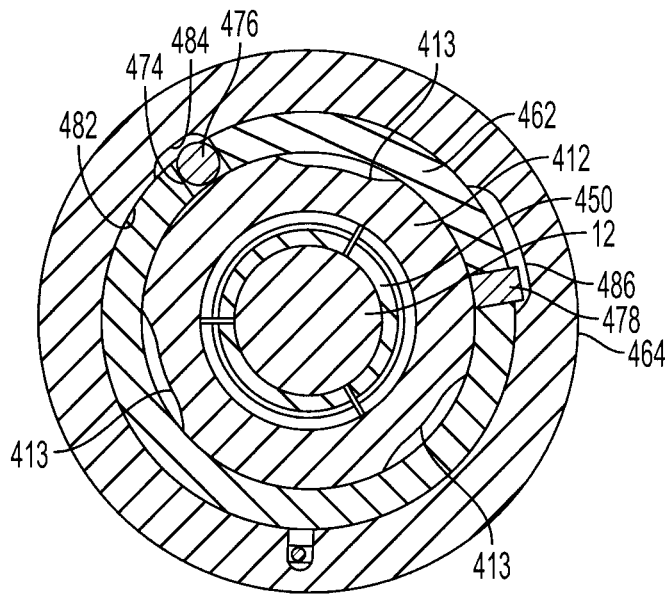
Figure 20C:
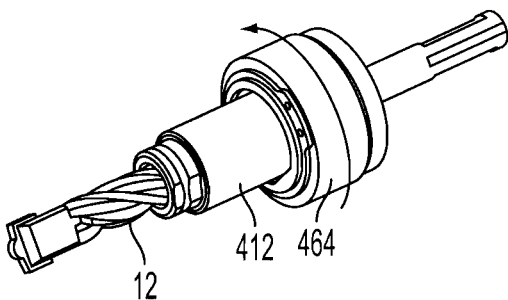
Figure 21A:
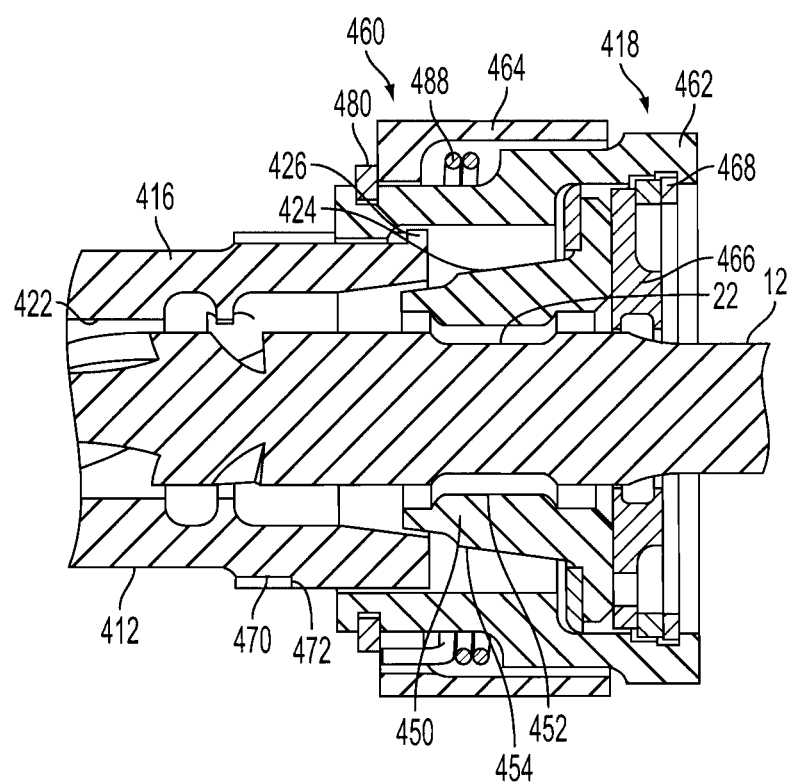
FIGS. 21A-21C are axial cross-section, radial cross-section, and perspective views of the retention mechanism of the fourth embodiment of the depth gauge in the fully unlocked position with the drill bit being removed.
Figure 21B:
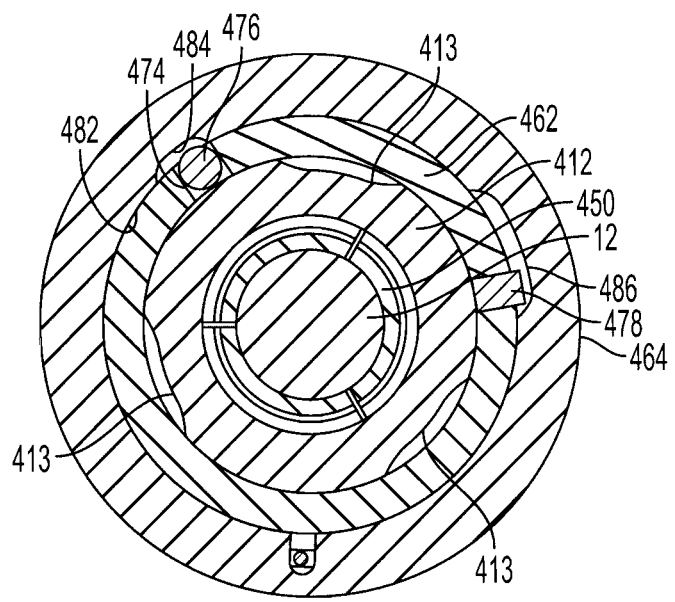
Figure 21C:
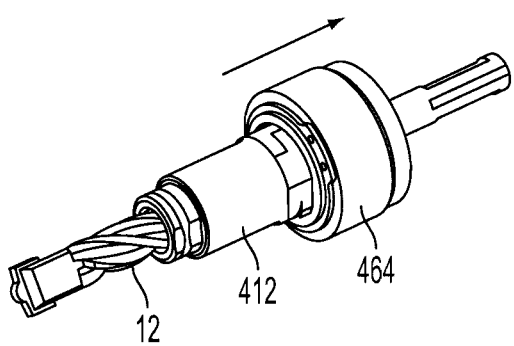

When in the locked position, as shown in FIGS. 18A-18C, the ball 476 is clamped between the outer wall of the body 412 and the inner wall of the outer sleeve 464, while the shoulder 470 on the inner sleeve 462 abuts against the locking step 472 on the body 412 to prevent rearward axial movement of the inner sleeve 462 relative to the body 412. This keeps the jaws 450 firmly engaged against the annular groove 22 in the drill bit 12. As shown in FIGS. 19A-19C, to initially unlock the retention mechanism 418 from the drill bit 12, the outer sleeve 464 is rotated counterclockwise relative to the inner sleeve 462 against the force of the torsion spring 488, allowing the ball 476 to drop into the pocket 484 in the outer sleeve. As shown in FIGS. 20A-20C, the radial pin 478 then abuts against an edge of the recess 486 in the outer sleeve 464, enabling the outer sleeve 464 and inner sleeve 462 to rotate together counterclockwise such that the shoulder 470 on the inner sleeve 462 is now aligned with one of the flats 413 of the body 412 instead of the locking step 472 in the body 412. This now enables axial movement of the inner sleeve 462 relative to the body 412. As shown in FIGS. 21A-21C, the inner and outer sleeves 462 and 464 can now be pulled axially rearward to enable the jaws 450 to disengage from the drill bit 12, enabling tool-free removal of the drill bit 12 from the depth gauge 410.

Referring to FIGS. 22A-24C, a fifth embodiment of a depth gauge 510 is configured to be removably attached to the drill bit 12. The depth gauge 510 has an elongated body 512 and a retention mechanism 518 coupled to a rear portion 516 of the body 512 to removably attach the body 512 to the drill bit 12 (as described below). The body 512 also has an intermediate portion 520 disposed between the front portion 515 and the rear portion 516, and defines a first throughbore 522 that receives the drill bit 12 therethrough, such that the drill bit is permitted to rotate relative to the body 412. A cap, such as the cap 414 described above with respect to the fourth embodiment, can be reversibly coupled to a front portion 515 of the body 512 to enable two different drilling depths.

Figure 22A:
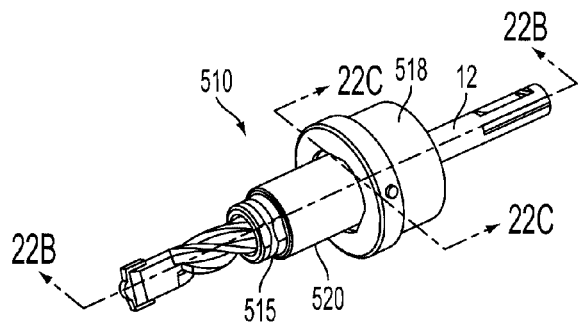
FIGS. 22A-22C are perspective, axial cross-section, and radial cross-section views of a fifth embodiment of the depth gauge in a locked position, with the front cap removed.
Figure 22B:
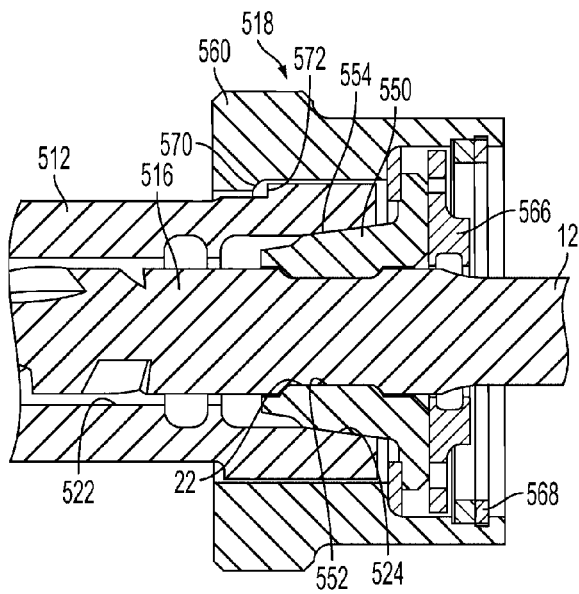
Figure 22C:
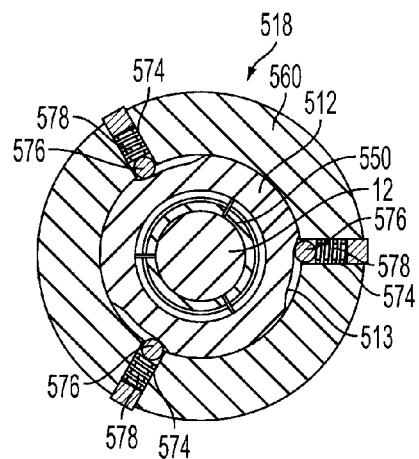
Figure 23A:
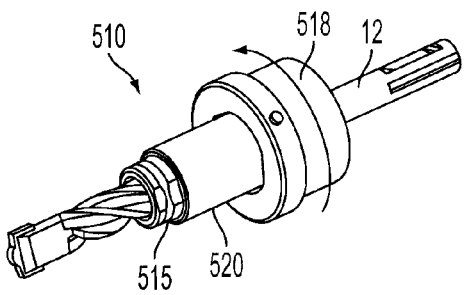
FIGS. 23A-23C are perspective, axial cross-section, and radial cross-section views of the fifth embodiment of the depth gauge in an unlocked position.

The retention mechanism 518 is coupled to the rear portion 516 of the body 512 to removably couple the body 512 to the annular recess 22 in the drill bit 12. The first throughbore 522 includes a first ramped surface 524 in the rear portion 516 of the body 512 that flares radially outwardly. The retention mechanism 518 includes a set of jaws 550 (e.g., three jaws), each having a flat inner surface 552 that engages the annular recess 22, and an outer surface or ramp 554 with an incline that matches the incline in the ramped surface 524 of the body 512. The ramp 554 slides against the ramped surface 524 such that axial movement of the jaws 550 causes the jaws to move radially outwardly from a locked position as shown in FIGS. 22A-22C and an unlocked position as shown in FIGS. 23A-22C. The body also defines a plurality of flats 513 (as shown in FIG. 22C), the function of which will be apparent from the description below.

Surrounding the jaws 550 is an actuation member, in the form of a sleeve 560, having a supplemental locking mechanism as described below. The sleeve 560 is axially coupled to the body 512 at the rear end of the sleeve 560 by a washer 566 and a circ clip 568 and at the front end of sleeve 560 by a shoulder 570 that abuts against a locking step 572 defined in the outer surface of the body 512. The sleeve 560 also includes a three radial bores 574, each of which receives a ball 576 and a radial compression spring 578 that biases the ball radially inwardly.

Figure 23B:
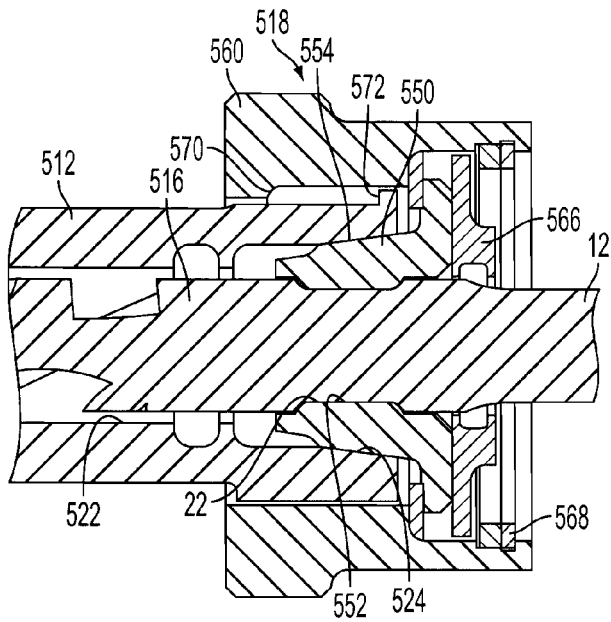
Figure 23C:
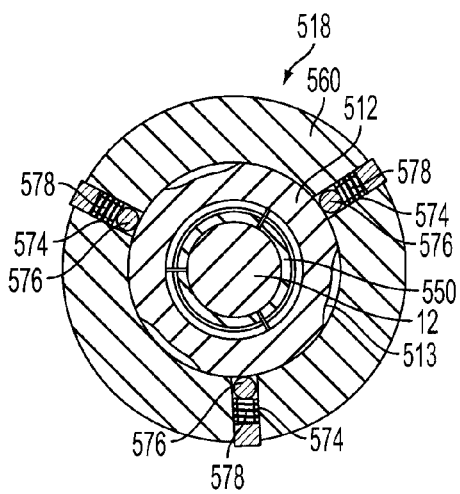
Figure 24A:
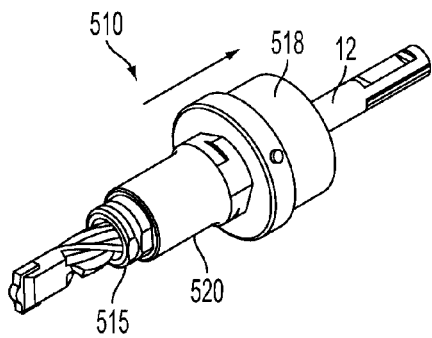
FIGS. 24A-24C are perspective, axial cross-section, and radial cross-section views of the fifth embodiment of the depth gauge being removed from the drill bit.
Figure 24B:
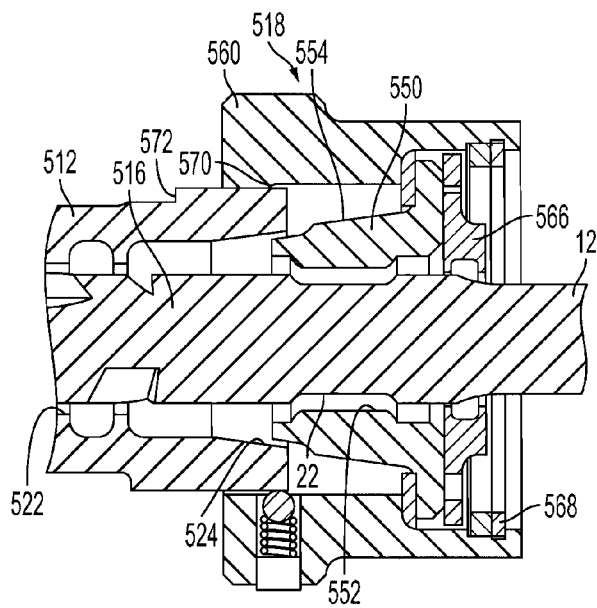
Figure 24C:
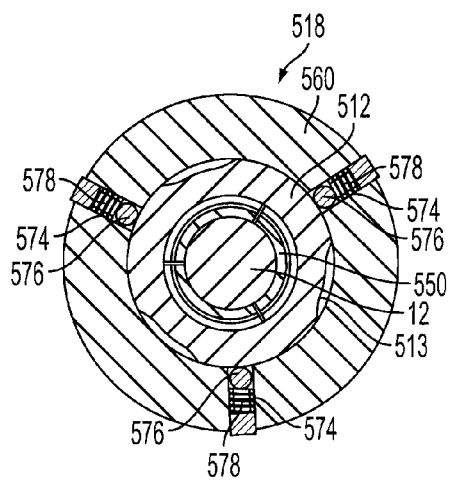

When in the locked position, as shown in FIGS. 22A-22C, the balls 576 engage the flats 513, while the shoulder 570 on the sleeve 560 abuts against the locking step 572 on the body 512 to prevent rearward axial movement of the sleeve 560 relative to the body 512. This keeps the jaws 550 firmly engaged against the annular groove 22 in the drill bit 12. As shown in FIGS. 23A-23C, to initially unlock the retention mechanism 518 from the drill bit 12, the sleeve 560 is rotated counterclockwise, forcing the balls 576 radially outward, and causing the shoulder 570 on the sleeve 560 to be aligned with one of the flats 513 of the body 512 instead of the locking step 572 in the body 512. This now enables axial movement of the sleeve 560 relative to the body 512. As shown in FIGS. 24A-24C, the sleeve 560 can now be pulled axially rearward to enable the jaws 550 to disengage from the drill bit 12, enabling tool-free removal of the drill bit 12 from the depth gauge 510.

Referring to FIGS. 25A-26B, a sixth embodiment of a depth gauge 610 is configured to be removably attached to the drill bit 12. The depth gauge 610 has an elongated body 612 that is longitudinally split into two halves, a first half 614 and a second half 616, and a retention mechanism 618 coupled to a rear portion 617 of the body 612 to removably attach the body 612 to the drill bit 12 (as described below). The body 612 also has an intermediate portion 620 disposed between the front portion 615 and the rear portion 616, and defines a throughbore 622 that receives the drill bit 12 therethrough, such that the drill bit is permitted to rotate relative to the body 612. A cap, such as the cap 414 described above with respect to the fourth embodiment, can be reversibly coupled to a front portion 615 of the body 612 to enable two different drilling depths.

Figure 25B:
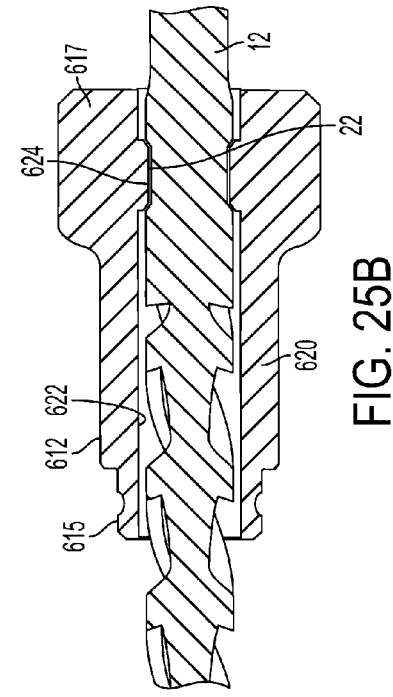
FIGS. 25A-25B are perspective and axial cross-section views of a sixth embodiment of the depth gauge in a locked position, with the front cap removed.
Figure 26B:
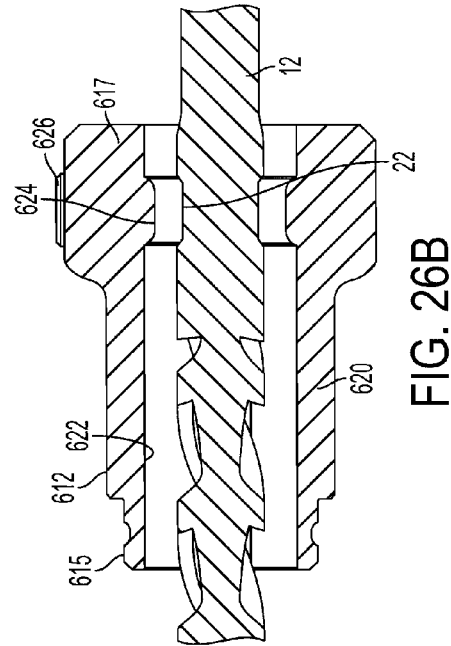
FIGS. 26A-26B are perspective and axial cross-section views of the sixth embodiment of the depth gauge in an unlocked position.
Figure 25A:
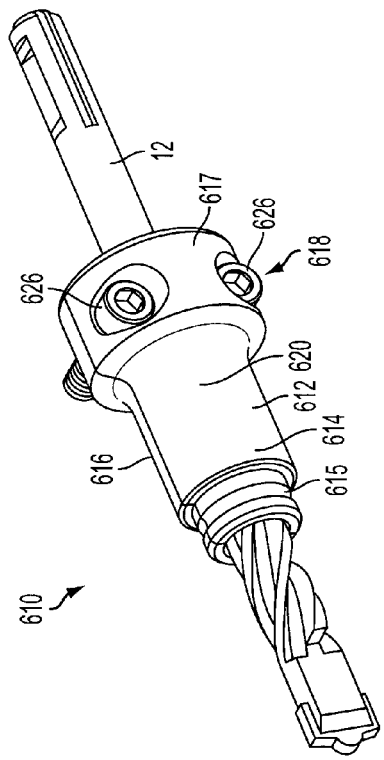
Figure 26A:
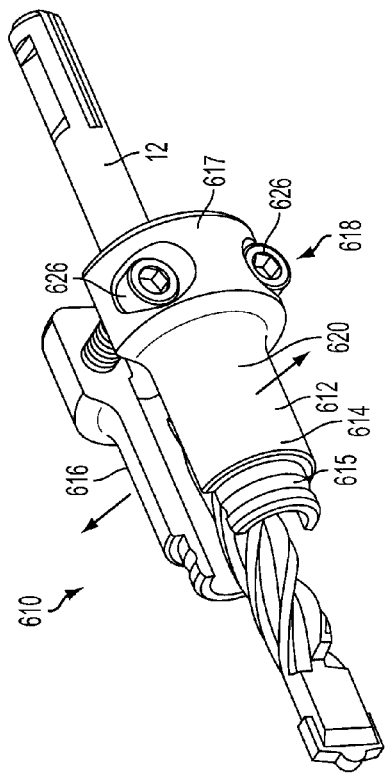

The retention mechanism 618 is coupled to the rear portion 616 of the body 612 to removably couple the body 612 to the annular recess 22 in the drill bit 12. The throughbore 622 includes an annular shoulder 624 that extends radially inwardly to engage the annular recess 22 in the drill bit 12. The retention mechanism 618 includes a pair of set screws 626 that connect the two halves 614, 616 of the body 612. As shown in FIGS. 25A-25B, when the set screws 626 are tightened, the two halves 614, 616 of the body 612 are closely engaged, causing the annular shoulder 624 to engage the annular recess 22 in the drill bit. As shown in FIGS. 26A-26B, when the set screws 626 are loosened, the two halves 614, 616 of the body 612 are able to separate, enabling removal of the drill bit 12 from the body 612.

Referring to FIGS. 27A-30B, a seventh embodiment of a depth gauge 710 is configured to be removably attached to the drill bit 12. The depth gauge 710 has an elongated body 712 split longitudinally into two halves 713 and 715, a cap 714 reversibly coupled to a front portion 717 of the body 712 (as described below), and a retention mechanism 718 coupled to a rear portion 716 of the body 712 to removably attach the body 712 to the drill bit 12 (as described below). The body 712 also has an intermediate portion 720 disposed between the front portion 717 and the rear portion 716, and defines a first throughbore 722 that receives the drill bit 12 therethrough, such that the drill bit is permitted to rotate relative to the body 712.

The cap 714 is reversibly attachable to the body 712 so that two different drilling depths can be achieved. The front portion 717 of the body 712 has a threaded exterior surface 719 and a forward face 730. The cap 714 has a first contacting end 732 and a second contacting end 734 and a second throughbore 736 configured to receive the drill bit 12 therethrough. The inner wall of the second throughbore 736 defines a shoulder 740 having a front face 741 and a rear face 742. In front of the front face 741, the second throughbore has a first interior threaded surface 745, and behind the rear face 742, the second throughbore has a second interior threaded surface 747.

Figure 27A:
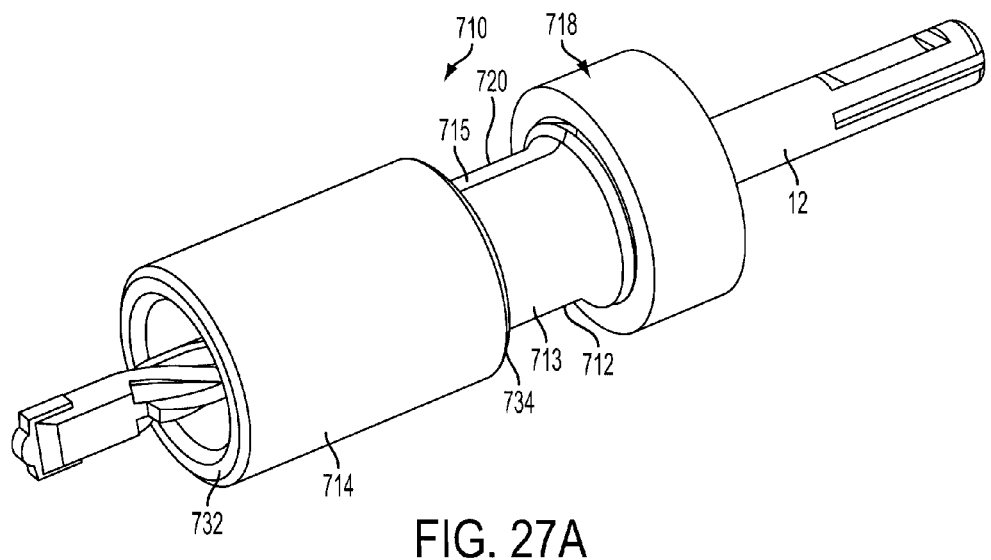
FIGS. 27A-27B are perspective and axial cross-section views of a seventh embodiment of a depth gauge with a front cap in a first orientation.
Figure 27B:
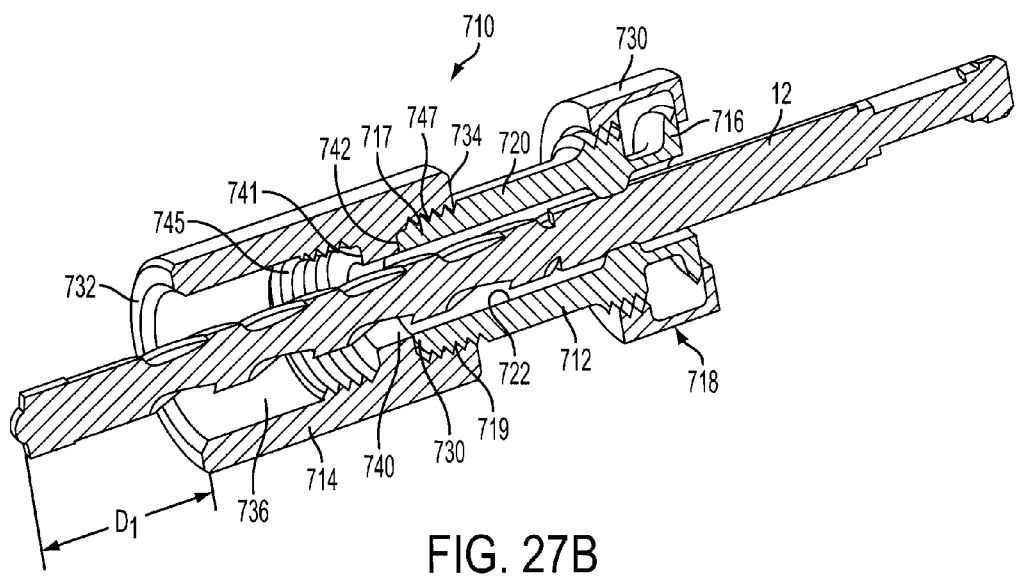
Figure 28A:
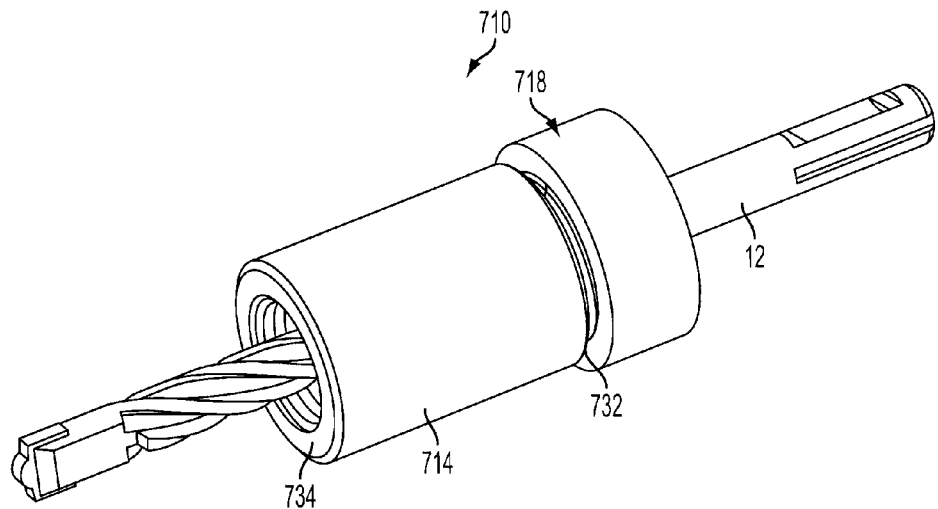
FIGS. 28A-28B are perspective and axial cross-section views of the seventh embodiment of the depth gauge with the front cap in a second orientation.
Figure 28B:
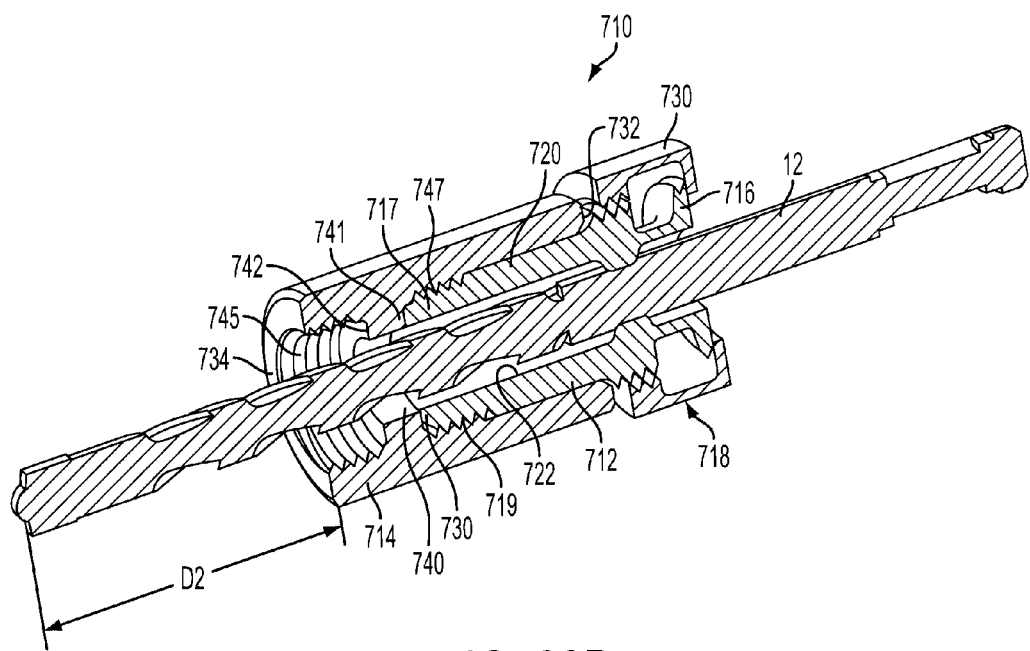

When the cap 714 is in a first orientation, as shown in FIGS. 27A-27B, the second interior threaded surface 747 is threaded to the threaded exterior surface 719, and the rear face 742 of the shoulder 740 of the cap 714 abuts against the front face 730 of the body 712, such that the first contacting end 732 will abut against the workpiece to limit the amount of penetration of the drill bit 12 into the workpiece to a first depth D1. When the cap 714 is in the second orientation, as shown in FIGS. 28A-28B, the first interior threaded surface 745 is threaded to the threaded exterior surface 719, and the front face 741 of the shoulder 740 of the cap 714 abuts against the front face 730 of the body 712, such that the second contacting end 734 will abut against the workpiece to limit the amount of penetration of the drill bit 12 into the workpiece to a second depth D2. Therefore, the depth gauge 710 can be used with anchors having two different lengths.

Figure 29A:
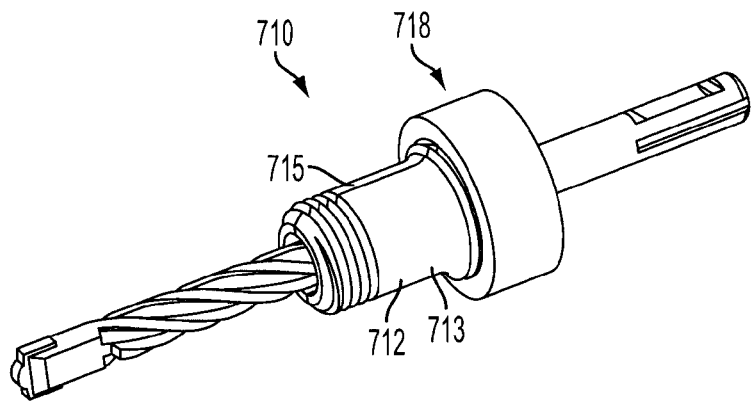
FIGS. 29A-29B are perspective and axial cross-section views of the seventh embodiment of the depth gauge in a locked position.

Referring to FIGS. 29A-30B, the retention mechanism 718 is coupled to the rear portion 716 of the body 712 to removably couple the body 712 to the annular recess 22 in the drill bit 12. The rear portion 716 of each half 713, 715 of the body 712 includes a shoulder 724 that projects radially inwardly to engage the annular recess 22 in the drill bit, when in the locked position (as shown in FIGS. 29A and 29B). An external threaded portion 726 is disposed on the exterior surface of the rear portion 716 of the body 712, and an outwardly projecting flange 728 extends radially outwardly from the rear end of the body 712. A recess 736 is disposed between the threaded portion 726 and the outwardly projecting flange 728. A nut 730, disposed over the rear portion 716 of the body 712, includes a front portion 732 that is internally threaded, a rear inwardly projecting flange 734, and an intermediate recess 736.

Figure 29B:
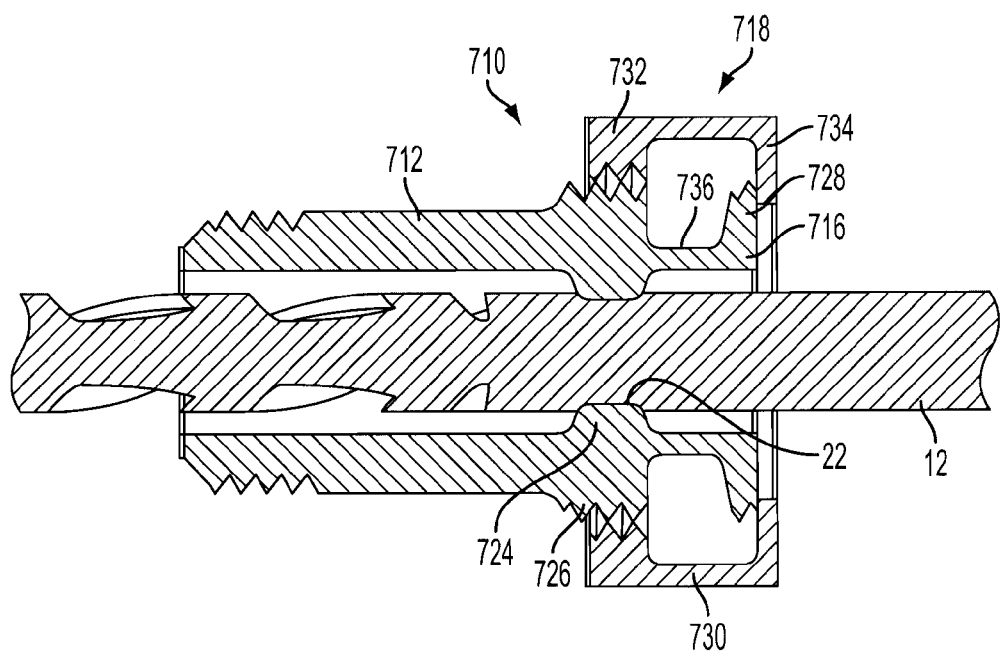
Figure 30A:
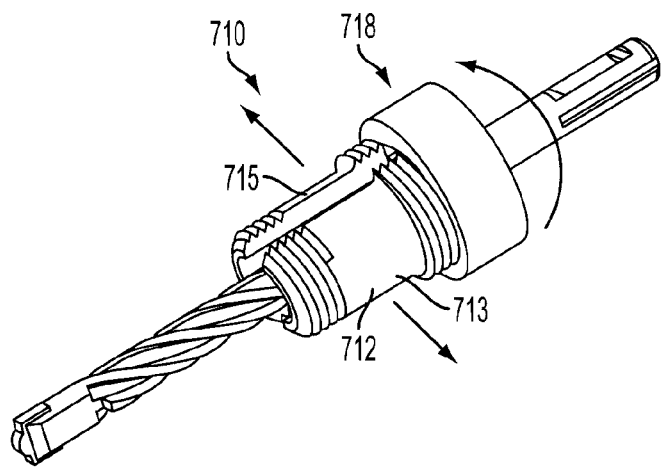
FIGS. 30A-30B are perspective and axial cross-section views of the seventh embodiment of the depth gauge in an unlocked position.
Figure 30B:
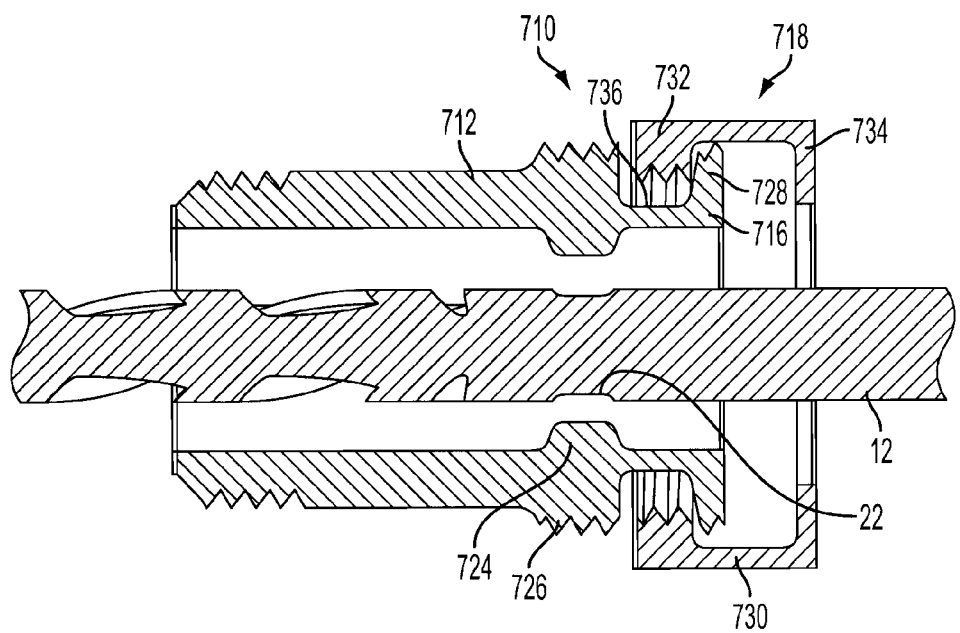

In the locked position (as shown in FIGS. 29A and 29B), the internally threaded front portion 732 of the nut engages the external threaded portion 726 of the body 712 to clamp the two halves 713, 715 of the body 712 together and cause the shoulder 724 to engage the recess 22 in the nut 12. At the same time, the inwardly projecting flange 734 of the nut 718 abuts against the outwardly projecting flange 728 on the body, preventing the nut 718 from being driven too far forward on the body 712. In the unlocked position (as shown in FIGS. 30A and 30B), the nut 718 is completely unthreaded from the body 712 until the internally threaded portion 732 of the nut resides in the recess 736 in the body 712. This enables separation of the two halves 713, 715 of the body from one another, disengaging the shoulder 724 from the from the recess 22 in the drill bit 12, enabling removal of the drill bit 12 from the depth gauge 710. At the same time, the outwardly projecting flange 728 on the body 712 acts as a stop against the threaded portion 732 of the nut 718, preventing complete removal of the nut 718 from the body 712, while the nut 718 prevents complete separation of the two halves 713, 715 of the body 712.

Referring to FIGS. 31A-33, an eighth embodiment of a depth gauge 810 is configured to be removably attached to the drill bit 12. The depth gauge 810 has an elongated body 812 split longitudinally into two halves 813 and 815, a cap 814 reversibly coupled to a front portion 817 of the body 812 (as described below), and a retention mechanism 818 coupled to a rear portion 816 of the body 812 to removably attach the body 812 to the drill bit 12 (as described below). The body 812 also has an intermediate portion 820 disposed between the front portion 817 and the rear portion 816, and defines a first throughbore 822 that receives the drill bit 12 therethrough, such that the drill bit is permitted to rotate relative to the body 812.

The cap 814 is reversibly attachable to the body 812 so that two different drilling depths can be achieved. The front portion 817 of the body 812 has a threaded exterior surface 819 and a forward face 830. The cap 814 has a first contacting end 832 and a second contacting end 834 and a second throughbore 836 configured to receive the drill bit 12 therethrough. The inner wall of the second throughbore 836 defines a shoulder 840 having a front face 841 and a rear face 842. In front of the front face 841, the second throughbore has a first interior threaded surface 845, and behind the rear face 842, the second throughbore has a second interior threaded surface 847. The cap 814 has a knurled or rubber overmolded exterior surface 811 to facilitate the user gripping the cap 814 when attaching and removing the cap 814 to and from the body 812.

Figure 31A:
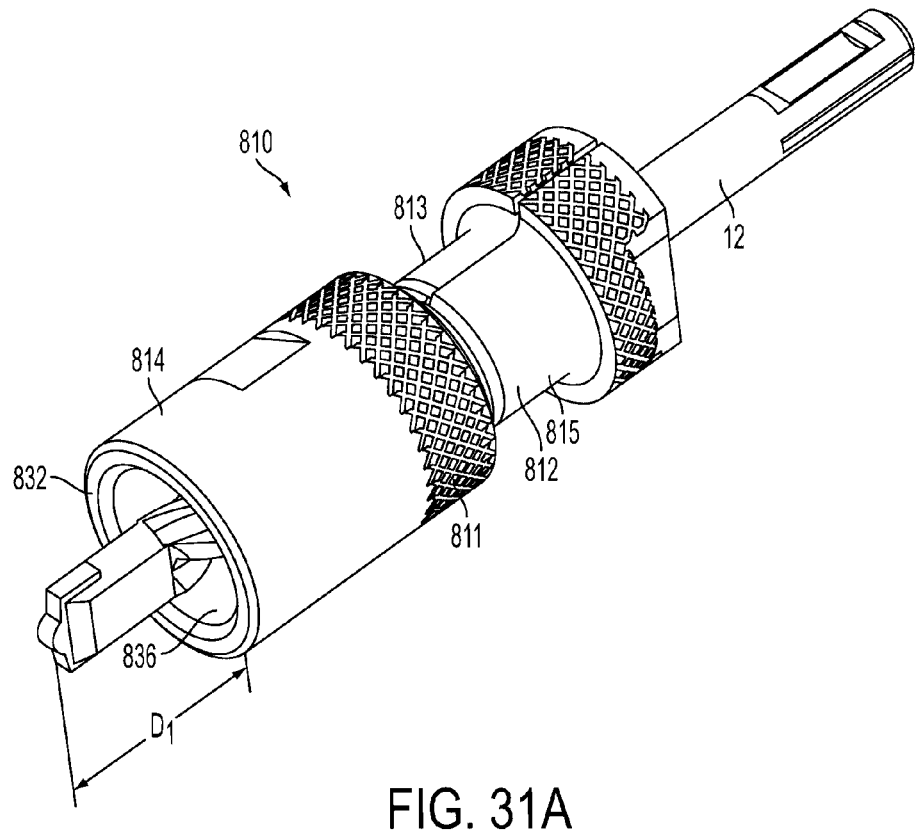
FIGS. 31A-31B are perspective and axial cross-section views of an eighth embodiment of the depth gauge with the front cap in a first orientation.
Figure 31B:
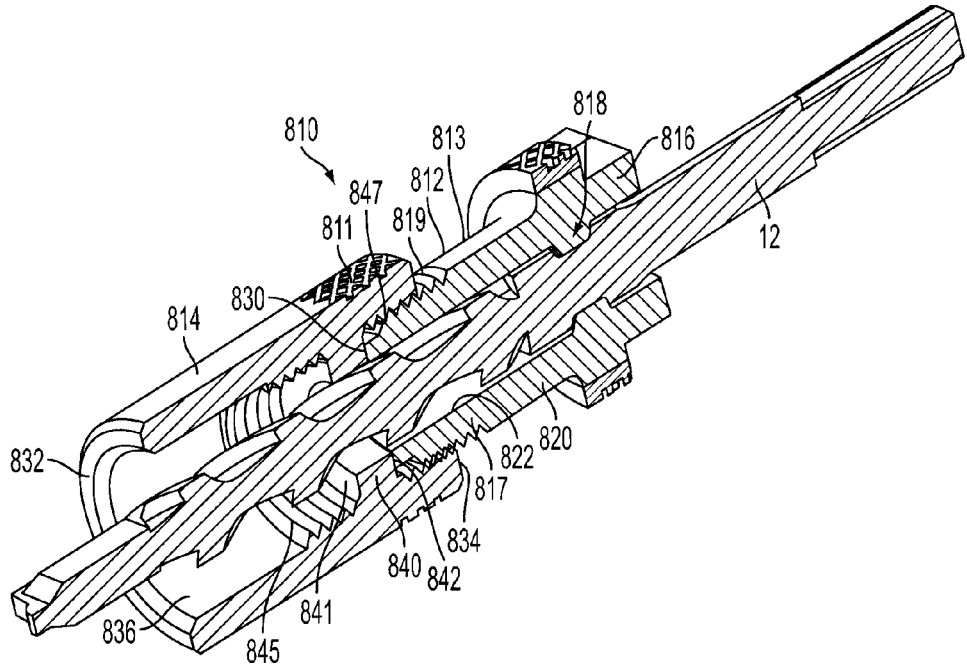
Figure 32A:
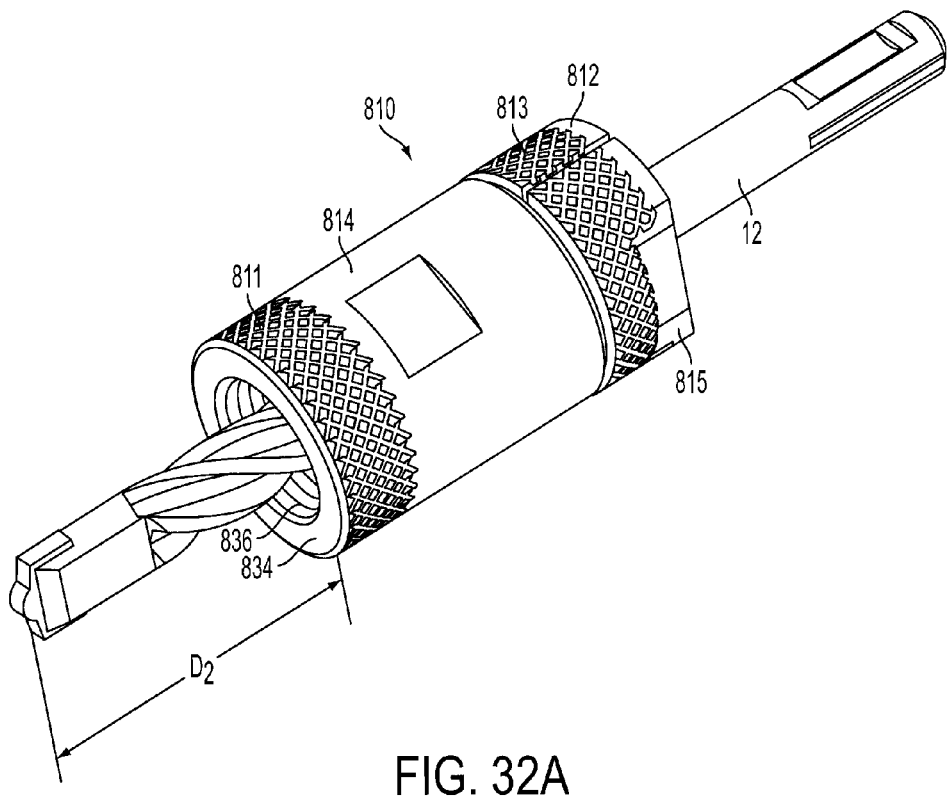
FIGS. 32A-32B are perspective and axial cross-section views of the eighth embodiment of the depth gauge with the front cap in a second orientation.
Figure 32B:
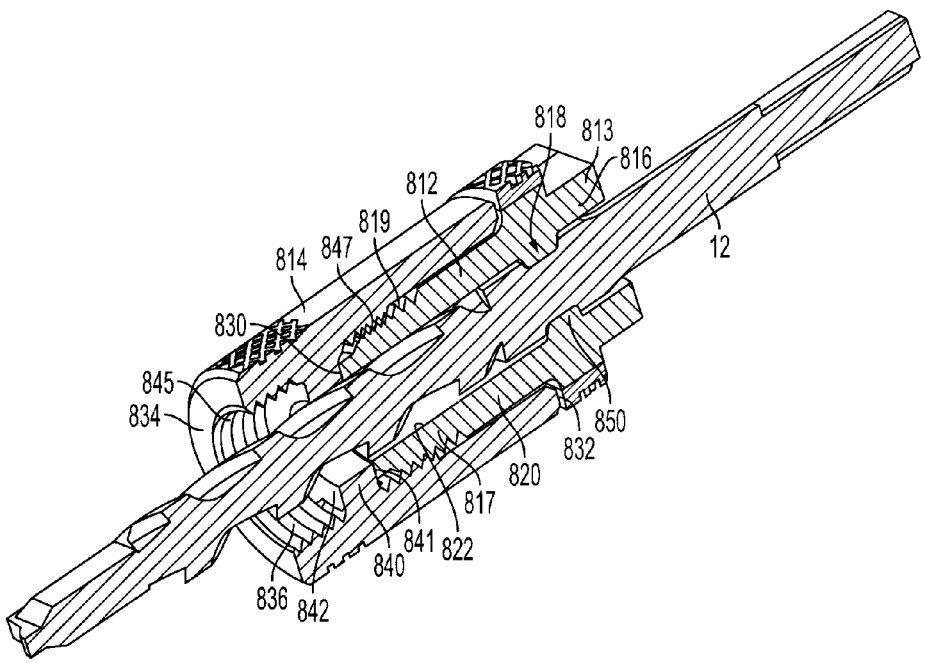

When the cap 814 is in a first orientation, as shown in FIGS. 31A-31B, the second interior threaded surface 847 is threaded to the threaded exterior surface 819, and the rear face 842 of the shoulder 840 of the cap 814 abuts against the front face 830 of the body 812, such that the first contacting end 832 will abut against the workpiece to limit the amount of penetration of the drill bit 12 into the workpiece to a first depth D1. When the cap 814 is in the second orientation, as shown in FIGS. 32A-32B, the first interior threaded surface 845 is threaded to the threaded exterior surface 819, and the front face 841 of the shoulder 840 of the cap 814 abuts against the front face 830 of the body 812, such that the second contacting end 834 will abut against the workpiece to limit the amount of penetration of the drill bit 12 into the workpiece to a second depth D2. Therefore, the depth gauge 810 can be used with anchors having two different lengths.

Figure 33:
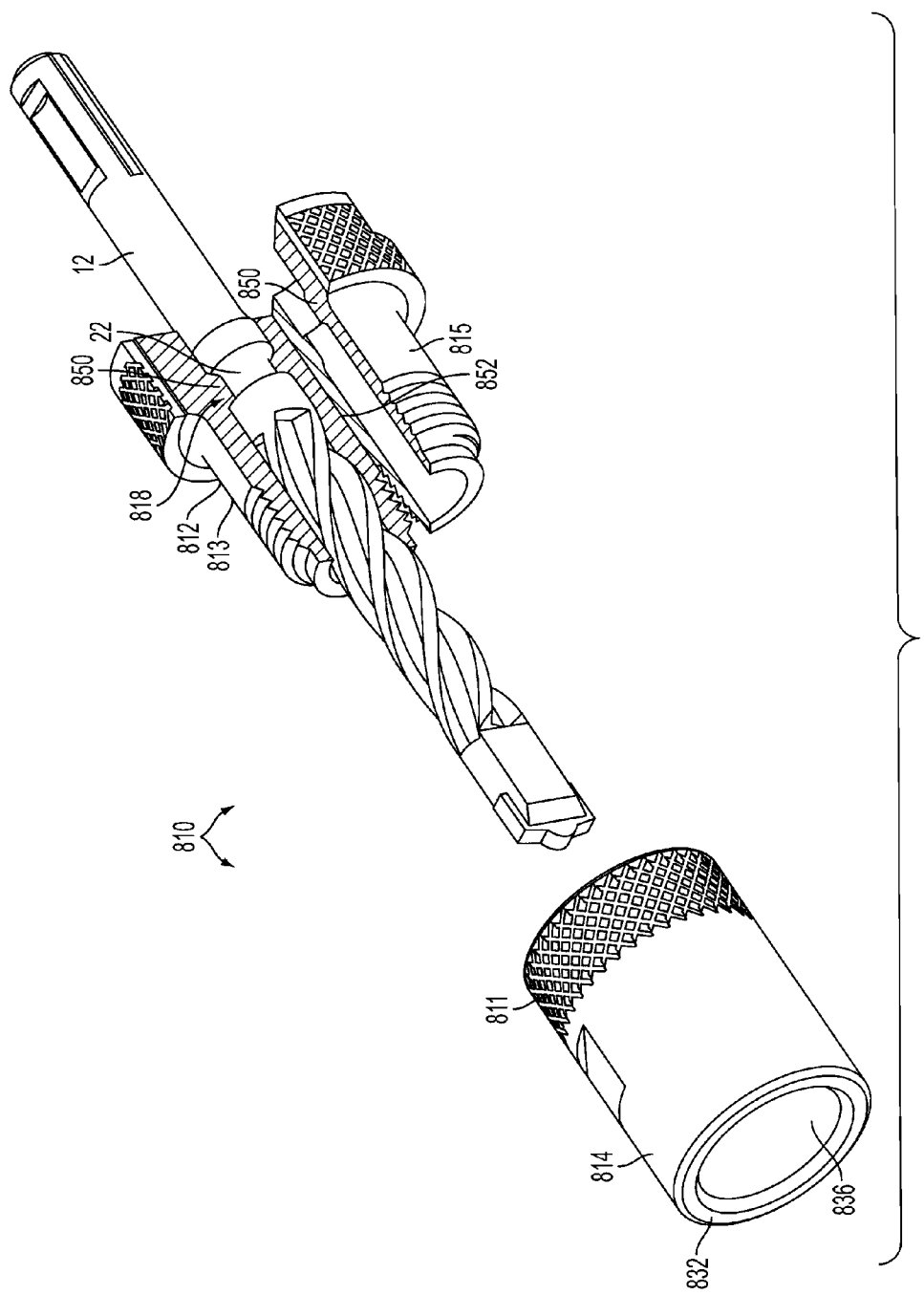
FIG. 33 is a perspective view of the eighth embodiment of the depth gauge in a locked position.

The retention mechanism 818 removably couples the body 812 to the annular recess 22 in the drill bit 12. The retention mechanism 818 includes an inward annular projection 850 in the rear portion 816 of each half 813, 815 of the body 812 that can engage the annular recess 22. The halves 813, 815 of the body are also joined by a hinge 852 so that the halves 813, 815 can be partially separated from one another to disengage the projection 850 from the annular recess, as shown in FIG. 33 (although it should be understood that such a hinge is not needed). In the locked position (as shown in FIGS. 31A-32B), one of the internally threaded portions 845, 847 of the cap 814 engages the external threaded portion 819 of the body 812 to clamp the two halves 813, 815 of the body 812 together and cause the shoulder projection 850 to engage the recess 22 in the nut 12. In the unlocked position (as shown in FIG. 33), the nut cap 814 is completely unthreaded and removed from the body 812, which enables separation of the two halves 813, 815 of the body from one another along the hinge 852. This disengages the projection 850 from the from the recess 22 in the drill bit 12, enabling removal of the drill bit 12 from the depth gauge 810.

Figure 37:
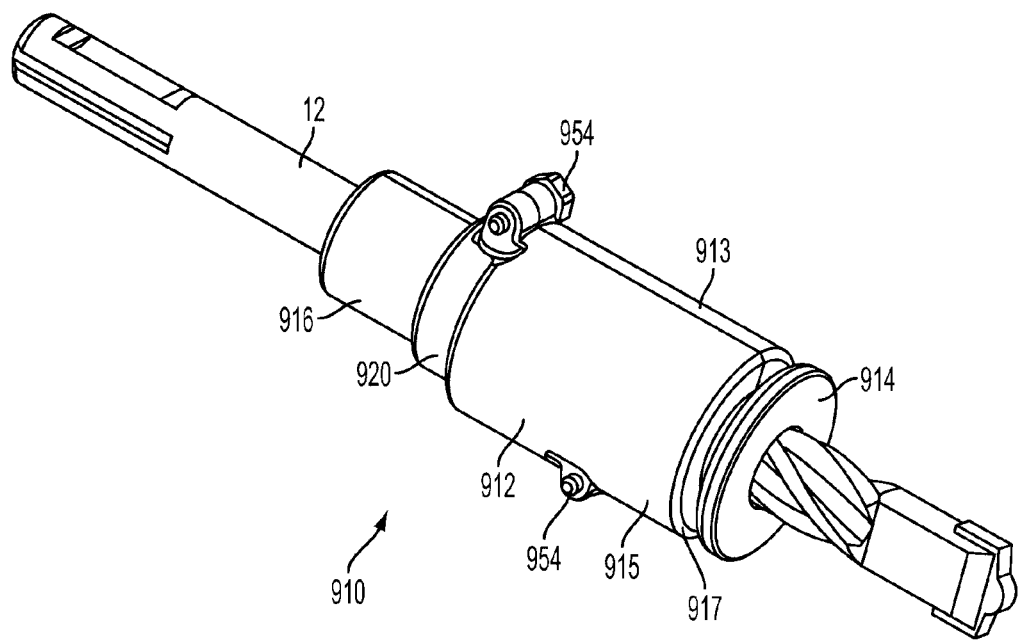
FIG. 37 is a perspective view of a ninth embodiment of a depth gauge.
Figure 38A:
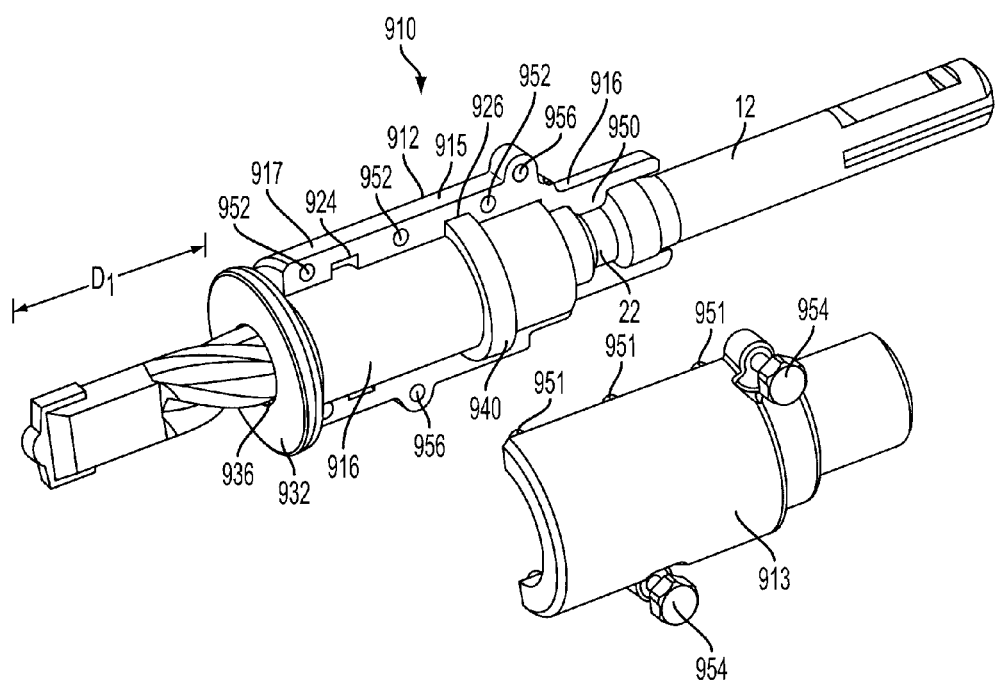
FIGS. 38A-38B are perspective views of the ninth embodiment of the depth gauge, disassembled, with the cap in first and second positions.
Figure 38B:
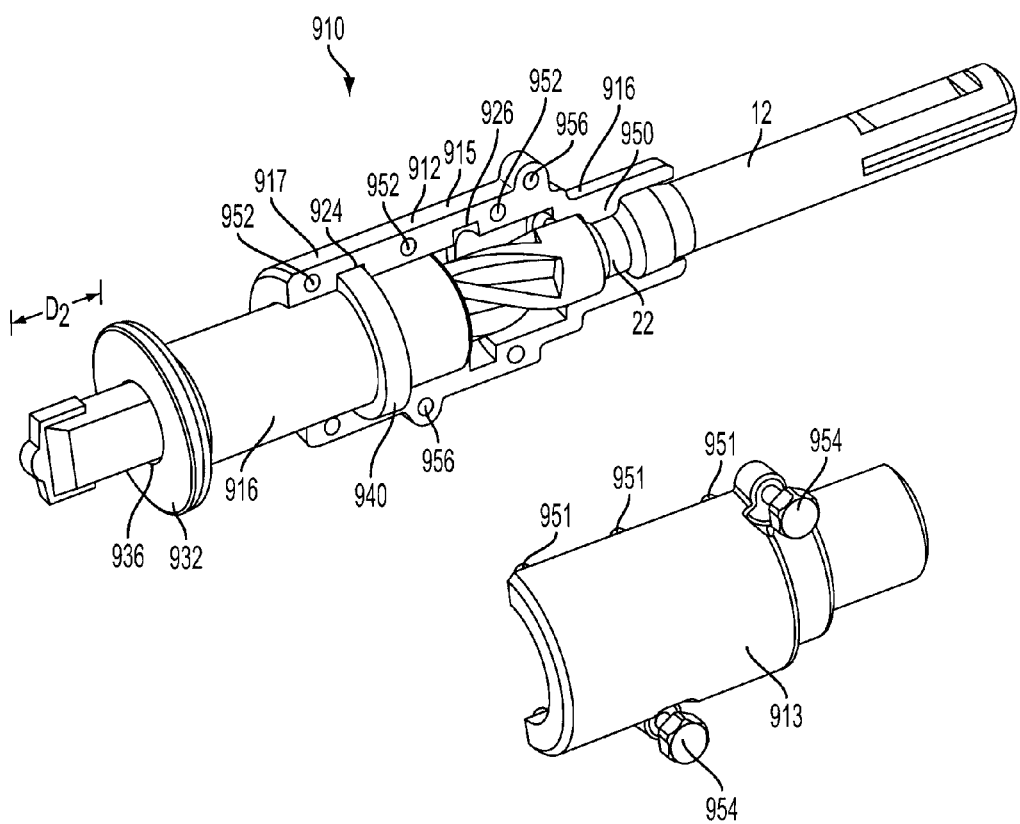

Referring to FIGS. 37-38B, a ninth embodiment of a depth gauge 910 is configured to be removably attached to the drill bit 12. The depth gauge 910 has an elongated body 912 split longitudinally into two halves 913 and 915, a cap 914 reversibly coupled to a front portion 917 of the body 912 (as described below), and a retention mechanism coupled to the body 912 to removably attach the body 912 to the drill bit 12 (as described below). The body 912 also has an intermediate portion 920 disposed between the front portion 917 and the rear portion 916, and defines a first throughbore 922 that receives the drill bit 12 therethrough, such that the drill bit is permitted to rotate relative to the body 912.

The cap 914 is removably attachable to the body 912 so that two different drilling depths can be achieved. The front portion 917 of the body 912 has front interior notch 924 and a rear interior notch 926. The cap 914 has a flanged contacting end 932 and a second throughbore 936 configured to receive the drill bit 12 therethrough. The outer wall of the cap 914 defines an annular projection 940. When the cap 914 is in a first position, as shown in FIG. 38A, the annular projection 940 is received in the rearward notch 926, such that the contacting end 932 will abut against the workpiece to limit the amount of penetration of the drill bit 12 into the workpiece to a first depth D1. When the cap 914 is in the second position, as shown in FIG. 38B, the annular projection 940 is received in the frontward notch 924, such that the contacting end 932 will abut against the workpiece to limit the amount of penetration of the drill bit 12 into the workpiece to a second depth D2. Therefore, the depth gauge 910 can be used with anchors having two different lengths.

The retention mechanism removably couples the body 912 to the drill bit 12. The retention mechanism includes an inward annular projection 950 in the rear portion 916 of each half 913, 915 of the body 912 that can engage the annular recess 22 in the drill bit. The halves 913, 915 of the body are also removably joined to one another by locating pins 951 in the half 913 that engage with locating holes 952 in the half 915, and by a pair of bolts 954 that engage with threaded holes 956 in the halves 913, 915. It should be understood that other attaching mechanisms can be used to attach the two halves 913, 915 to one another.

Figure 38C:
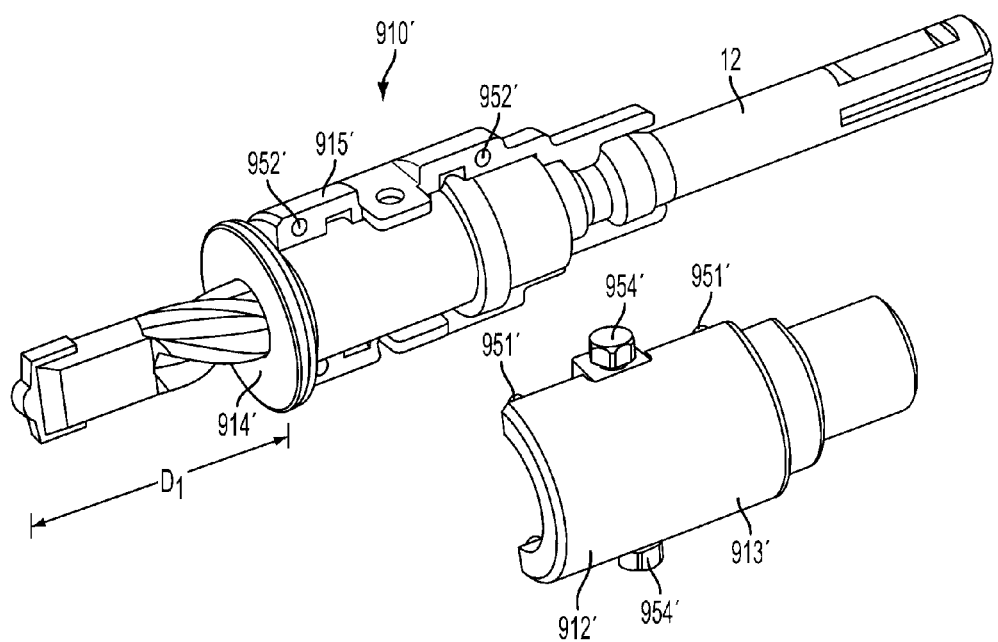
FIGS. 38C-38D are perspective views of a variant of the ninth embodiment of the depth gauge, disassembled, with the cap in first and second positions.
Figure 38D:
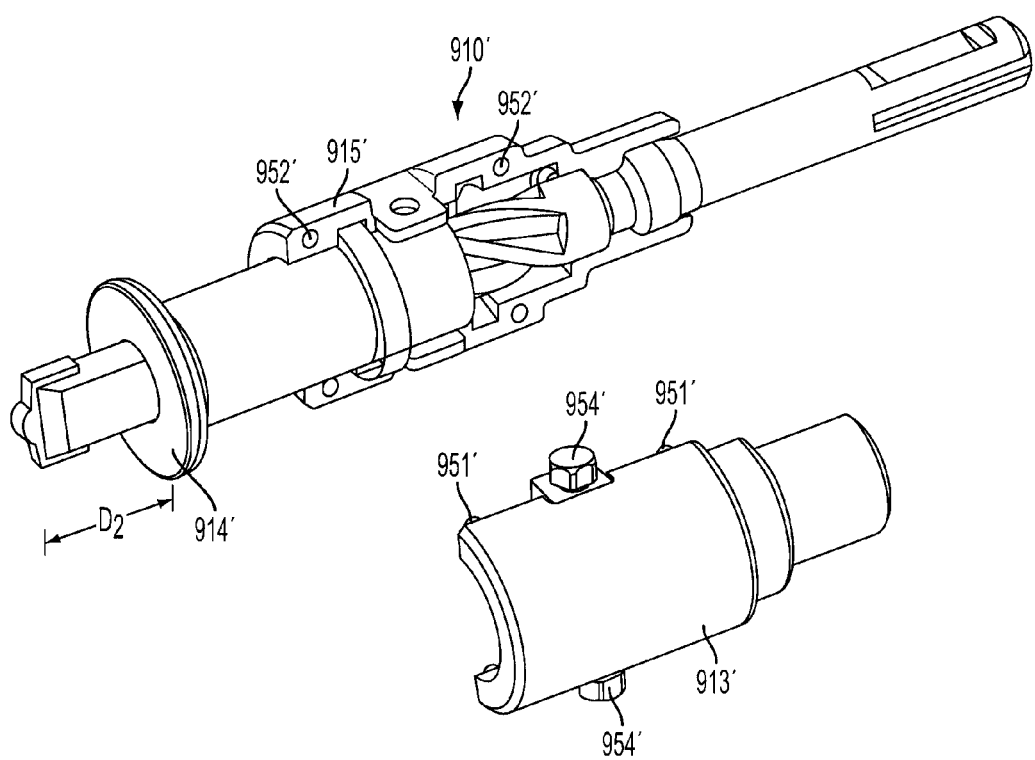

FIGS. 38C and 38D illustrate a variant of the depth gauge 910 shown in FIGS. 37-38B. The depth gauge 910' in FIG. 38C differs from the depth gauge 910 shown in FIGS. 37-38B only in that there are fewer locating pins 951' and locating holes 952' in the halves 913', 915' of the body 912', and in that the bolts 954' that attach the two halves 913', 915' together are positioned differently and oriented in a radial direction, rather than in a circumferential direction. All of the other elements of the depth gauge 910' are the same as the depth gauge 910. For example, the cap 914' can be coupled to the body 912' in a first position, as shown in FIG. 38C, such that the cap 914' will abut against the workpiece to limit the amount of penetration of the drill bit 12 into the workpiece to a first depth D1, or in a second position, as shown in FIG. 38D, such that the cap 914' will abut against the workpiece to limit the amount of penetration of the drill bit 12 into the workpiece to a second depth D2

Figure 39:
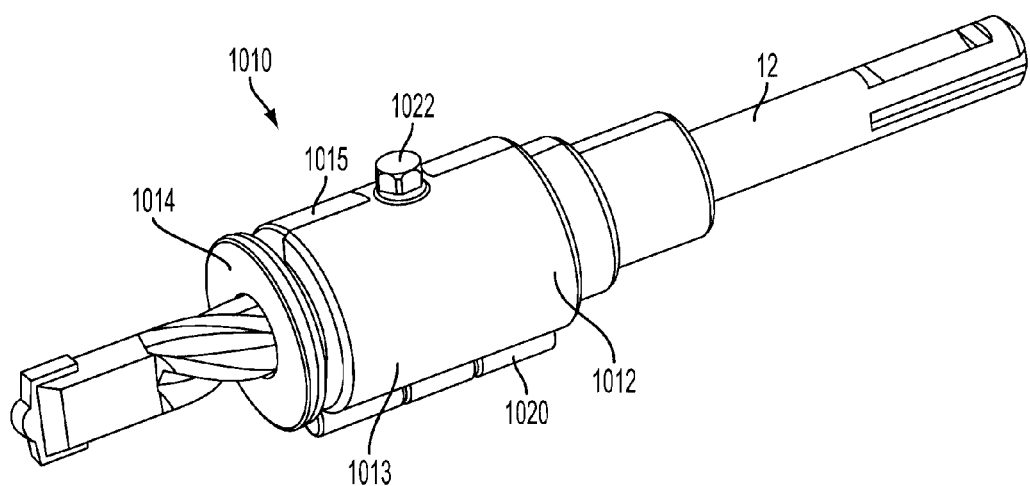
FIG. 39 is a perspective view of a tenth embodiment of a depth gauge.
Figure 40A:
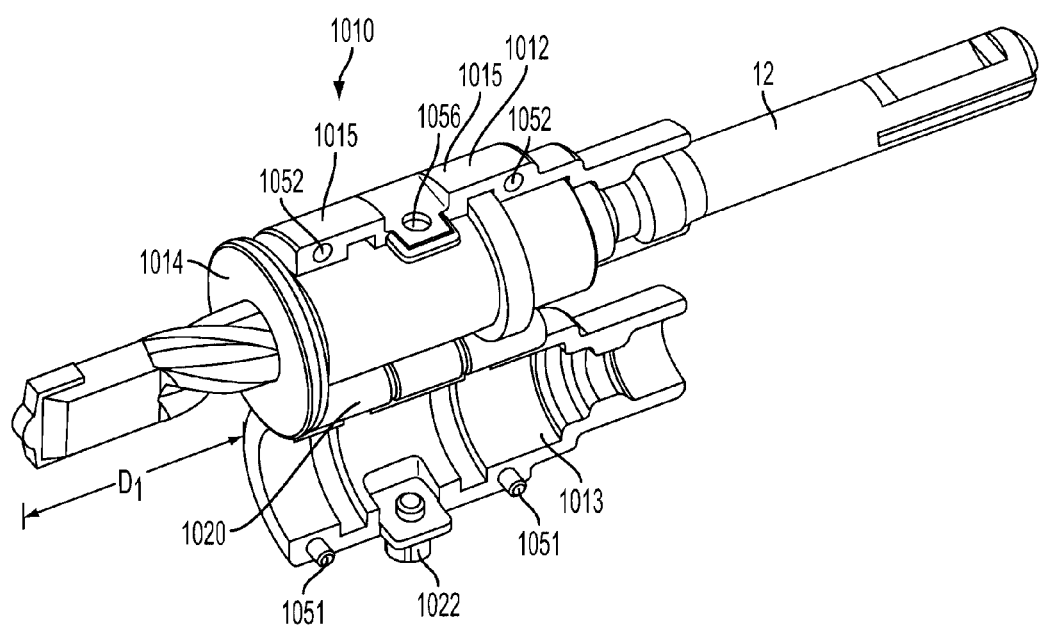
FIGS. 40A-40B are perspective views of the tenth embodiment of the depth gauge, disassembled, with the cap in first and second positions.
Figure 40B:
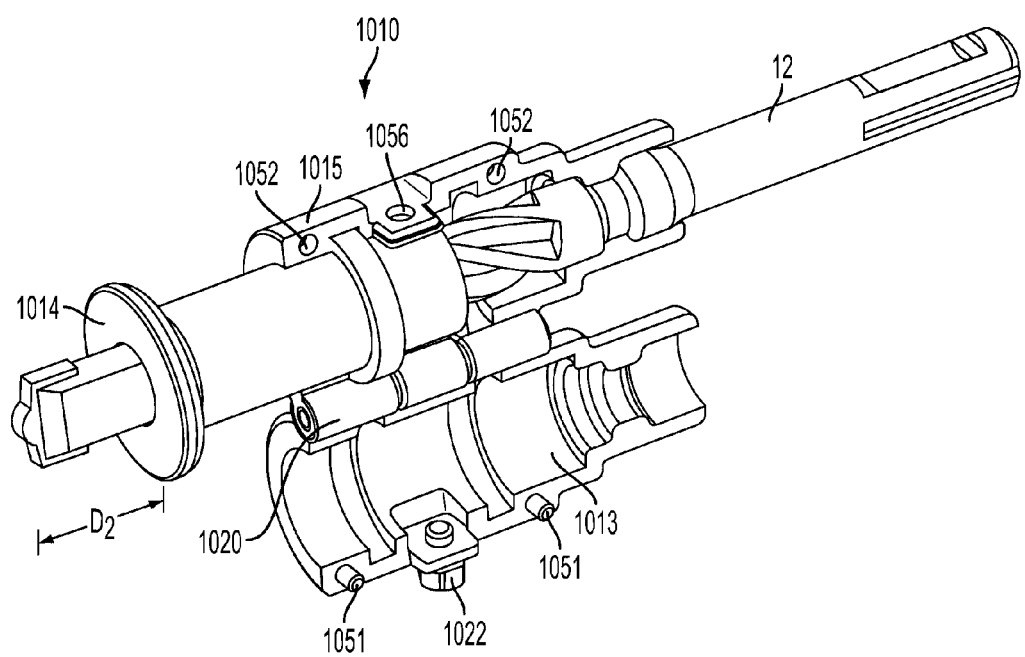

Referring to FIGS. 39-40B, a tenth embodiment of a depth gauge 1010 is configured to be removably attached to the drill bit 12. The tenth embodiment of the depth gauge 1010 differs from the ninth embodiment of the depth gauge 910 only in that it has an elongated body 1012 split longitudinally into two halves 1013 and 1015, that are joined by a hinge joint 1020. The two halves 1013 and 1015 are also removably joined by locating pins 1051 in half 1013 that fit into locating holes 1052 in half 1015, and by a transverse bolt 1022 in half 1013 that fits into threaded hole 1056 in half 1015, clamping the two halves 1013, 1015 together about the drill bit 12. All of the other elements of the depth gauge 1010 are the same as the depth gauge 910. For example, the cap 1014 can be coupled to the body 1012 in a first position, as shown in FIG. 40A, such that the cap 1014 will abut against the workpiece to limit the amount of penetration of the drill bit 12 into the workpiece to a first depth D1, or in a second position, as shown in FIG. 40B, such that the cap 1014 will abut against the workpiece to limit the amount of penetration of the drill bit 12 into the workpiece to a second depth D2.

Figure 41:
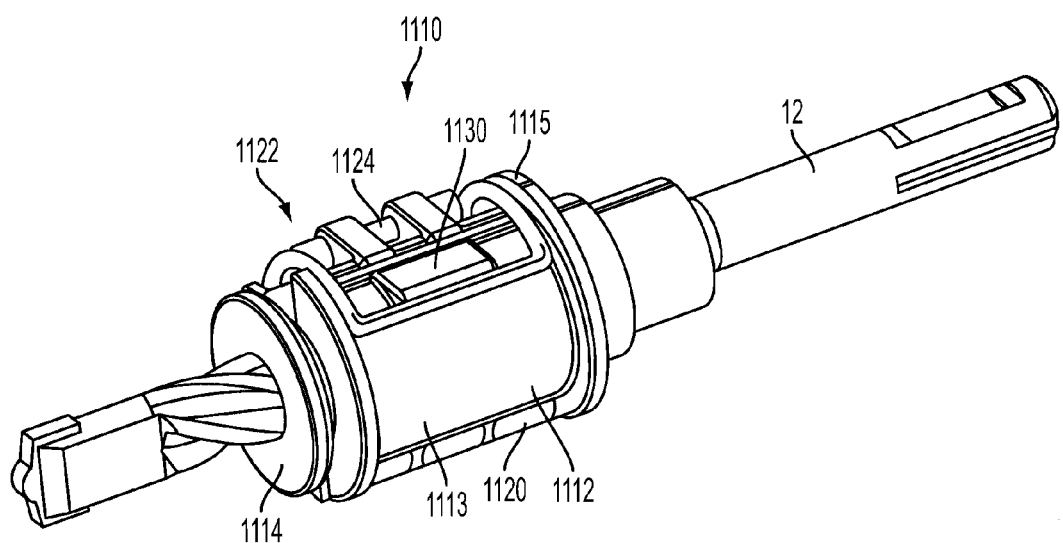
FIG. 41 is a perspective view of an eleventh embodiment of a depth gauge.
Figure 42:
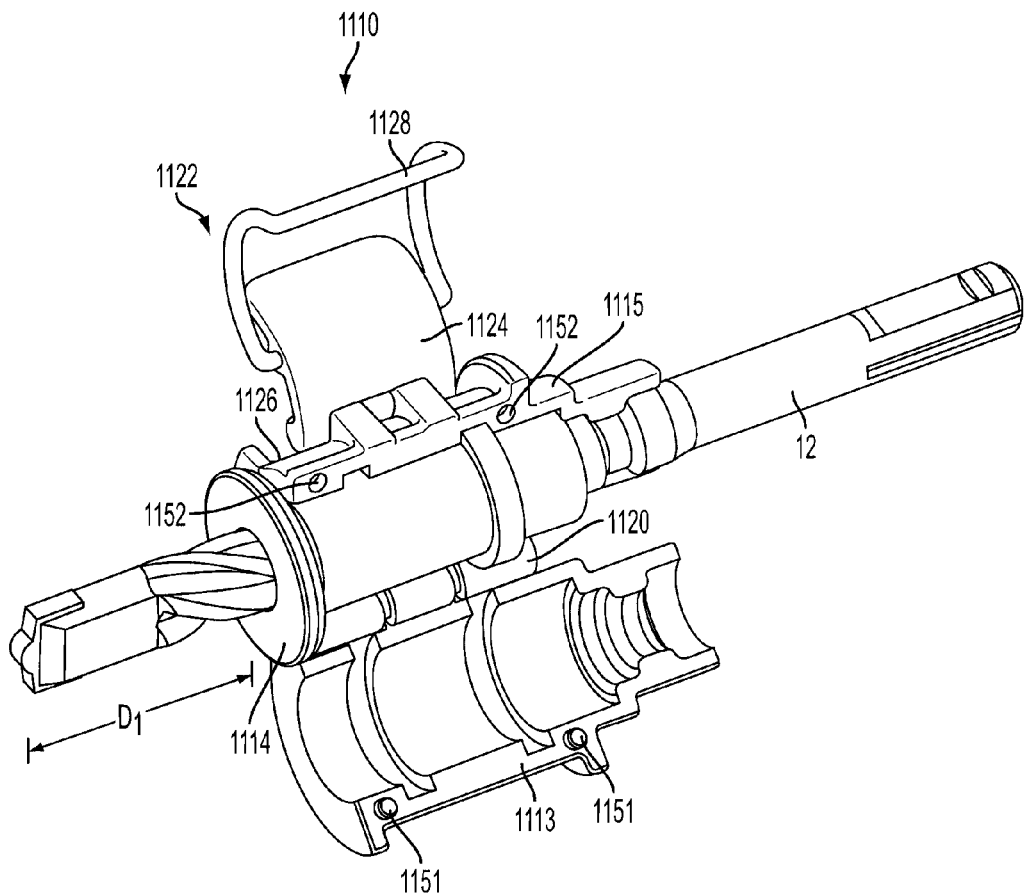
FIGS. 42-43 are perspective views of the ninth embodiment of the depth gauge, disassembled, with the cap in first and second positions.
Figure 43:
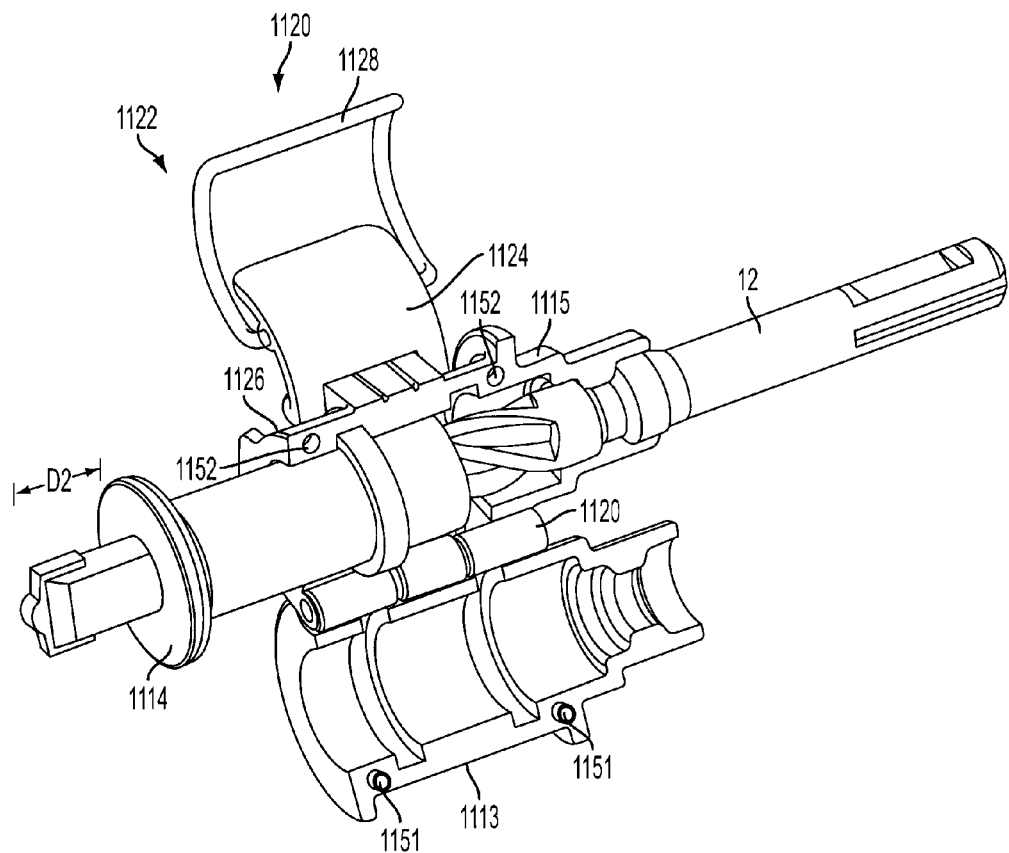

Referring to FIGS. 41-43, an eleventh embodiment of a depth gauge 1110 is configured to be removably attached to the drill bit 12. The eleventh embodiment of the depth gauge 1110 differs from the ninth embodiment of the depth gauge 910 only in that it has an elongated body 1112 split longitudinally into two halves 1113 and 1115, that are joined by a hinge joint 1120 and are removably joined by an over-center latch 1122 when the two halves 1113, 1115 are clamped together about the drill bit 12. The over-center latch 1122 includes a pivoting clamping element 1124 coupled to the half 1115 that engages with a recess 1126 in an outer wall of the half 1115. The over center latch 1122 also includes a pivoting latch element 1128 coupled to the clamping element 1124 that pivots in an opposite direction of the clamping element 1124 and that locks to a projection 1130 on the outer wall of half 1113 to lock the clamping element 1124 to the half 1113. Such over center latches are known in the art. There are also locating pins 1151 in half 1113 that fit into locating holes 1152 in half 1115. All of the other elements of the depth gauge 1110 are the same as the depth gauge 910. For example, the cap 1114 can be coupled to the body 1112 in a first position, as shown in FIG. 42, such that the cap 1114 will abut against the workpiece to limit the amount of penetration of the drill bit 12 into the workpiece to a first depth D1, or in a second position, as shown in FIG. 43, such that the cap 1114 will abut against the workpiece to limit the amount of penetration of the drill bit 12 into the workpiece to a second depth D2.

Figure 44:
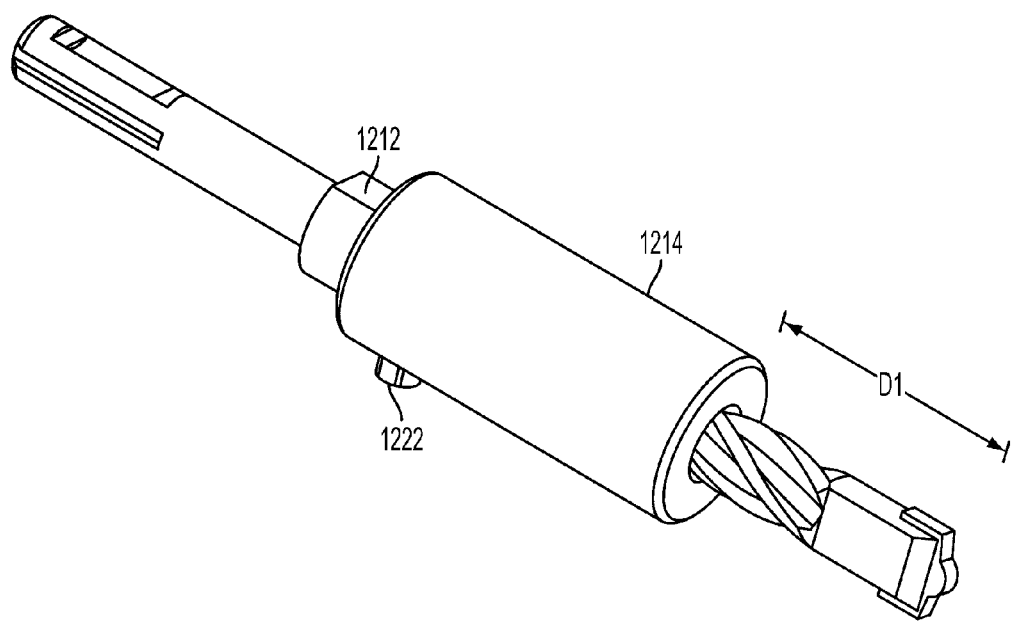
FIG. 44 is a perspective view of a twelfth embodiment of a depth gauge with the first cap attached to the body.
Figure 45:
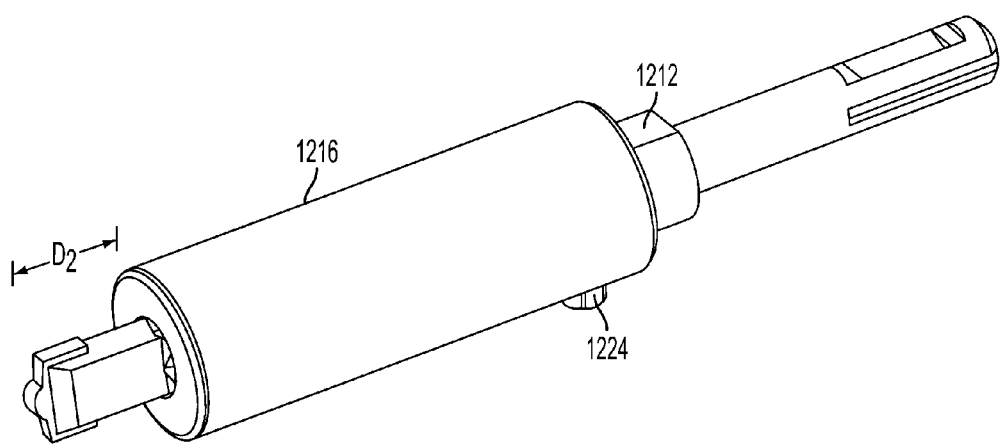
FIG. 45 is a perspective view of the twelfth embodiment of the depth gauge with the second cap attached to the body.
Figure 46:
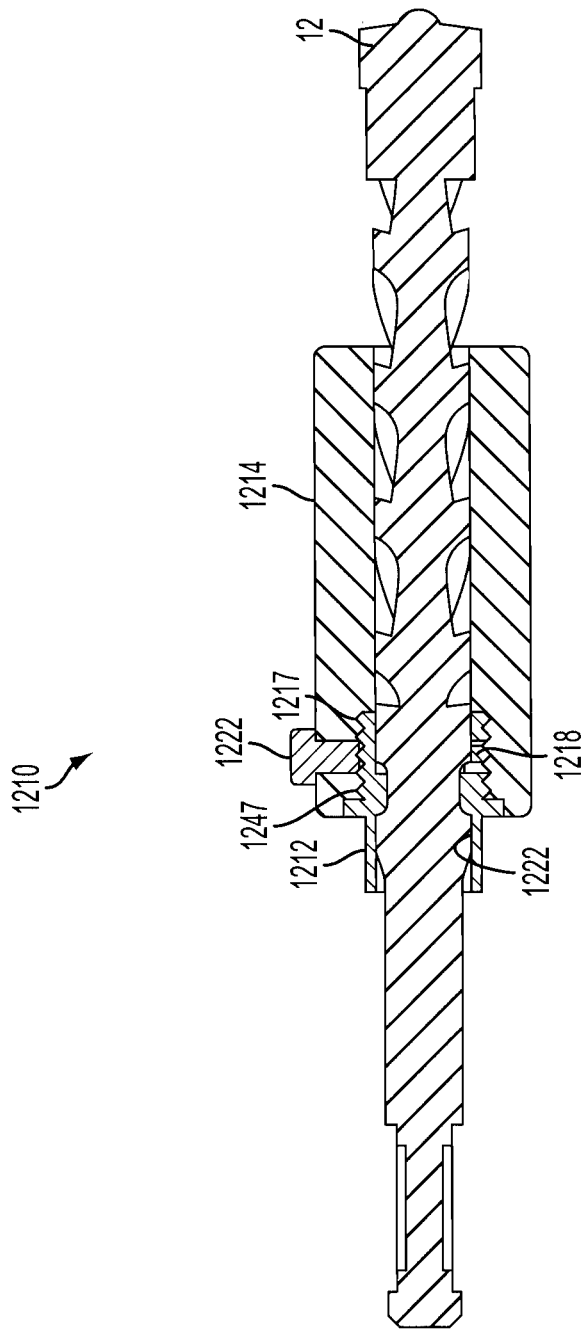
FIG. 46 is a cross-sectional view of the twelfth embodiment of the depth gauge with the first cap attached to the body.
Figure 47:
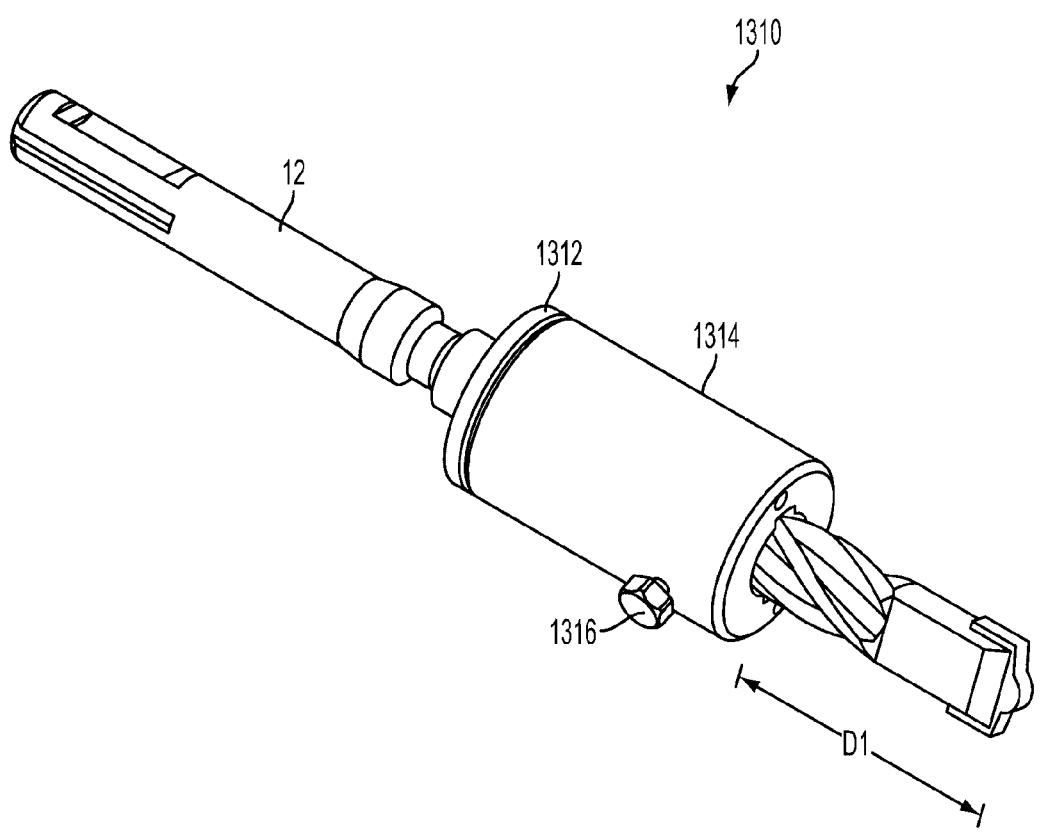
FIG. 47 is a perspective view of a thirteenth embodiment of a depth gauge.
Figure 48:
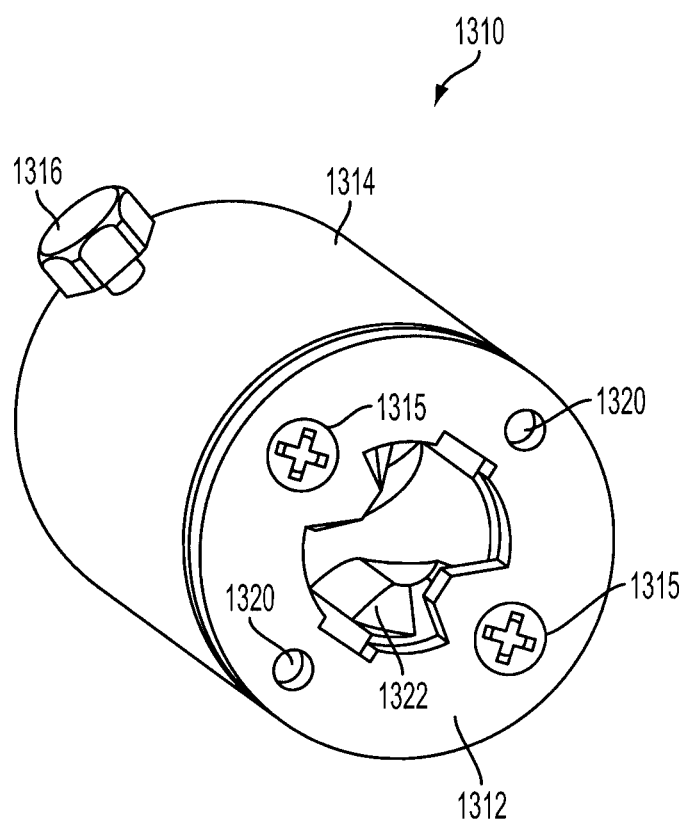
FIG. 48 is a perspective view of the first cap of the thirteenth embodiment of the depth gauge.
Figure 49:
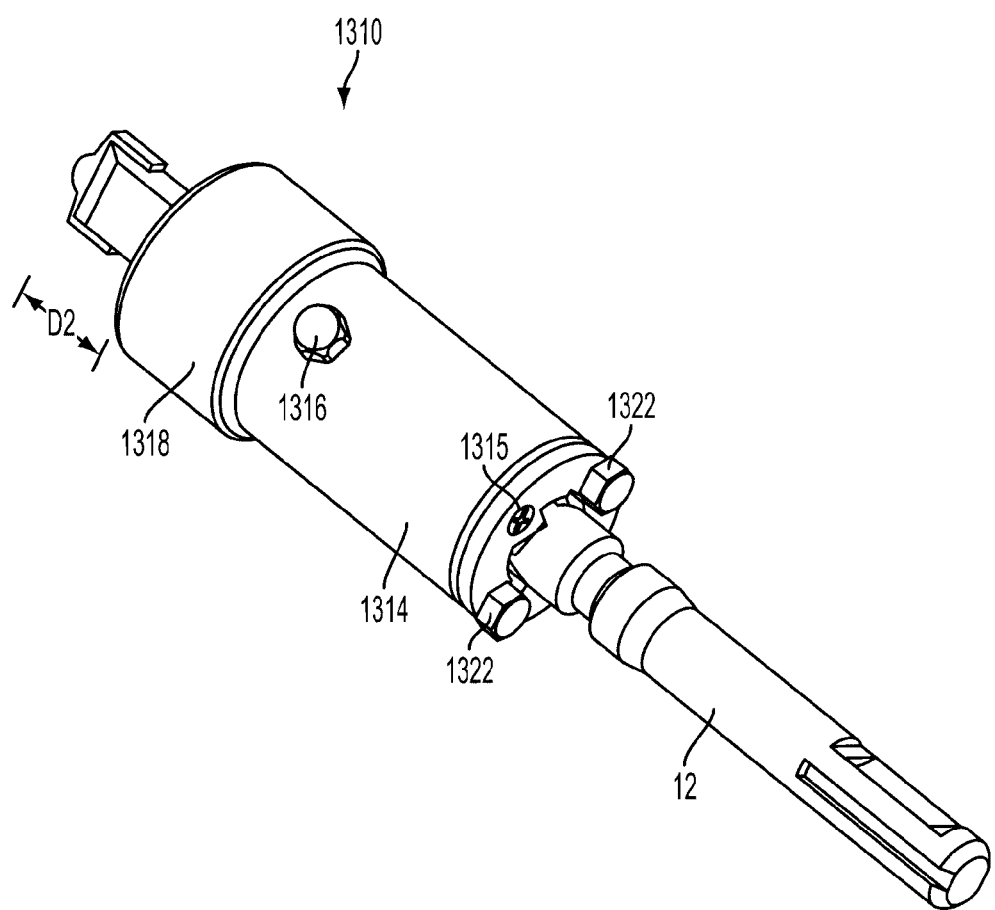
FIG. 49 is a perspective view of the thirteenth embodiment of the depth gauge with the second cap attached to the first cap.
Figure 50:
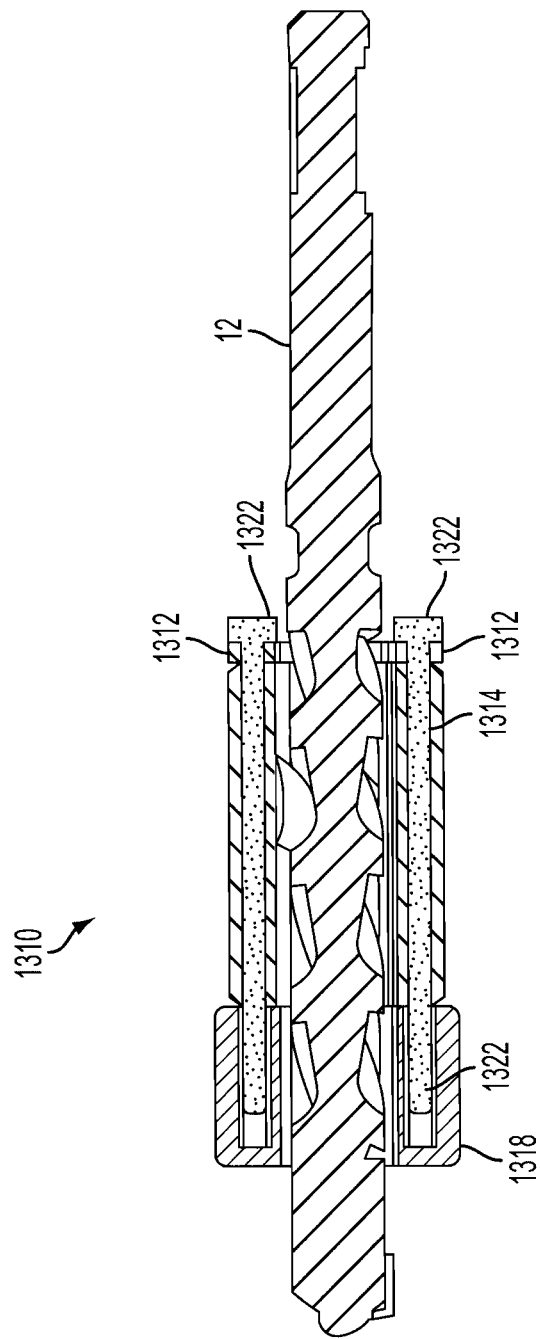
FIG. 50 is a cross-sectional view of the thirteenth embodiment of the depth gauge with the second cap attached to the first cap.

Referring to FIGS. 44-46, a twelfth embodiment of a depth gauge 1210 is configured to be removably attached to the drill bit 12. The depth gauge 1210 has a body 1212 with a threaded front portion 1217, a first throughbore 1222 that receives the drill bit 12 therethrough, and a retention mechanism in the form of a lateral set screw 1218 for removably attaching the body 1212 to the drill bit 12. The depth gauge also includes an interchangeable first cap 1214 (FIGS. 44 and 46) and a second cap 1216 (FIG. 45), each of which can be removably threaded to the threaded front portion 1217 of the body 1212, so that two different drilling depths can be achieved. The first cap 1214 has an interior threaded surface 1247 that can be removably threaded to the threaded front portion 1217 of the body 1212, such that the first cap 1214 will abut against the workpiece to limit the amount of penetration of the drill bit 12 into the workpiece to a first depth D1. The second cap 1216 has an interior threaded surface (not shown) that can be removably threaded to the threaded front portion 1217 of the body 1212, such that the second cap 1216 will abut against the workpiece to limit the amount of penetration of the drill bit 12 into the workpiece to a second depth D2. Each of the first and second cap 1214, 1216 includes a set screw 1222, 1224 to assist with holding the cap 1214, 1216 to the body 1212.

Referring to FIGS. 47-50, a thirteenth embodiment of a depth gauge 1310 is configured to be removably attached to the drill bit 12. The depth gauge 1310 has a body 1312 with a an inner throughbore 1322 that receives the drill bit 12 therethrough. The inner throughbore 1322 is internally threaded to match the pitch of the flutes of the drill bit 12, such that the body 1312 can be threaded onto the flutes of the drill bit 12 to the point where the flutes end. Fixedly coupled to the body 1312 by screws 1315 is a first end cap 1314. The first end cap 1314 includes a set screw 1316 such that when the first end cap 1314 is threaded onto the drill bit 12, the depth stop 1310 can be fixedly attached to the drill bit 12. The first end cap 1314 also includes a pair of longitudinal bores 1320. A second end cap 1318 can be removably attached to the first end cap 1314 by a pair of longitudinal bolts 1322 that are press fit into the second end cap 1318, and that are received in the longitudinal bores 1320. Thus, when only the first end cap 1314 is attached to the body 1312, the amount of penetration of the drill bit 12 into the workpiece is limited to a first depth D1 (see FIG. 47). When the second cap 1318 and the first end cap 1314 are coupled to the body 1312, the second cap 1318 will abut against the workpiece to limit the amount of penetration of the drill bit 12 into the workpiece to a second depth D2 (see FIG. 49).

Figure 51:
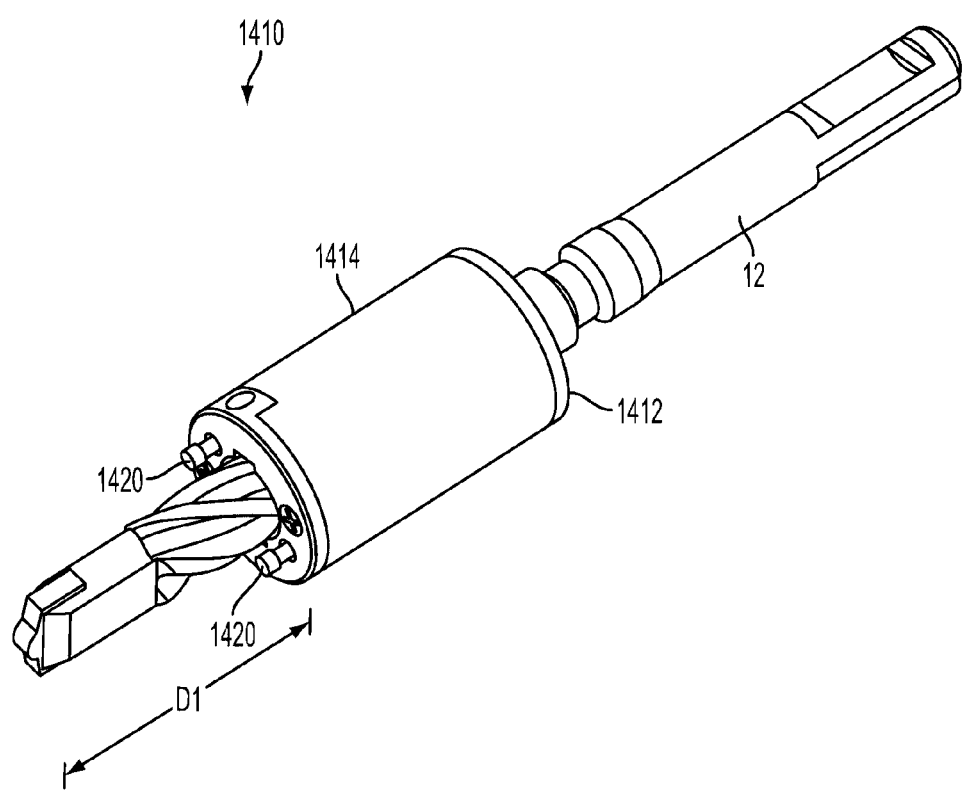
FIG. 51 is a perspective view of a fourteenth embodiment of a depth gauge.
Figure 52:
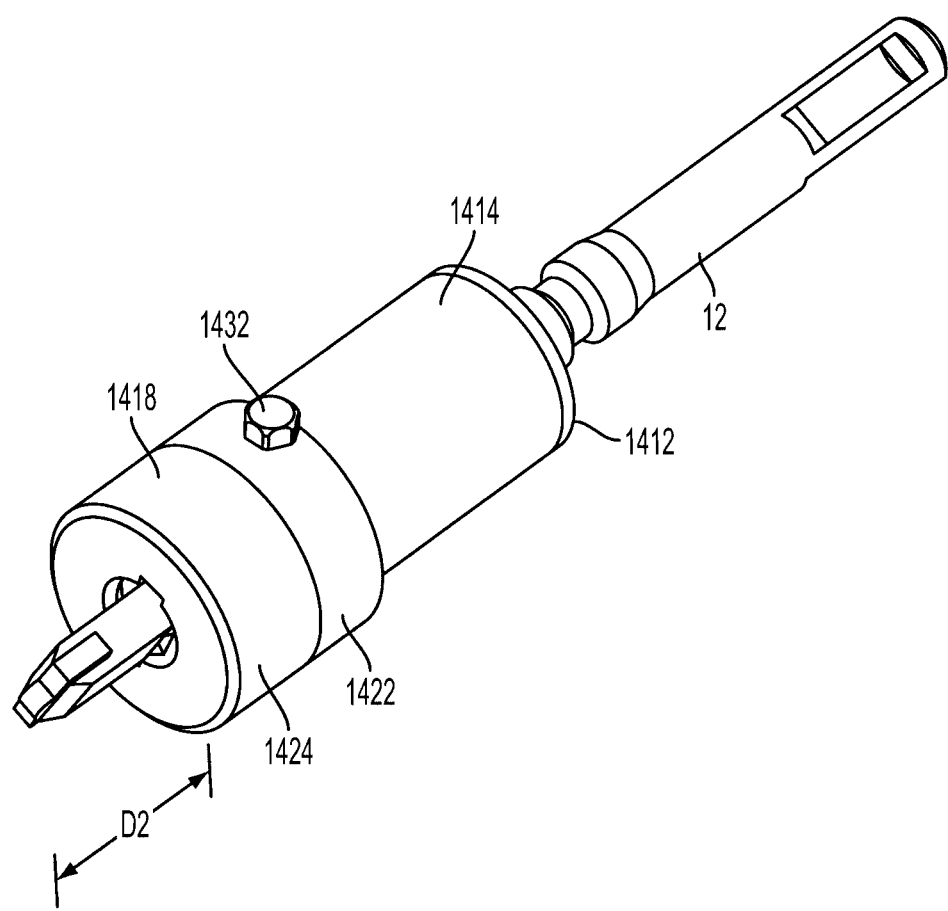
FIG. 52 is a perspective view of the fourteenth embodiment of the depth gauge with the second cap attached to the first cap.
Figure 53:
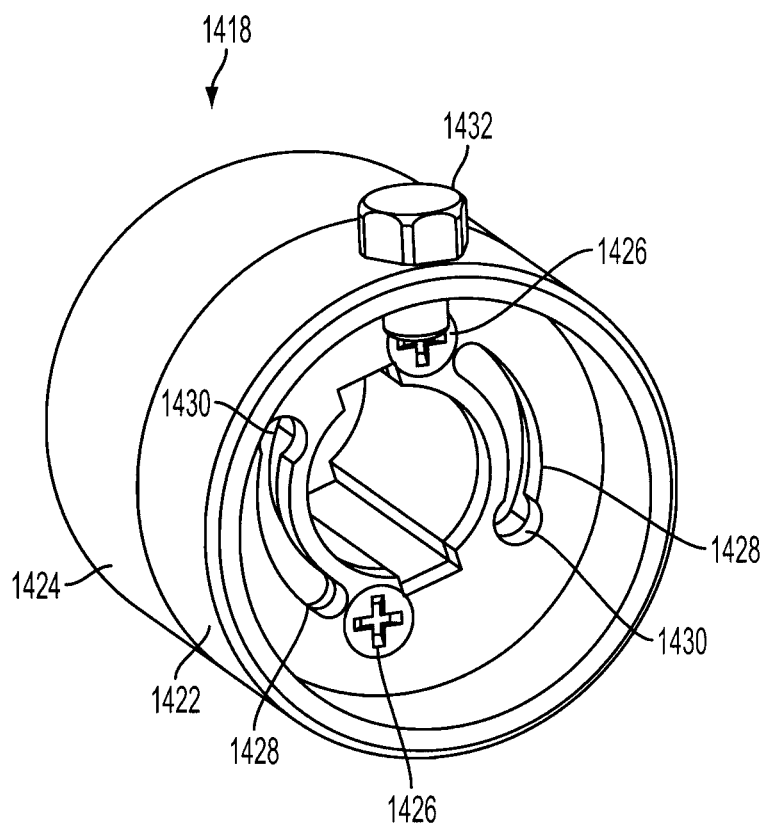
FIG. 53 is a perspective view of the second cap of the fourteenth embodiment of the depth gauge.

Referring to FIGS. 51-53, a fourteenth embodiment of a depth gauge 1410 is configured to be removably attached to the drill bit 12. The depth gauge 1410 has a body 1412 with an inner throughbore that receives the drill bit 12 therethrough, and that is internally threaded to match the pitch of the flutes of the drill bit 12, such that the body 1412 can be threaded onto the flutes of the drill bit 12 to the point where the flutes end. Fixedly coupled to the body 1412 is a first end cap 1414. The first end cap 1414 includes a pair of pins 1320 that are biased toward a forward tip of the drill bit 12. Thus, the amount of penetration of the drill bit 12 into the workpiece is limited to a first depth D1 (see FIG. 51) A second end cap 1418 can be removably attached to the first end cap 1414, so that when the second cap 1418 and the first end cap 1414 are coupled to the body 1412, the second cap 1418 will abut against the workpiece to limit the amount of penetration of the drill bit 12 into the workpiece to a second depth D2 (see FIG. 52).

The second end cap 1418 includes a hollow metal sleeve 1422 connected to a rubber stopper 1424 by screws 1426. The sleeve 1422 defines a pair of arcuate slots 1428 with round openings 1430 that are configured to received the pins 1420. In operation, the pins 1420 are received in the openings 1430 and then the sleeve 1422 is rotated so that the pins 1420 engage with the arcuate slots 1428 to inhibit removal of the second cap 1418 from the first cap 1414. The second cap 1418 further includes a lateral set screw 1432 that engages with the outer wall of the first cap 1414 to hold the second cap 1418 to the first cap 1414.

Figure 35:
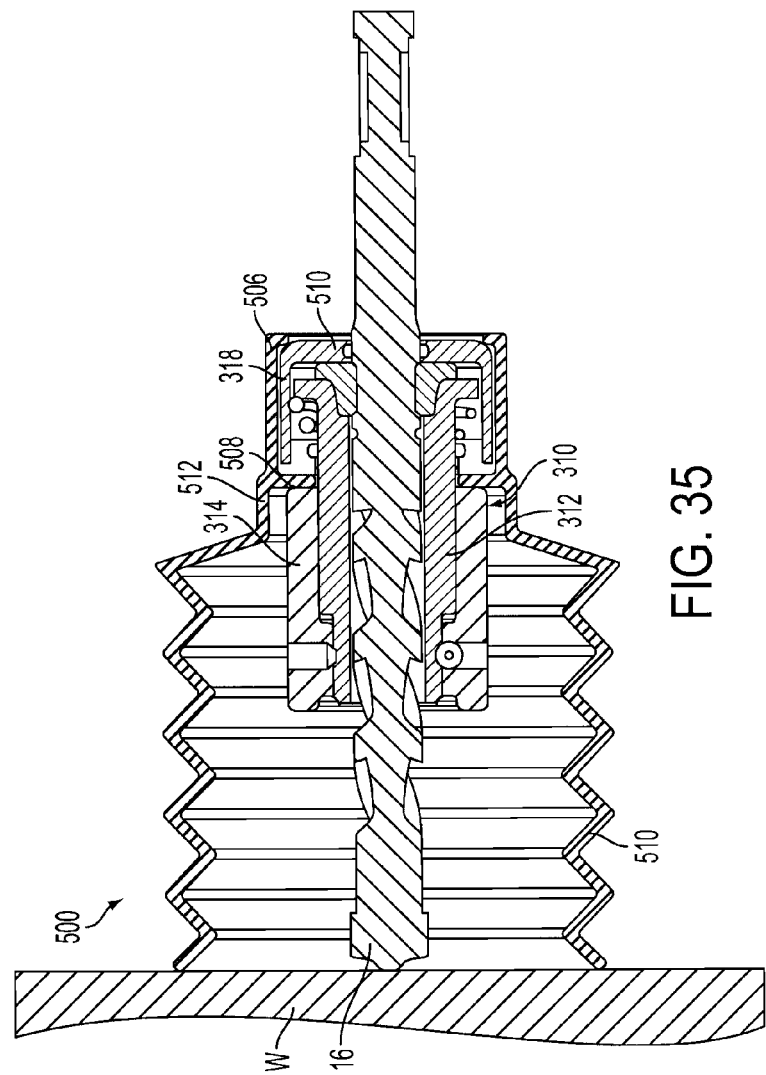
FIG. 35 is a cross-sectional view of the dust shield of FIG. 34 coupled to the depth gauge of FIG. 8.
Figure 34:
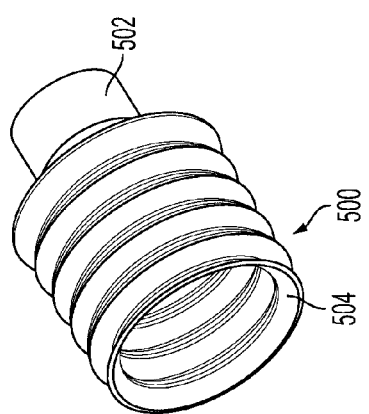
FIG. 34 is a perspective view of a dust shield for use with any one of the depth gauges in this application.

Referring to FIGS. 34 and 35, any of the aforementioned depth gauges may optionally also include a dust shield 500 that can be attached to the depth gauge to collect dust generated by penetration of the drill bit into the workpiece. The dust shield 500 includes a generally cylindrical attachment end portion 502 and a generally cylindrical dust collecting portion 504. The attachment end portion 502 includes a rear and front radially inwardly projecting flanges 506 and 508. In FIG. 35, the dust shield 500 is shown in use in conjunction with the third embodiment of the depth gauge 310 as a representative example. The rear flange 506 clips over a portion of a rear face 510 of the retention mechanism 318 to prevent the dust shield 500 from falling forward off of the depth gauge 310. The front flange 508 sits in front of the retention mechanism 318 to prevent the dust shield 500 from moving rearward relative to the depth gauge 310. Thus, the front and rear flanges 506, 508 act on both sides of the retention mechanism 318 to connect the dust shield to the depth gauge 310. It should be understood that the dust shield 500 could be attached to the retention mechanism of the other embodiments of the depth gauge, described above and/or can be attached to other portions of the depth gauge 310, or the other embodiments of depth gauges, using similar or different attachment mechanisms.

The dust collecting portion 504 of the dust shield 500 surrounds the body, the cap, and the drill bit 12, including the tip 16 of the drill bit 12, such that the dust collecting portion 504 abuts against the workpiece W before the drill bit 12 penetrates the workpiece W. The dust collecting portion 504 includes a collapsible side wall 510 that collapses as the drill bit is driven into the workpiece W while remaining abutted against the workpiece W, until the cap 314 (or the cap of the other embodiments) contacts the workpiece to prevent further insertion of the drill bit 12 into the workpiece W. In the embodiment shown in FIGS. 34 and 35, the collapsible side wall 510 has an accordion configuration and is made of an elastomeric material. In other embodiments, the sidewall may have other shapes and be made of other materials. The dust collecting portion 504 also includes a non-collapsible pocket portion 512 that does not collapse so that it can collect any dust.

Figure 36:
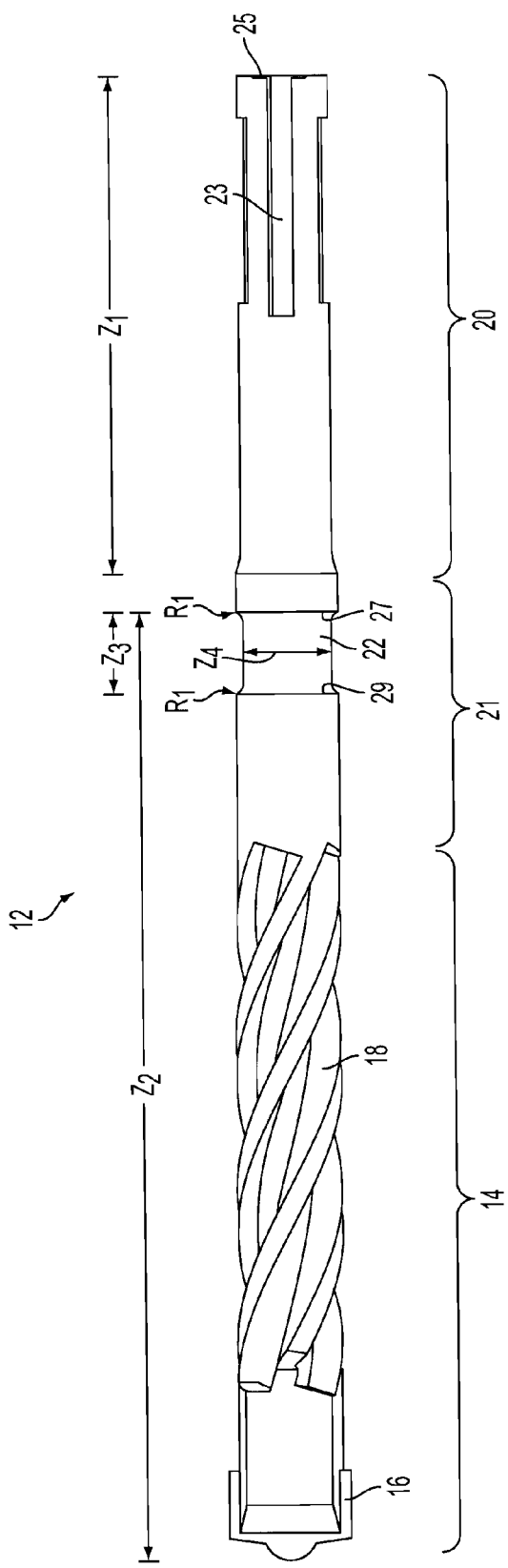
FIG. 36 is a side view of a drill bit for use with any of the depth gauges in this application.

Each of the aforementioned embodiments of a depth gauge and dust shield can be used with the a drill bit such as hammer drill bit 12 shown in FIG. 36. The drill bit 12 includes a shank portion 20, an intermediate portion 21, and a cutting portion 14. The cutting portion 14 has a cutting head 16 (e.g., a carbide-tipped cutting head) and a plurality of cutting flutes 18 that extend axially from the cutting head 16 toward the shank portion 20. The shank portion 20 includes a plurality of axial grooves 23 that define an SDS-type connection (e.g., SDS, SDS-plus, SDS-top or SDS-max) or a spline-type connection, so that the drill bit 12 can be coupled to an SDS-type or spline-type tool holder on a hammer drill. The intermediate portion 21 defines only a single annular groove 22 that is sized to retain one of the depth gauges described above.

The dimensions of each the hammer drill bit 12 has been carefully selected to optimize its performance with the depth gauges described above and to enable a single depth gauge to be used with multiple drill bit diameters and multiple size anchors. First, the intermediate portion 21 is positioned approximately the minimum allowable distance Z1 from the rear end 25 of the drill bit to enable the SDS connection to function properly with the tool into which the drill bit is inserted. For example, the distance Z1 is approximately 59 mm for a ½-inch drill bit, and approximately 53.5 mm for a ⅜-inch drill bit. In addition, the annular groove 22 has a length Z3 of approximately 6 mm, a diameter 24, of approximately 9.8 mm, and a pair of radiused edges 27, 29 each having a radius R1 of approximately 1.5 mm. It has been found that these dimensions optimize the connection between the drill bit and the depth gauge without unnecessarily weakening the drill bit. Finally, the distance Z2 between the carbide tip 16 and the rear radiused edge 27 of the annular groove 22 is approximately 95 mm (Z2) for a ½ inch drill bit, and approximately 102 mm (Z2') for a ⅜-inch drill bit. These distances are critical because it enables the single depth setter 310 to be used with both ½ inch and ⅜ inch drill bits to create holes for two standard length ½ inch diameter anchors (by reversing the orientation of the cap 314), and one standard length ⅜ inch anchor. In addition, the multiple drilling depths can be achieved using this drill bit 12 having only a single annular groove.

Figure 54A:
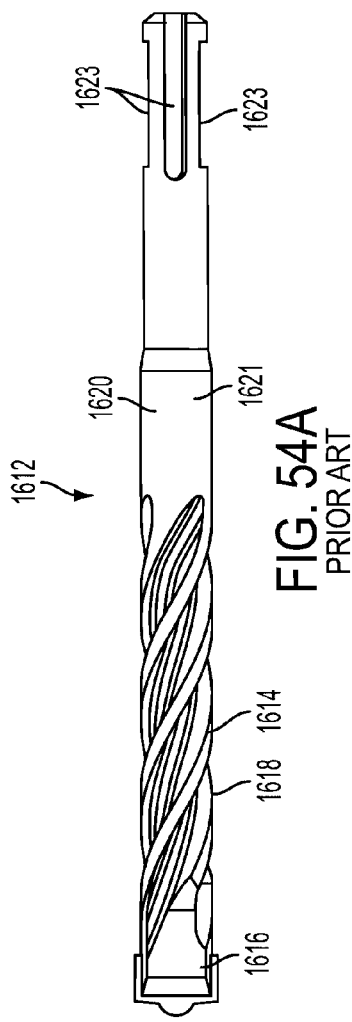
FIG. 54A is a side view of a prior art SDS-type drill bit.
Figure 54B:
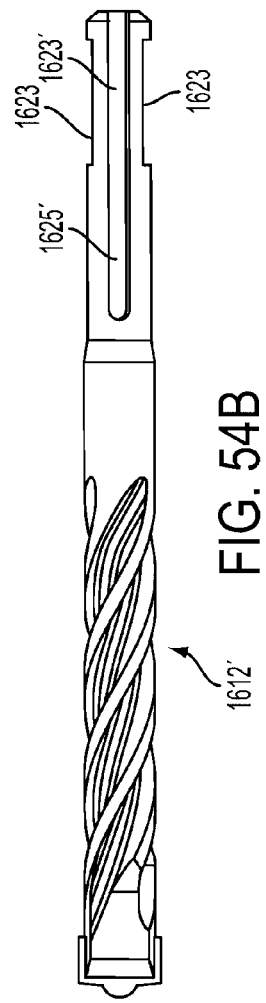
FIGS. 54B and 54C are side views of alternative embodiments for SDS-type drill bits.
Figure 54C:
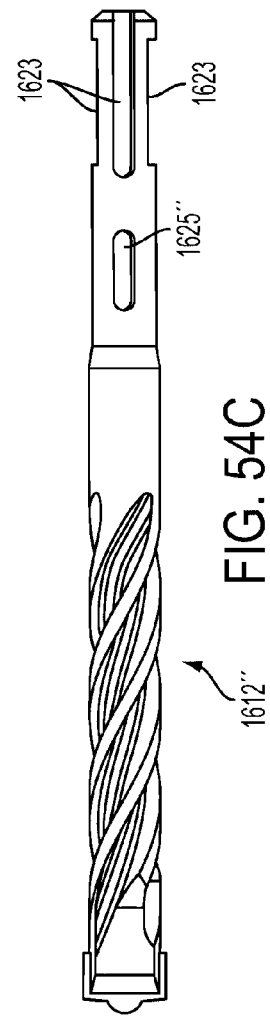

Referring to FIGS. 54A-59, a fifteenth embodiment of a depth gauge 1510 is configured to be removably attached to one of a drill bit 1612 or a drill bit 1612', in conjunction with a power tool such as a hammer drill 1600. FIG. 54A shows a prior art SDS-type drill bit 1612 that includes a shank portion 1620, an intermediate portion 1621, and a cutting portion 1614. The cutting portion 1614 has a cutting head 1616 (e.g., a carbide-tipped cutting head) and a plurality of cutting flutes 1618 that extend axially from the cutting head 1616 toward the shank portion 1620. The shank portion 1620 includes a plurality of axial grooves 1623 that define an SDS-type connection (e.g., SDS, SDS-plus, SDS-top or SDS-max) or a spline-type connection, so that the drill bit 1612 can be coupled to an SDS-type or spline-type tool holder 1602 on a hammer drill 1600. In FIG. 54B, the prior art drill bit 1612 has been modified as drill bit 1612' so that one or more of the axial SDS-type grooves 1623' has been extended to have an extension portion 1625' that extends further axially forward on the drill bit 1612' than the other axial grooves 1623. In FIG. 54C, the prior art drill bit 1612 has been modified as drill bit 1612" so that there is one or more oblong grooves 1625" positioned axially forward of the SDS-type grooves 1623. The depth gauge 1510 described in greater detail below is configured to engage the extension portion 1623' on drill bit 1612' or the oblong groove on drill bit 1623".

The depth gauge 1510 has an elongated body 1512 and a retention mechanism 1518 coupled to a rear portion 1516 of the body 1512 to removably attach the body 1512 to one of drill bits 1612" (as described below). The body 1512 also has an intermediate threaded portion 1520 disposed between a front portion 1515 and the rear portion 1516, and defines a first throughbore 1522 that receives the drill bit 1612" therethrough. A cap 1514 has an internally threaded rear portion 1517 that is removably threaded to the threaded portion 1520 of the body 1512 to enable multiple different drilling depths (as described below).

Figure 55:
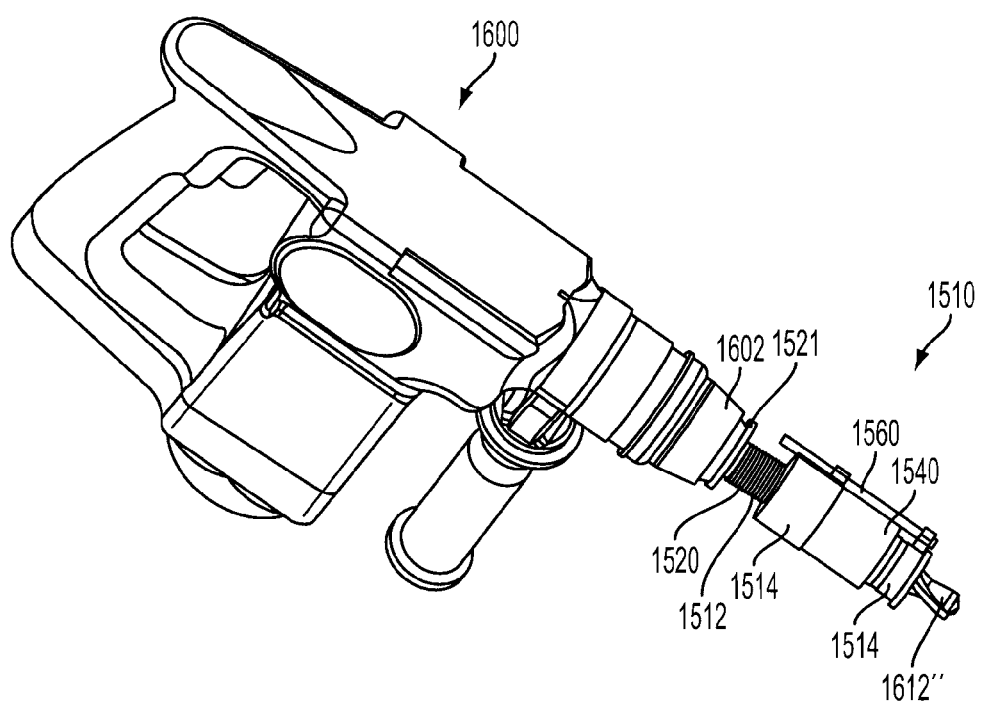
FIG. 55 is a perspective view of a hammer drill with a fifteenth embodiment of a depth gauge.
Figure 56:
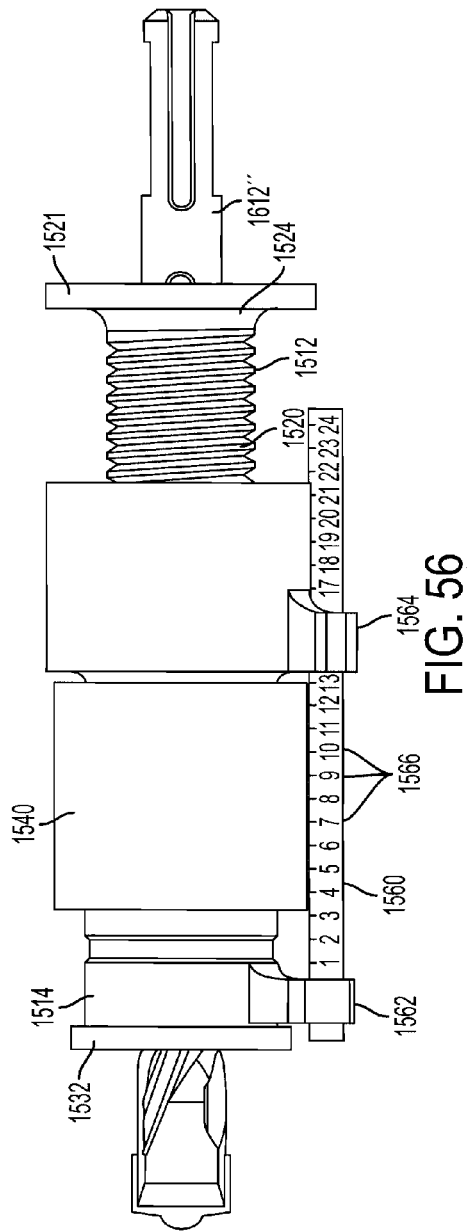
FIG. 56 is a side view of the fifteenth embodiment of the depth gauge.

The retention mechanism 1518 that is coupled to the rear portion 1516 of the body 1512 removably couples the body 1512 to the oblong groove 1625" in the drill bit 1612". The retention mechanism comprises one or more inward projections 1524 that engage the oblong groove(s) 1625". It should be noted that the axial length L1 of the projections 1524 is less than the axial length L2 of the oblong groove 1625" so that there is some axial play between the body 1512 and the drill bit 1612". The body 1512 also has a flange 1521 that bottoms out against the tool holder 1602 of the hammer drill 1600 (as shown in FIG. 55), rather than against the drill bit 1625", thus inhibiting the transfer of axial loads between the drill bit 1625" and the depth gauge 1520.

Figure 57:
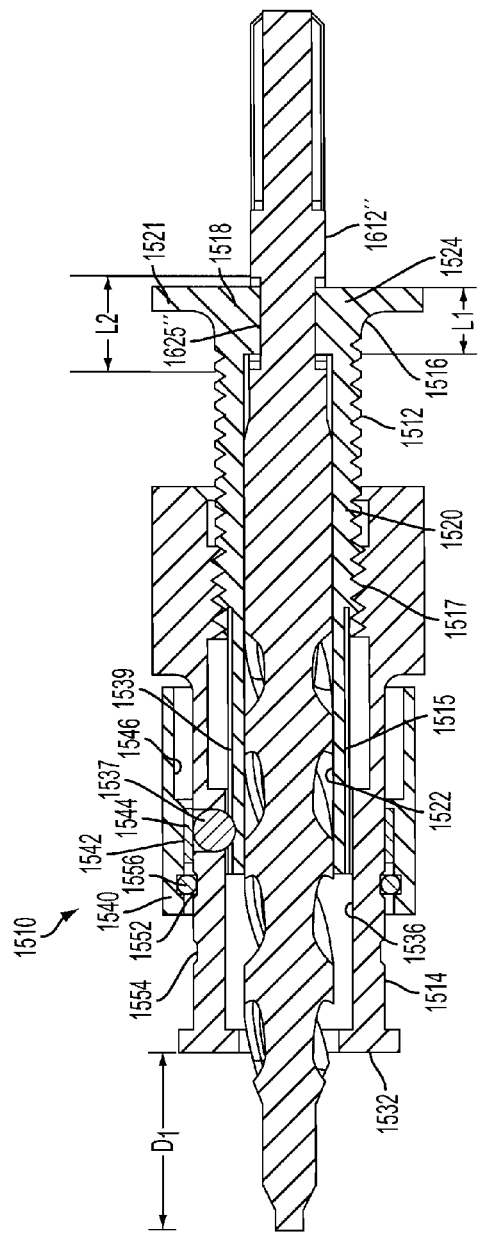
FIG. 57 is a cross-sectional view of the fifteenth embodiment of the depth gauge at a first depth in a locked position.

In the implementation shown in FIG. 57 the body 1512 is not removable from the drill bit 1612". However, it should be understood, that the body 1512 can be made to be removable by various implementations, including by making the body 1512 split into two halves (e.g., like body 612), or by replacing the inward projections 1524 with radially moveable members (e.g., like balls 142 or jaws 550), and that any one of the locking mechanisms described above can be used to help retain the body 1512 on the drill bit 1612". It should also be understood that the body 1512 may be coupled to drill bit 1612', such that the projections 1524 engage the groove extension 1625', which enables the drill 1612' to be removed from the body 1512. Alternatively, the body 1512 may also be coupled to drill bit 12 such that the projections 1524 engage the annular groove 22.

The cap 1514 has a contacting end 1532 configured to contact the workpiece, a second throughbore 1536 configured to receive the drill bit 1612" therethrough, and the internally threaded rear portion 1517 that is removably threaded over the externally threaded portion 1520 of the body 1512. The cap 1514 also includes a ball 1537 that engages with a longitudinal groove 1539 in a front portion 1515 of the body. The cap 1514 additionally defines a pair of annular grooves 1552 and 1554.

Surrounding a portion of the cap 1514 is a locking ring 1540. The locking ring 1540 includes an inner wall 1542 that contains a spring clip 1544, the spring clip 1544 pressing the ball 1537 into the longitudinal groove 1539 when the spring clip is in the locked position, as shown in FIG. 57. Rearward of the spring clip 1544 the inner wall 1542 defines a recess 1546 that is configured to receive the ball 1537 and spring clip 1544 when the locking ring 1540 is moved forward into the unlocked position, as shown in FIG. 58. Disposed between the inner wall 1542 of the locking ring 1540 is an O-ring 1556 that engages with the annular groove 1552 when the locking ring 1540 is in the locked position (FIG. 57) and that engages the annular groove 1554 when the locking ring 1540 is in the unlocked position (FIG. 58).

Multiple drilling depths can be achieved as follows. As shown in FIG. 57, the cap 1514 is threaded onto the body 1512 such that the contacting end 1532 will contact the workpiece to achieve a drilling depth of D1. In this locked position, O-ring 1556 engages rearward annular groove 1552, and the ball 1537 engages the groove 1539 such that rotation of the cap 1514 relative to the body 1512 is prevented, thus preventing any depth adjustment. To adjust the depth, the locking ring is pulled forward to the position shown in FIG. 58 such that O-ring 1556 engages forward annular groove 1554 and the ball 1537 and spring clip 1542 move radially outwardly from groove 1539 into recess 1546. Now that the ball 1554 no longer engages the groove 1539, the cap 1514 is free to rotate relative to the body 1512, thus enabling the drilling depth to be adjusted. For example, the cap 1514 can be threaded all of the way onto the threaded portion 1520 of the body 1512 until the cap abuts against the flange 1521, as shown in FIG. 59, to achieve a larger drilling depth of D2. Once the desired drilling depth has been achieved, the locking ring is moved backwards so that O-ring 1556 engages the rearward annular groove 1552, and the ball 1537 engages the groove 1539 in the body 1512, thus locking the cap 1514 at the desired drilling depth. It should be apparent, that this embodiment provides for a larger selection of possible drilling depths than the previously described embodiments. For example, this embodiment may allow for adjustment of the drilling depth in 1/16 inch increments, although the increments can be varied by varying, e.g., the thread pitch.

The cap 1512 further includes a telescoping rod 1560 that is frictionally held by a pair of bosses 1562 and 1564. The rod 1560 also includes a plurality of indicia 1566 that indicate different drilling depths. In operation, once the desired drilling depth is set, the rod 1560 can be telescoped forward until it abuts the workpiece, whereby the indicia will indicate the drilling depth that has been selected. In this manner, the user need not use a separate tool to measure the drilling depth.

Figure 60A:
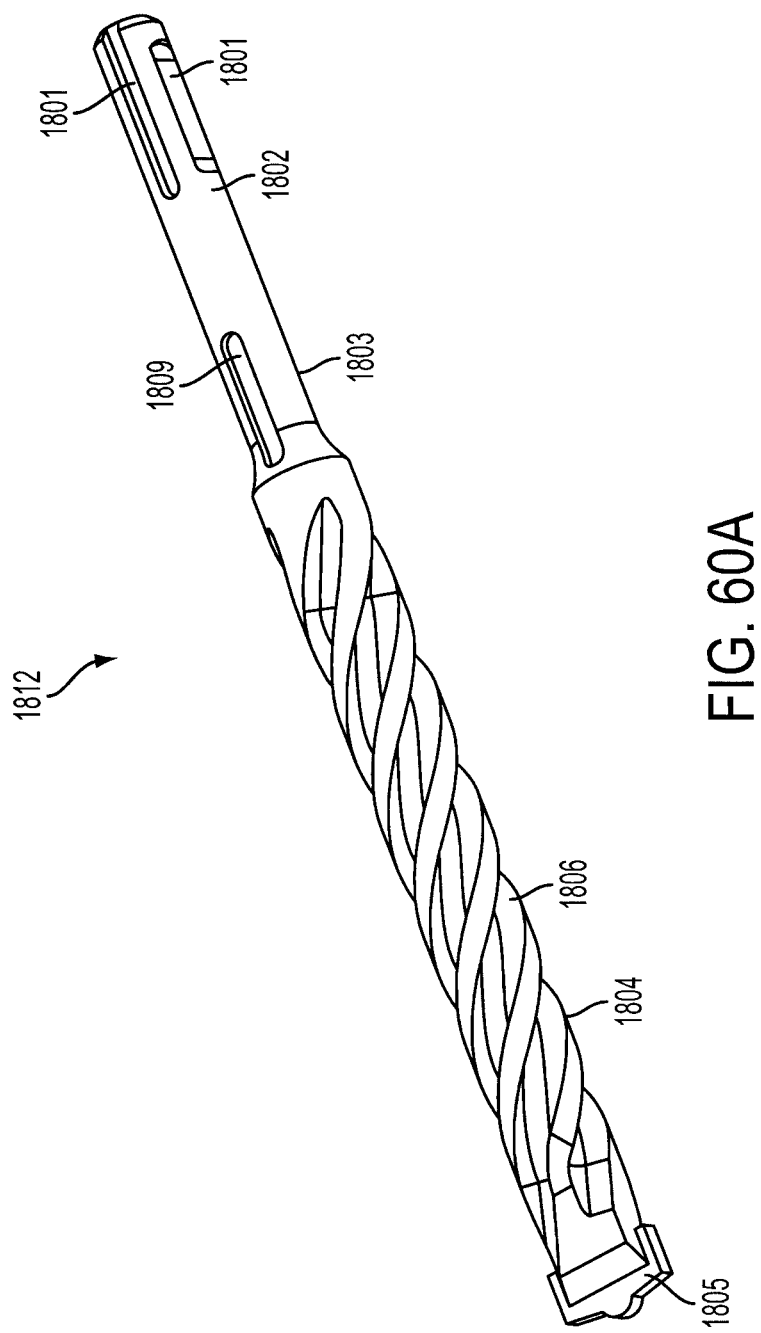
FIG. 60A is a perspective view of an alternative embodiment for the SDS-type drill bit.

Referring to FIGS. 60A-67, a sixteenth embodiment of a depth gauge 1710 is configured to be removably attached to a drill bit 1812. As shown in FIGS. 60A-60C, the drill bit 1812 includes a shank portion 1802, an intermediate portion 1803, and a cutting portion 1804. The cutting portion 1804 has a cutting head 1805 (e.g., a carbide-tipped cutting head) and one or more cutting flutes 1806 that extend axially from the cutting head 1805 toward the intermediate portion 1803 and shank portion 1802. The shank portion 1802 includes a plurality of axial grooves 1801 that define a standard SDS-type connection (e.g., SDS, SDS-Plus, or SDS-Max) or a spline-type connection, so that the drill bit 1812 can be coupled to an SDS-type or spline-type tool holder 1822 on a hammer drill 1820. In addition, the intermediate portion 1803 includes one or more longitudinal grooves 1809 positioned axially forward of the SDS-type grooves 1801, for enabling attachment of the depth gauge 1810 to the drill bit 1812, as described below.

In one implementation, the distance from the rear end of the shank 1801 to the longitudinal slot 1809 has a length A1 of approximately 47 mm, and the longitudinal slot 1809 has a length A2 of approximately 20 mm, a width A3 of approximately 3.3 mm, and a curved wall at either end having a radius R1 of approximately 1.5 mm. It should be understood that the depth gauge 1710 could be coupled to any of the other drill bits shown or described elsewhere in this application.

Referring to FIGS. 61-66, the depth gauge 1710 has an elongated body 1712 that includes a internally threaded outer sleeve portion 1713 and a rear portion 1715. The depth gauge 1710 further includes a cap 1714 that includes an externally threaded rear portion 1719 threadably engaged with the internally threaded outer sleeve portion 1713 of the body 1712, and an intermediate sleeve 1717 at least partially received in the threaded body 1712. The depth gauge 1710 also includes a base member 1720 having an inner sleeve portion 1722 at least partially received in the intermediate sleeve 1717 and/or the outer sleeve 1713, and a retention mechanism 1718 received inside the rear portion 1715 of the body 1712 to removably attach the depth gauge 1710 to the longitudinal slot(s) 1809 in the drill bit 1812 (as described below).

When the depth gauge 1710 is fully assembled (as shown in FIGS. 61-63 and 65), the drill bit 1812 is received at least partially through the retention mechanism 1718, the inner sleeve 1722, the outer sleeve 1713 and the intermediate sleeve 1717. The intermediate sleeve 1717 defines a plurality of longitudinal through-slots 1721, and the outer sleeve defines a plurality of radial through-slots 1723, each of which facilitate escape of dust-laden air that may collect inside of the depth gauge 1710. It should be understood that the slots 1721, 1723 may have different configurations and/or shapes and that analogous slots may be defined in other parts of the depth gauge 1710, such as the inner sleeve 1720. In addition, the rear portion 1715 of the body 1712 defines an annular groove 1760 that is configured for attachment to a dust shield, e.g., the dust shield 500 described above, that will cover the forward portions of the body 1712, the cap 1714, and the drill bit 1812 to collect dust generated when the drill bit 1812 is in operation.

Figure 61:
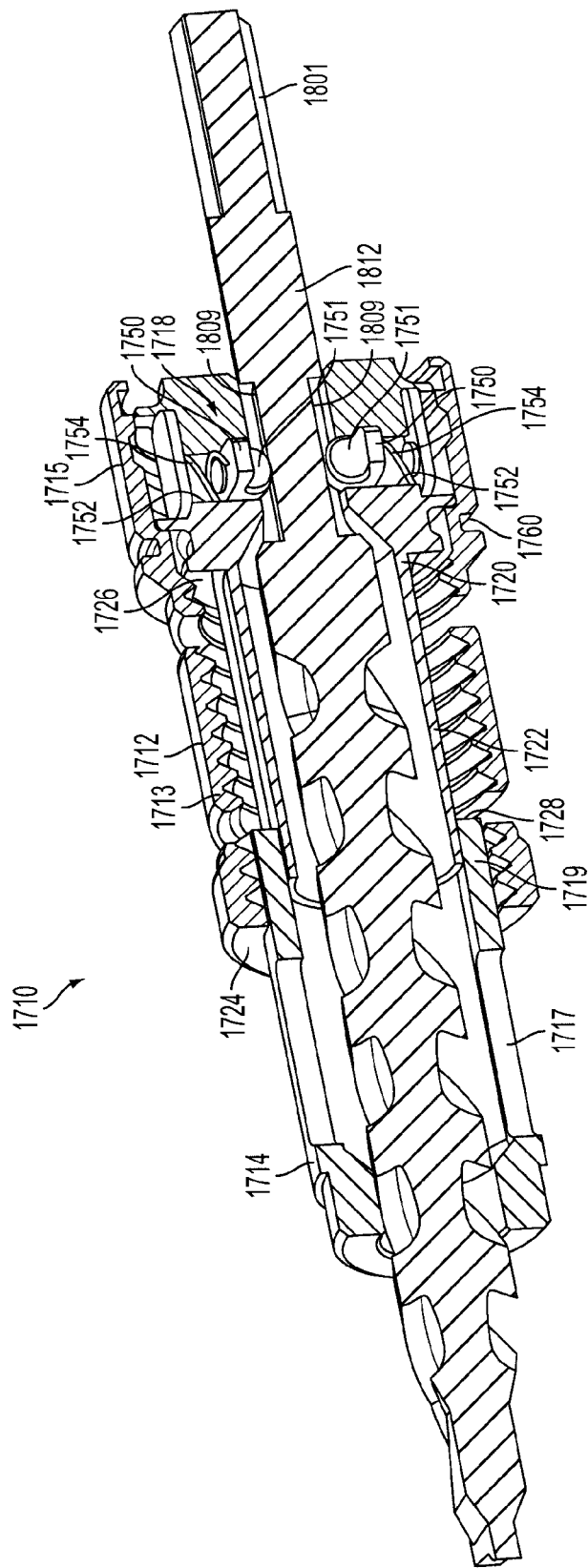
FIGS. 61-63 are cross-sectional perspective views of a sixteenth embodiment of a depth gauge, shown in three positions to achieve three different drilling depths.

The cap 1714 is coupled to the body 1712 and the inner sleeve 1722 so that a plurality of different drilling depths can be achieved. As mentioned above, the rear portion 1719 of the cap 1714 is externally threaded and threadably coupled to the internally threaded outer sleeve portion 1713 of the body 1712. The rear portion 1719 of the cap 1714 also has one or more inwardly projecting keys 1730 that engage with one or more longitudinal slots 1732 defined in the outer surface of the inner sleeve 1720 to restrict relative rotation between the base portion 1720 and the cap 1714. Thus, in order to adjust the position of the cap 1714 relative to the body 1712, the user rotates the body 1712 relative to the cap 1714 and base 1720, which causes the cap 1714 to telescope relative to the body 1712. The internal threads on the outer sleeve portion terminate before the front end 1724 of the body 1712 to provide a stop so that the cap 1714 cannot be removed from the front of the body 1712 when the cap is in the fully forward position (FIG. 61). In addition, the base member 1720 defines a shoulder 1726 against which the rear end 1728 of the cap 1714 abuts when the cap 1714 is in its fully retracted position (FIG. 63). The cap 1714 can also be positioned at a plurality of intermediate positions relative to the body (FIG. 62).

To facilitate adjusting the position of the cap 1714 relative to the body 1712 to a plurality of predetermined discrete positions, the base 1720 and body 1712 together include a positive locking detent system 1734. The detent system 1734 includes one or more generally C-shaped spring clips 1736 received between annular flanges 1738, 1740 on the rear portion of the base 1720. The spring clips 1734 each include one or more inwardly projecting pawls 1742 that bias the spring clips 1734 radially outwardly. The spring clips 1736 also each include at least one dome-shaped protrusion 1744. The protrusions 1744 are configured to engage with corresponding concave recesses 1746 defined on an internal surface of the body 1712. When the body 1712 is rotated to telescope the cap 1714, the protrusions 1744 slip out of the recesses 1746, and then re-engage the next set of recesses 1746 as the body 1712 is rotated to provide a series of positive stops. Thus, the cap 1714 can be telescoped to a plurality of predetermined positions. In the embodiment illustrated, the protrusions are located 180 degrees apart so that there is a positive stop for every half turn of the body 1712 about the cap 1714. It should be understood that a different number or position of the positive stops could be provided.

Referring to FIGS. 61-64, the retention mechanism 1718 is coupled to the rear portion of the base 1720 between the flanges 1738, 1740 and beneath the spring clips 1734. The retention mechanism 1718 includes a pair of lugs 1750 each having C-shaped projections 1751 that extend through radial apertures 1752 in the base 1720 to engage with the slots 1809 in the drill bit 1812. The lugs 1750 are biased inwardly toward the drill bit 1812 by compression springs 1754, which are held in place relative to the base 1720 by plates 1756 that abut against the spring clips 1736. Because the slots 1809 are longitudinal, the base 1720 is inhibited from rotating relative to the drill bit 1812. In addition, because the slots 1809 are longer than the width of the C-shaped projections 1751 there is some amount of axial play between the base 1720 (and thus the depth gauge 1710) and the drill bit 1812. Thus, axial forces on the bit 1812 are not transferred to the depth gauge 1710, which can extend the life of the depth gauge 1710.

Figure 62:
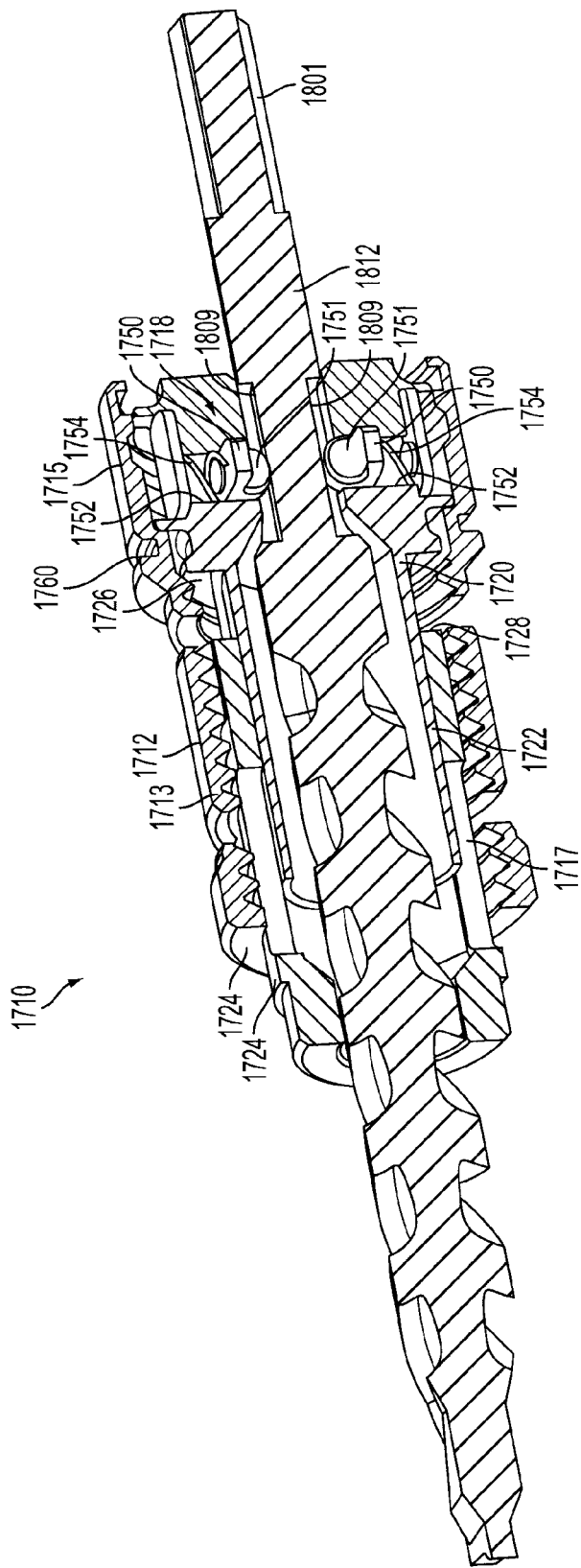
Figure 63:
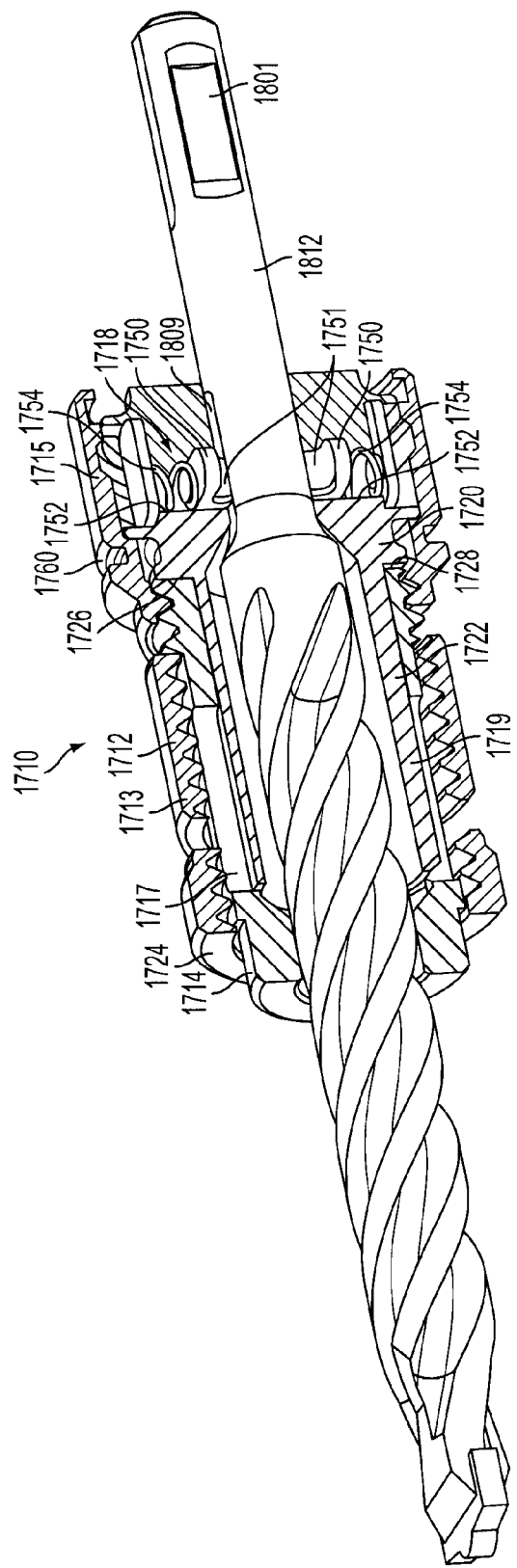
Figure 64:
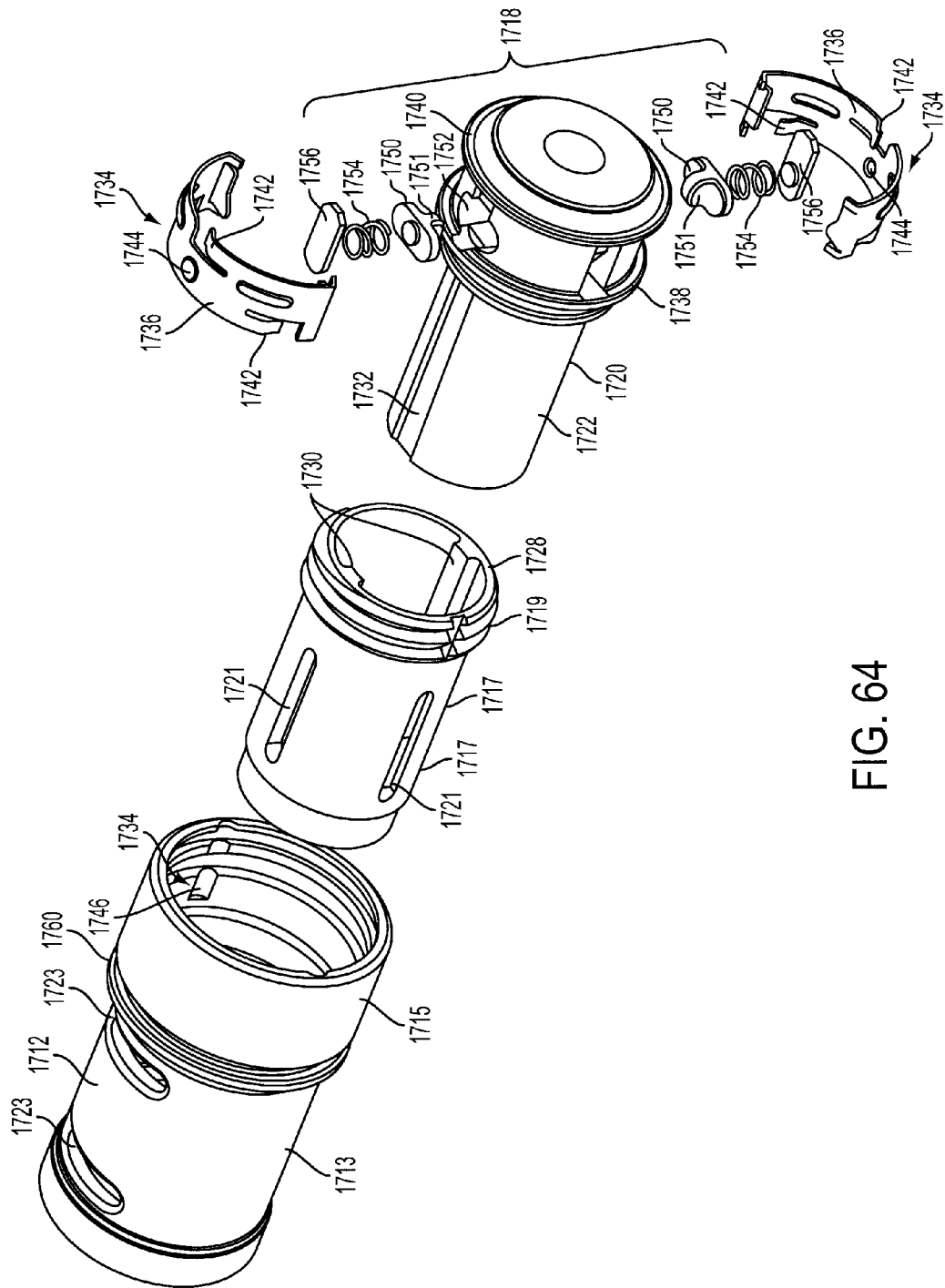
FIG. 64 is an exploded view of the depth gauge of FIGS. 61-63.
Figure 65:
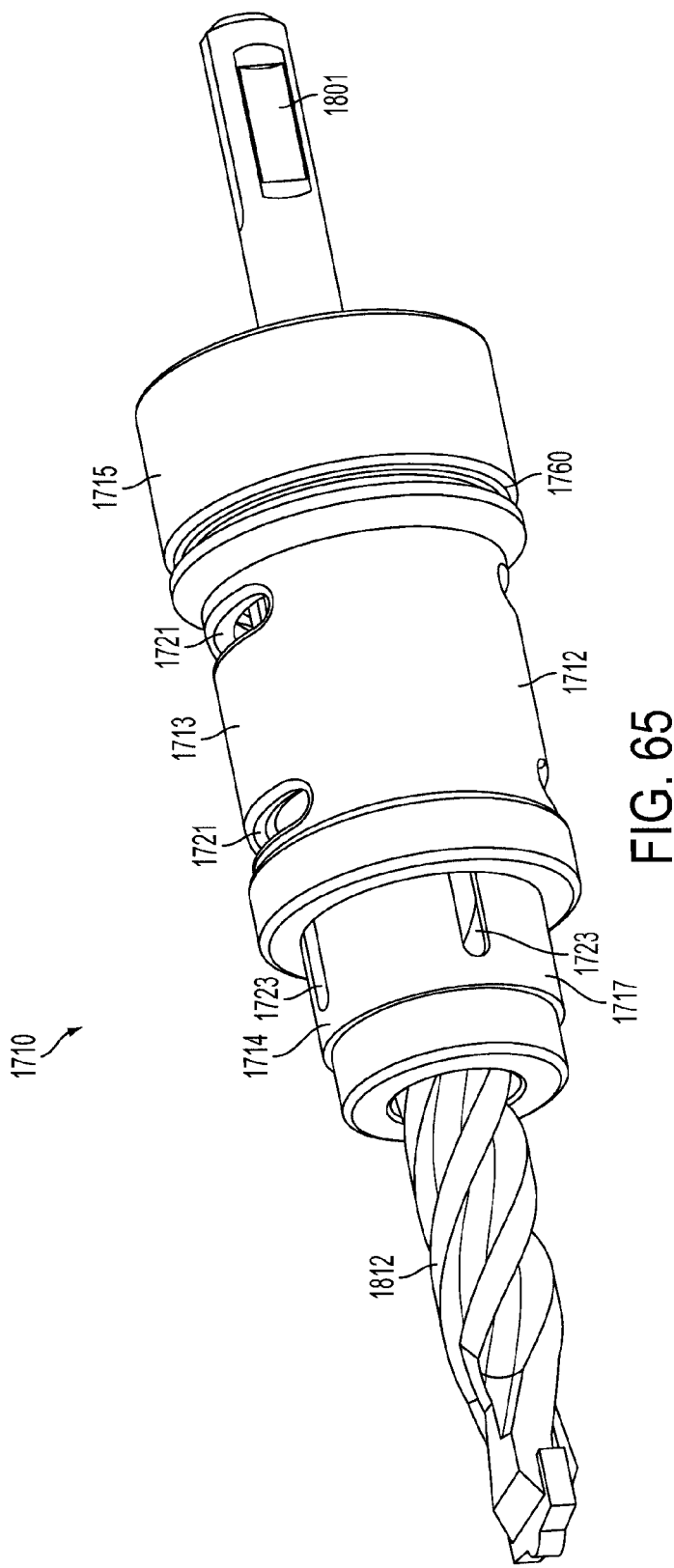
FIG. 65 is a perspective view of the depth gauge of FIGS. 61-63.
Figure 66:
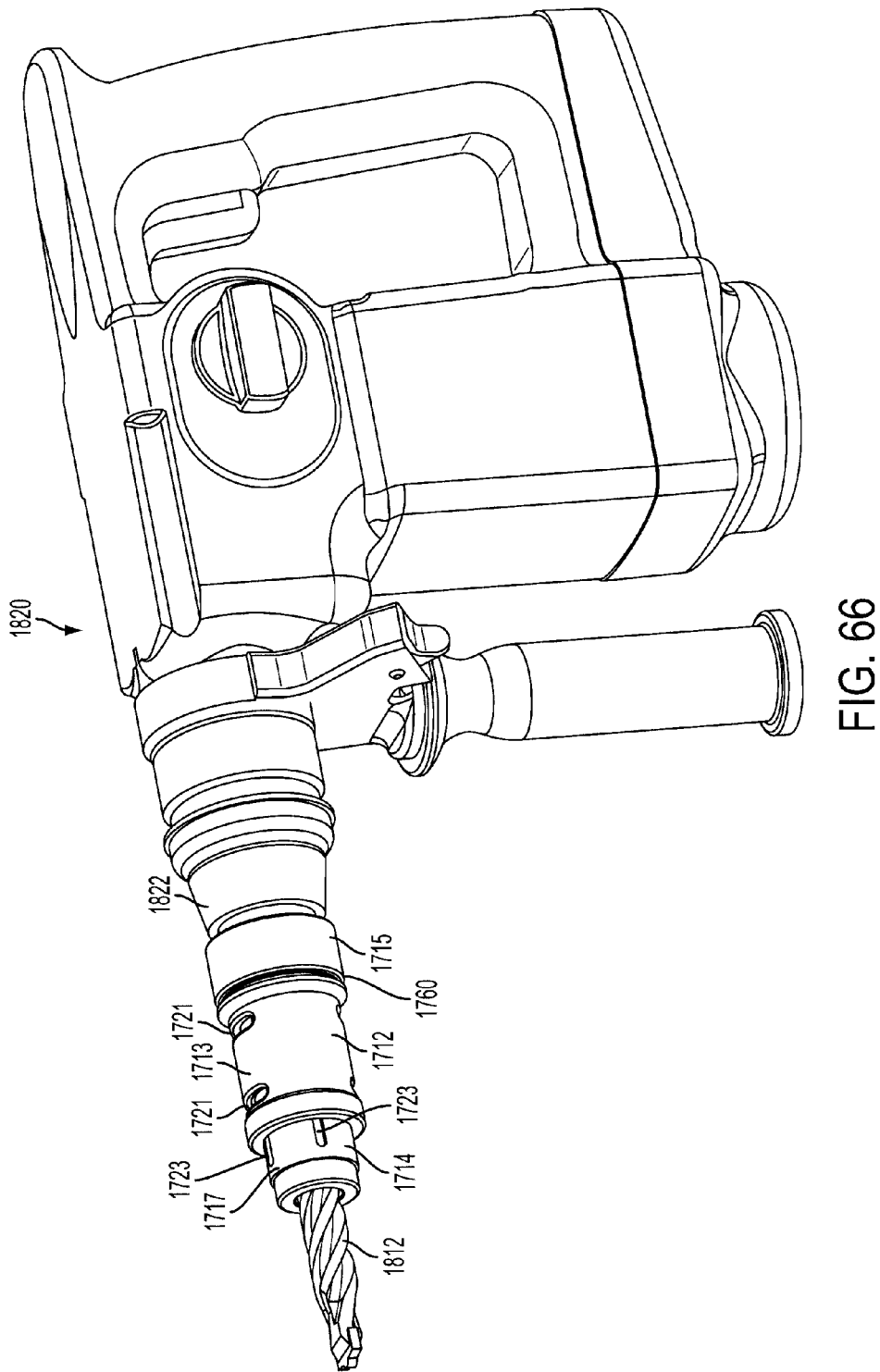
FIG. 66 is a perspective view of a power tool coupled to the drill bit of FIG. 60A, which is coupled to the depth gauge of FIGS. 61-63.
Figure 67:
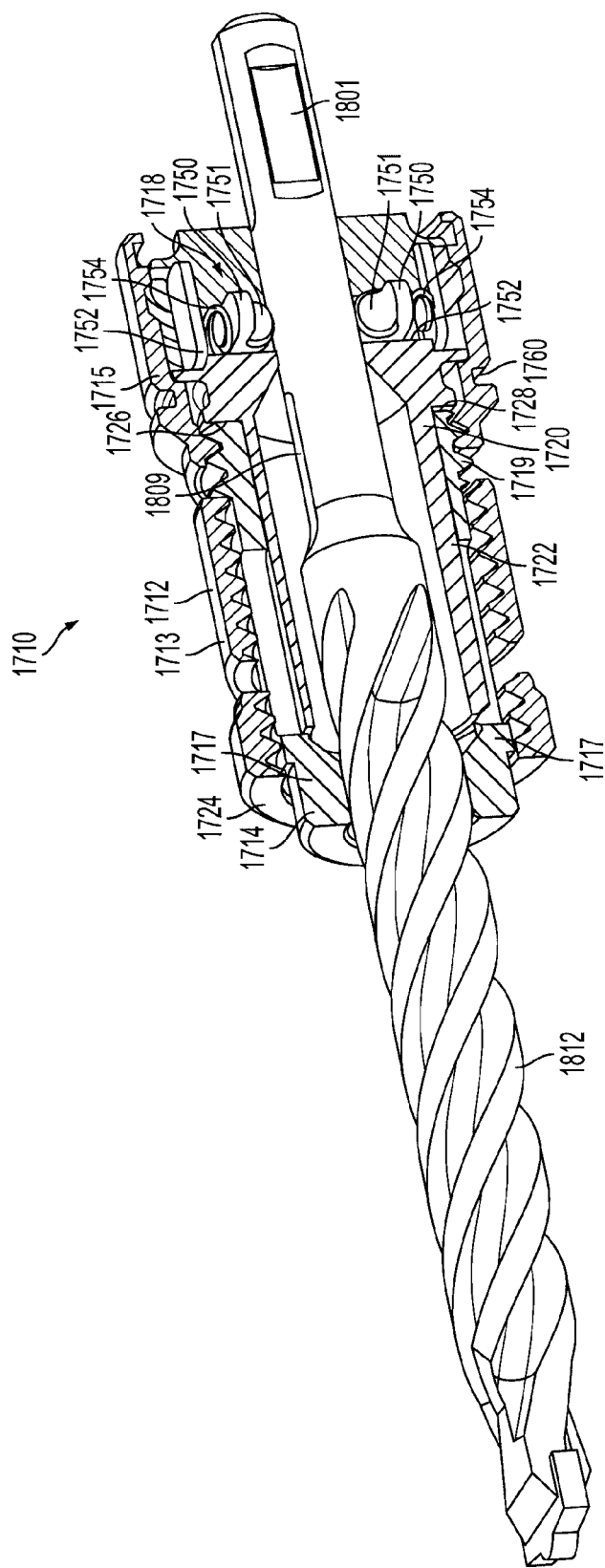
FIG. 67 is a are cross-sectional perspective views of the depth gauge of FIGS. 61-63, as it is being removed from the drill bit of FIG. 60A.

In the locked position (as shown in FIGS. 61-63), the C-shaped portions 1751 of the lugs 1750 are engaged with the slots 1809 in the drill bit 1812 to inhibit removal of the depth gauge 1710 from the drill bit 1812. To unlock the depth gauge 1710 from the drill bit 1812 (as shown in FIG. 67), the user pulls the body 1715 rearward relative to the drill bit 1812 with one hand, while holding the shank 1802 of the drill bit 1812 with the other hand. The C-shaped projections 1751 act as ramps against the edges of the slots 1809, allowing the lugs 1750 to move radially outwardly against the force of springs 1754, thus removing the lugs from the slots 1809 and enabling the drill bit 1812 to be removed from the depth gauge 1710. During operation of the drill bit 1812 and depth gauge 1710, inadvertent removal of the drill bit 1812 from the depth gauge 1710 is prevented by the tool holder 1822 which abuts against a rear surface of the body 1712 and/or the base 1720 (as shown in FIG. 66).

Numerous modifications may be made to the exemplary implementations described above. For example, the retention mechanism and/or cap from any one embodiment may be interchanged with a retention mechanism and/or cap from any other embodiment. In addition, the drill bit can have more than more annular groove and the body can have more than one retention mechanism that engages the more than one annular groove to distribute loads along the body and the drill bit. These and other implementations are within the scope of the following claims.

What is claimed is:

1. A depth gauge for use with a drill bit, comprising:
a body configured to receive a drill bit;
a retention mechanism coupled to the body and configured to directly engage a slot of the drill bit to removably couple the body to the drill bit; and
a cap coupled to the body such that the cap contacts a workpiece surface to prevent the drill bit from entering the workpiece more than a predetermined depth,
wherein the cap is threadably movable relative to the body among a plurality of positions, wherein each of the plurality of positions corresponds to a different predetermined drilling depth.

2. The depth gauge of claim 1, wherein the retention mechanism comprises a retention element that is moveable between a locked position in which the retention element engages a recess defined in the drill bit and an unlocked position in which the retention element is allowed to disengage from the recess.

3. The depth gauge of claim 2, wherein the retention element is biased radially inwardly to engage the recess in the drill bit in the locked position.

4. The depth gauge of claim 3, wherein the retention element has a curved or ramped surface to enable radial outward movement to the unlocked position of the retention element when the drill bit is being removed from the depth gauge.

5. The depth gauge of claim 2, wherein the retention element comprises a projection that has an axial length less than an axial length of the recess in the drill bit to enable axial play between the depth gauge and the drill bit.

6. The depth gauge of claim 1, wherein the retention mechanism is disposed on a base having an inner sleeve, the body includes an outer sleeve, and the cap includes an intermediate sleeve, wherein the inner sleeve is received at least partially in the intermediate sleeve and at least partially in the outer sleeve, and the intermediate sleeve is received at least partially in the outer sleeve.

7. The depth gauge of claim 6, wherein the intermediate sleeve is threadably connected to the outer sleeve such that rotation of one of the cap and the body causes the cap to telescope relative to the body among the plurality of positions.

8. The depth gauge of claim 7, wherein the intermediate sleeve includes a key that is received in a longitudinal recess of the inner sleeve to prevent relative rotation between the cap and the base.

9. The depth gauge of claim 7, further comprising a detent mechanism provided on the base and the outer sleeve to enable a positive lock at a predetermined number of the plurality of positions of the body relative to the cap.

10. The depth gauge of claim 9, wherein the detent mechanism comprises a spring biased protrusion on the base and a corresponding recess on an internal wall of the body.

11. The depth gauge of claim 1, further comprising a dust shield receiving and removably coupled to at least one of the body and the cap, the dust shield substantially covering a front end of the drill bit and configured to collect dust generated by penetration of the drill bit into the workpiece.

12. The depth gauge of claim 1, wherein the retention mechanism is configured to directly engage the drill bit.

13. The depth gauge of claim 1, wherein the retention mechanism is configured to engage the drill bit independently of engaging a housing of a power tool that holds the drill bit.

14. A depth gauge for use with a power tool having a tool holder for holding a drill bit, the depth gauge comprising:
  a body configured to be received over at least a portion of the drill bit;
  a retention mechanism coupled to the body and configured to directly engage a slot of the drill bit independently of the power tool and the tool holder to removably couple the body to the drill bit; and
  a cap coupled to the body such that the cap contacts a workpiece surface to prevent the drill bit from entering the workpiece more than a predetermined depth,
  wherein the cap is threadably movable relative to the body among a plurality of positions, wherein each of the plurality of positions corresponds to a different predetermined drilling depth.

15. The depth gauge of claim 14, wherein the retention mechanism comprises a retention element that is moveable between a locked position in which the retention element engages a recess defined in the drill bit and an unlocked position in which the retention element is allowed to disengage from the recess.

16. The depth gauge of claim 15, wherein the retention element is biased radially inwardly to engage the recess in the drill bit in the locked position.

17. The depth gauge of claim 15, wherein the retention element has a curved or ramped surface to enable radial outward movement to the unlocked position of the retention element when the drill bit is being removed from the depth gauge.

18. The depth gauge of claim 14, wherein the retention mechanism is disposed on a base having an inner sleeve, the body includes an outer sleeve, and the cap includes an intermediate sleeve, wherein the inner sleeve is received at least partially in the intermediate sleeve and at least partially in the outer sleeve, and the intermediate sleeve is received at least partially in the outer sleeve.

19. The depth gauge of claim 18, wherein the intermediate sleeve is threadably connected to the outer sleeve such that rotation of one of the cap and the body causes the cap to telescope relative to the body among the plurality of positions.

20. A depth gauge for use with a drill bit, comprising:
  a substantially cylindrical body configured to be received over at least a portion of the drill bit, the body coupled to a retention mechanism having a radially inwardly biased projection configured to removably and directly engage a recess in the drill bit;
  a substantially cylindrical cap having a front contact surface configured to engage a workpiece to inhibit insertion of the drill bit into the workpiece beyond a desired depth, and a rear threaded portion threadably coupled to the body so that rotation of one of the body and the cap relative to the other of the body and the cap causes axial movement of the cap relative to the body to adjust the desired depth.

* * * * *